United States Patent [19]
Jepson

[11] 3,822,105
[45] July 2, 1974

[54] HELICOPTER BLADE
[75] Inventor: W. Donald Jepson, Huntington, Conn.
[73] Assignee: United Aircraft Corporation, East Hartford, Conn.
[22] Filed: June 4, 1973
[21] Appl. No.: 366,825

Related U.S. Application Data
[63] Continuation-in-part of Ser. No. 182,618, Sept. 22, 1971, abandoned.

[52] U.S. Cl. ............... 416/223, 416/23, 416/228
[51] Int. Cl. ............................. B64c 27/46
[58] Field of Search .......... 416/223, 228, 144, 226, 416/23, 24

[56] References Cited
UNITED STATES PATENTS

| | | |
|---|---|---|
| 1,692,081 | 11/1928 | Cierva .......................... 416/237 X |
| 2,111,975 | 3/1938 | Larsen et al. ..................... 416/144 |
| 2,475,337 | 7/1949 | Platt ............................ 416/144 UX |
| 2,751,988 | 6/1956 | Lemont et al. ..................... 416/144 |
| 2,950,766 | 8/1960 | Huber ............................ 416/144 X |
| 3,065,933 | 11/1962 | Williams ......................... 416/228 X |
| 3,066,742 | 12/1962 | Castles ........................... 416/240 |
| 3,273,833 | 9/1966 | Windecker ..................... 416/223 X |
| 3,399,731 | 9/1968 | Giles .............................. 416/228 |
| 3,467,197 | 9/1969 | Spivey et al. ...................... 416/228 |
| 3,558,081 | 1/1971 | Williams ....................... 416/198 X |

Primary Examiner—Everette A. Powell, Jr.
Attorney, Agent, or Firm—Vernon F. Hauschild

[57] ABSTRACT

A helicopter blade is shaped to have a tip of selected twist, camber, planform, thickness distribution, sweep and airfoil so as to increase rotor operating efficiency, reduce rotor noise, and to reduce or eliminate rotor instability.

138 Claims, 36 Drawing Figures

INVENTOR
W. DONALD JEPSON
BY Vernon F. Hauschild
ATTORNEY

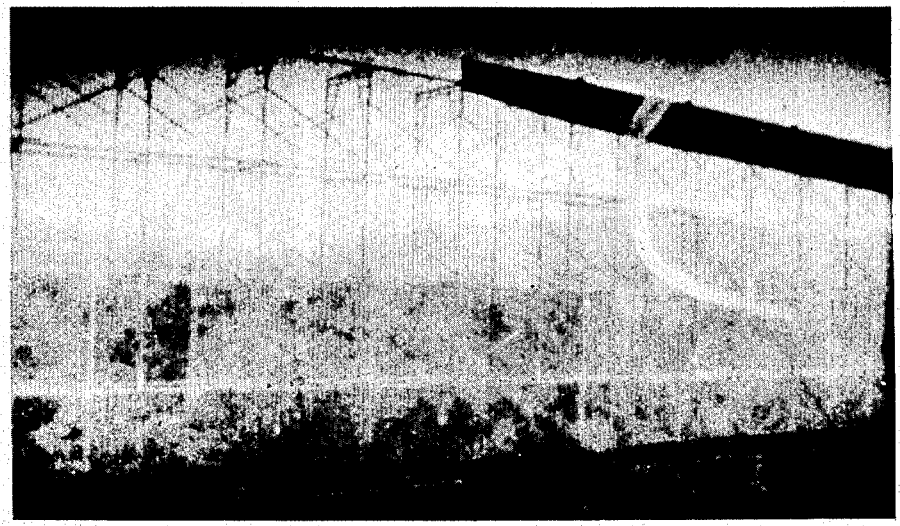
FIG. IC
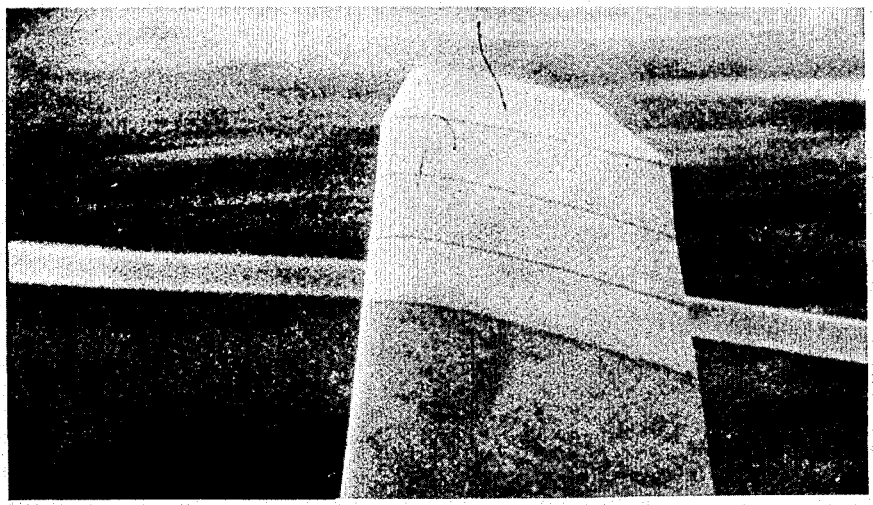
FIG. IB

BLADE SOLIDITY = .115, 6 BLADED ROTOR

BLADE SOLIDITY = .115, 6 BLADED ROTOR

FIG. 16  DYNAMIC RESPONSE OF A ROTOR BLADE WITH TIP TWIST WASHOUT
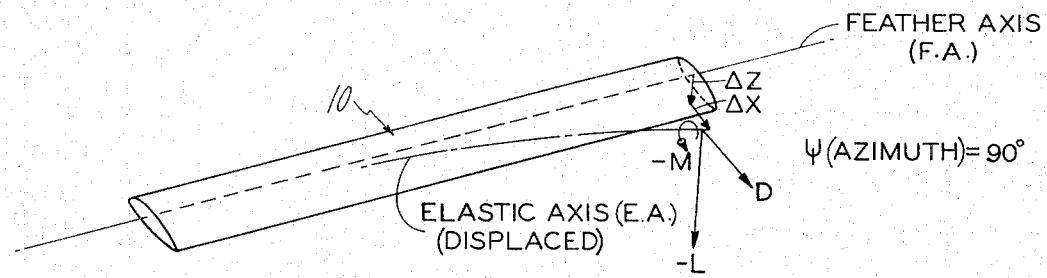
FIG. 17  ADVANCING BLADE TIP SPANWISE STATION DISPLACED FROM FEATHERING AXIS
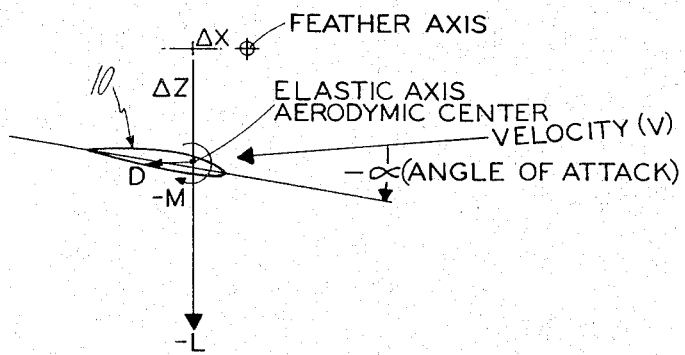
FIG. 18  COMPARISON OF BLADE TORSIONAL RESPONSE
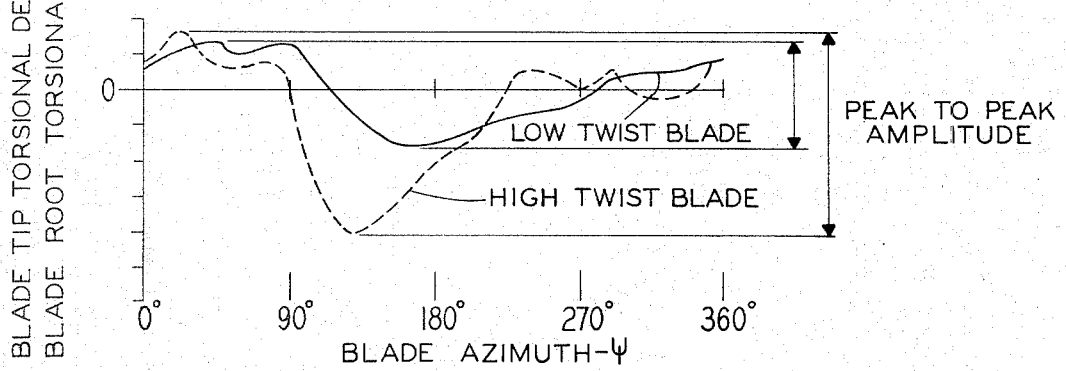

ADVANCING BLADE TIP

HOVERING OR RETREATING BLADE TIP $\alpha_R$ - RIGID BLADE
$\alpha_E$ - ELASTIC BLADE

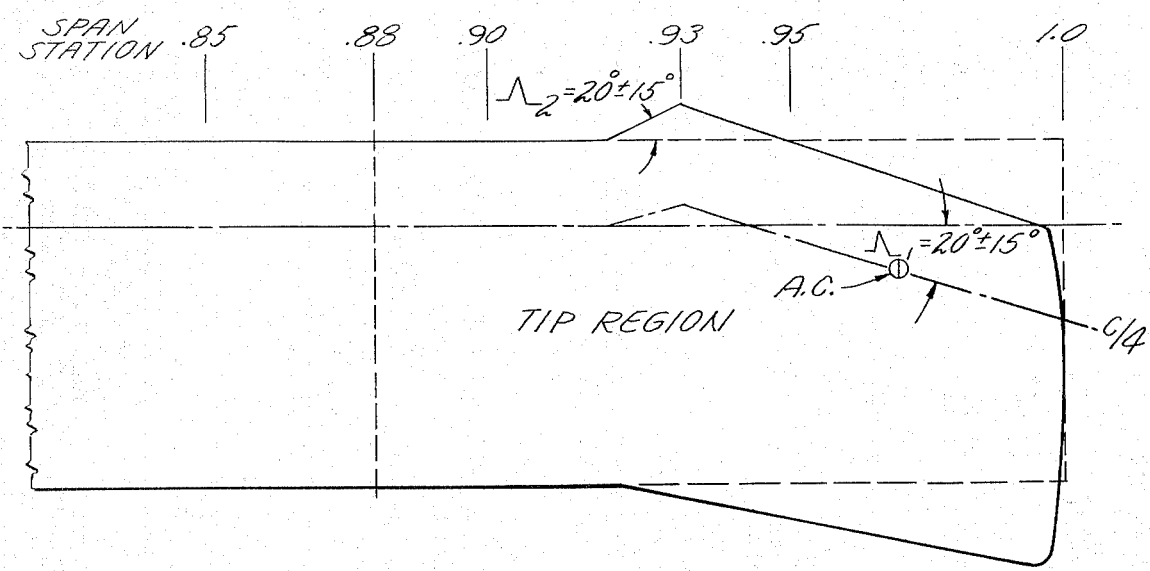
FIG. 26 SKETCH FOR TOLERANCES SWEPT BETA TIP
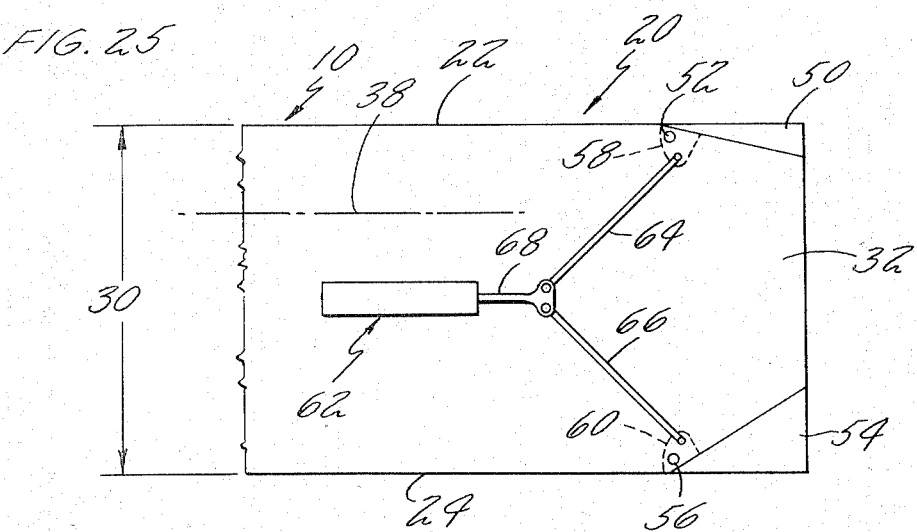
FIG. 25

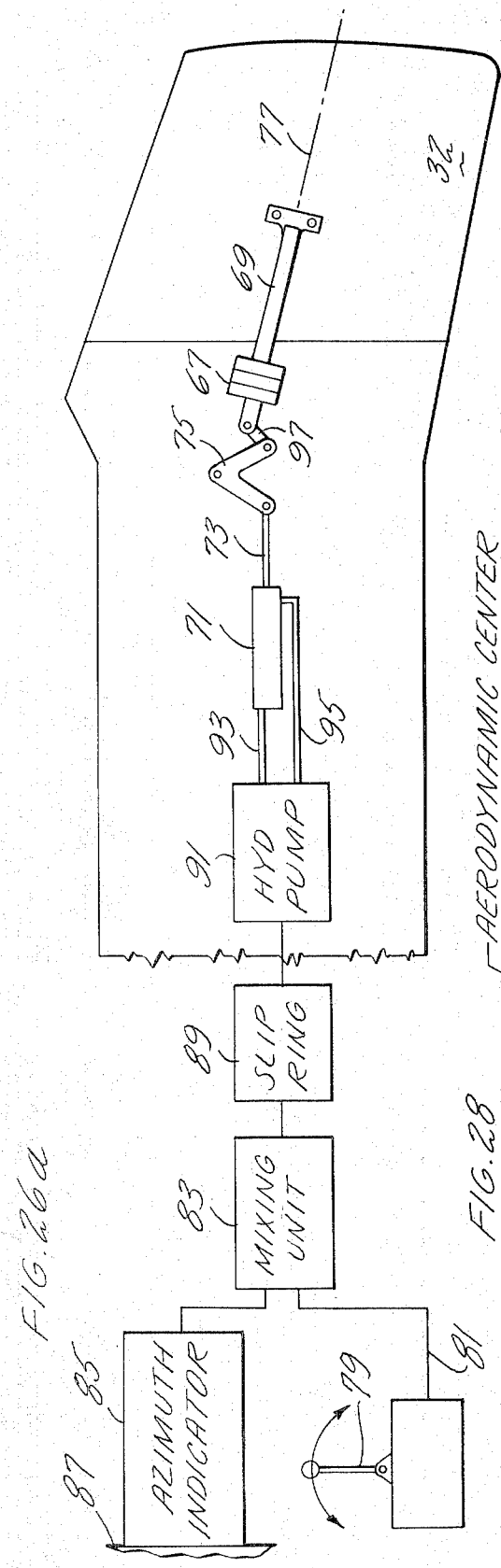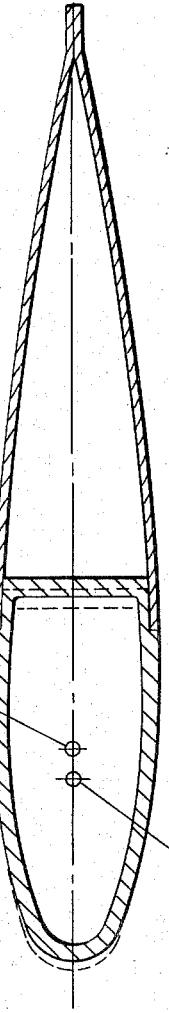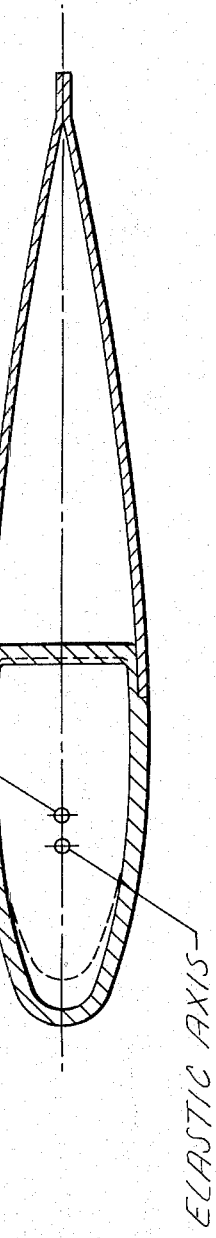
FIG.26a
FIG.28
FIG.29

HELICOPTER BLADE

This is a continuation-in-part of now abandoned parent case U.S. Ser. No. 182,618, filed Sept. 22, 1971, and entitled "Helicopter Blade," all of the subject matter thereof being incorporated herein by reference.

CROSS-REFERENCE TO RELATED APPLICATIONS

Some of the subject matter of this application is disclosed and claimed in the copending applications Ser. No. 182,777 of David T. Balch entitled "Helicopter Blade" and Ser. No. 182,776 of Robert A. Monteleone entitled "Blade for High Speed Helicopter," filed on even date herewith.

BACKGROUND OF THE INVENTION

1. Field of the Invention

This invention relates to helicopter blades and more particularly to a selectively shaped helicopter blade tip to produce greater rotor operating efficiency, less rotor generated noise and eliminates rotor instability in the hover mode of operation, and which is selectively swept in one embodiment disclosed to improve forward flight operation and eliminates the blade instability at high speed flight, which is fully described in the above-identified Monteleone application.

2. Description of the Prior Art

Conventionally, helicopter rotors are designed with constant planform and low linear twist. As a result, these rotors are inefficiently loaded in hover, with about 35 percent of the lift concentrated over the outer 10 percent of the rotor span. One of the major contributors to this inefficient loading distribution is interfering vortices which are shed from a preceding blade, and which roll up into a very concentrated vortex. This concentrated vortex moves rearward from every blade of the rotor and severely interferes with all of the following blades, but especially with the immediately following blade. This happens to all of the blades in the rotor and to all rotors with a finite number of blades. This type of loading causes two detrimental effects: (1) the blade sections outboard of the 85 percent span station become stalled, and (2) the remaining blade sections are loaded further outboard than is optimum for minimum induced power to produce lift.

While some effort has been made to relieve this condition for example, the six-bladed lift rotor (HLR) of Sikorsky Aircraft included a relatively high −14° substantially uniform twist throughout the blade span, there is still substantial room for improvement.

While the prior art includes helicopter blades having swept tips, blades which are twisted and which include some of the parameters of construction of my blade, none teach the combination of blade formation and shape which produces the highly desirable results of my blade. Furthermore, none of them recognize the severe detrimental effects of the interfering vortex existing in the hover operation condition, which, as will be shown, can be alleviated to improve rotor efficiency as is accomplished with my selectively shaped blade design. Many design features are placed in combination and work in cooperation to achieve a highly efficient rotor design. For example, U.S. Pat. No. 3,467,197 to Spivey, et al, teaches a helicopter blade having a tip which is swept forward and then aft to utilize the cosine effect to reduce blade aerodynamic drag. In contrast to the Spivey leading edge sweep, the entire tip of my blade is swept aft for the purpose of moving the aerodynamic center of the tip rearwardly to a station aft of the elastic axis and thereby reduce aerodynamic twisting moments which reduce the blade tip angle of attack, reduce the tip aerodynamic loads, and bring about more efficient rotor operation in a manner to be described in greater particularity hereinafter. While I show a blade with a leading edge which is swept forwardly and aft, this is done purely to accommodate a counterweight to maintain the blade mass balance about the elastic axis by counterbalancing the rearwardly swept tip. By utilizing a sufficiently dense counterweight, this objective of mass balance maintenance about the elastic axis could well be achieved within the confines of the airfoil section without the necessity for forward leading edge sweep. It is important to note that Spivey uses blade sweep to keep the pitching moments about the elastic axis at a minimum or at some desired predetermined value, contrary to our teaching. In addition, U.S. Pat. No. 3,399,731 to A. F. Giles, Jr., teaches a swept helicopter rotor blade but it is important to note that Giles does not state the degree of sweep, the beginning station of sweep, and he reduces the planform of the blade tip excessively. Giles uses neither camber nor twist, as is done in the blade of this disclosure. Further, U.S. Pat. No. 3,965,933 to P. E. Williams teaches a helicopter blade which is swept throughout its span first forwardly and then rearwardly and, while he uses blade camber, he uses what is accepted as reverse camber as opposed to the selected amount of normal camber in the opposition direction used herein.

SUMMARY OF THE INVENTION

A primary object of the present invention is to provide an improved rotor blade with a selectively shaped tip which increases rotor efficiency, reduces rotor noise and reduces or eliminates a rotor instability in hover. As tip sweep is required for high speed forward flight operation, this tip further improves rotor forward flight efficiency, reduces rotor noise and gust response, reduces blade control loads and eliminates a rotor instability in forward flight which manifests itself as a sub-multiple oscillation of the rotor tip path plane.

It is a further objective to teach the benefits of a rearwardly disposed aerodynamic center relative to the blade elastic axis along the entire blade span to further reduce blade vibratory control loads, and rotor gust response, and to further increase blade stability.

In accordance with the present invention, the blade tip portion is selectively shaped to increase local twist and thereby reduce the angle of attack and the local lift on the tip in hover, to increase the angle of attack and the loading of inboard stations, and to still further diminish the strength of the tip vortex and thereby reduce vortex interference and profile power losses on the succeeding blade. Further, the blade twist over the entire span of the blade is preferably increased over a conventional blade so as to shift span loading from the outboard stations toward the inboard stations, however, the selectively shaped tip will increase the performance of any blade which is operating in a stalled condition at the tip.

In accordance with the present invention, an improved blade is taught which in hover increases blade inboard loading and reduces blade outboard loading so that each blade span station is operating more efficiently and which accomplishes this same result in all forward flight regimes with the blade sweep taught herein.

In accordance with this invention, helicopter hover performance is increased by providing a blade tip which is of negative, nonlinear twist of values ranging between −1 and −8 degrees, which has a planform of substantially constant chord dimension throughout most of its span and which has a trapezoidal tip, which has a thickness between 6 and 10 percent chord dimension, and which has a forward camber to be of maximum camber at about the 27 percent chord station. This combination of tip twist, chord and forward camber is selected to provide a large margin between the operating angle of attack and the angle of attack at stall, i.e., stall margin, without introducing large aerodynamic pitching moments. Further, the blade twist is preferably increased to a higher than conventional degree throughout most of the blade span.

In accordance with the present invention, an improved helicopter blade is provided for hover and normal forward flight operation by utilizing a blade tip which has a negative nonlinear twist in the range between −1 and −8 degrees, a substantially constant chord dimension, a trapezoidal tip, a thickness between 6 and 10 percent chord dimension, and a moderate forward camber with maximum camber location forward of the 50 percent chord station. It is further preferable to increase the twist of most of the blade airfoil to about −14 degrees.

It is an object of this invention to teach an improved helicopter blade so as to reduce the loading on the blade tip and thereby bring the tip into an efficient range of operation, while providing a sufficient stall margin to allow for the practical problem of blade/rotor wake relative motion, and to increase the loading on the blade inboard of the blade tip, to a more efficiently loaded range so that all blade stations along the blade span will be doing more equal work.

It is a further object of the present invention to teach a blade tip modification for use with a high speed helicopter, which has the same twist, airfoil, thickness, chord and camber characteristics previously described but which is swept rearwardly so as to offset the tip lift vector from the blade elastic axis to further unload the blade tip producing a nose-up moment on the advancing side of the rotor disc, thereby diminishing the downward load, drag, and pitching moment of the tip and producing a nosedown moment both in hover and in forward flight on the retreating side of the rotor disc, thereby further increasing blade twist and alleviating tip stall, both together reducing overall blade control loads and wherein, more particularly, the swept tip commences at or outboard of the 87 percent span line, sweeps forward about 20° ± 15° to about the 93 percent span line, then sweeps aft about 20° ± 15° to the 100 percent span line or tip, and which preferably is still further mass balanced so that the effective chordwise center of gravity is located on or slightly forward of the elastic axis. It is further preferable to offset the lift vector (aerodynamic center) aft of the blade elastic axes over the entire blade span obtaining the same relative spanwise center of gravity position as noted above to achieve the same objectives as noted for the blade tip design.

Other objects and advantages of the present invention may be seen by referring to the following description and claims, read in conjunction with the accompanying drawings.

BRIEF DESCRIPTION OF THE DRAWINGS

FIG. 1b is a photograph presenting physical evidence of the existence of the interfering trailing vortex. The core of the vortex from a preceding blade is photographed from the center of the rotor and is shown passing under but near the following blade. The core is occasionally visible, as in the photograph, when certain atmospheric conditions prevail.

FIG. 1c is a photograph presenting additional physical evidence of the vortex and showing it passing under the following blade at about the 92 percent span station of a six-bladed rotor. The dark lines on the blade are located at 5 percent span intervals.

FIG. 16 is a schematic representation of the dynamic response of a rotor blade with tip twist washout when operating at high speed flight. The blade is elastic, the drag force forces the blade tip to lag rearward so that the lift and drag forces create blade pitching moments which further bend and twist the blade.

FIG. 17 is a schematic representation of the advancing blade tip displaced from the blade feathering axis and illustrates the loads and moments imposed thereon, and wherein the twisting moment about the feathering axis $M_{fa} = -M - D \cdot \Delta Z - L \cdot \Delta X$.

FIG. 18 is a graphic representation of blade tip torsional deflection and blade root torsional moment plotted against blade azimuth for both a low twist blade and a high twist blade.

FIG. 25 is a showing of my Beta Tip with mechanism to vary the tip planform between a constant planform and a trapezoidal tip configuration.

FIG. 26 is a showing of my swept tip modification.

FIG. 26a is a showing of my Beta Tip with mechanism to vary the tip twist as a function of rotor thrust forward speed and blade azimuth.

FIG. 28 illustrates one proposed construction to cause the blade aerodynamic center to be positioned slightly rearwardly of the elastic axis, wherein the spar forward and after walls are shifted slightly forwardly from their conventional positions.

FIG. 29 is an illustration of a second construction to produce a blade in which the aerodynamic center is positioned slightly rearwardly of the elastic axis and comprises thickening the spar forwardwall and thinning the spar afterwall, as shown in phantom lines, with respect to the conventional spar forwardwall and afterwall thicknesses shown in solid lines.

DESCRIPTION OF THE PREFERRED EMBODIMENT

To understand the significance of my improved rotor blade and the problems which it alleviates, it is deemed necessary to consider these problems. One class of problem encountered by conventional rotor blades are generally caused by the fact that conventional rotor blades are inefficiently loaded in hover. Conventional rotor blades, such as those shown in U.S. Pat. Nos. 2,754,917 and 2,754,918 are designed with a constant planform or chord dimension and low linear twist. As a result, these rotors are inefficiently loaded, with about 25 percent of the lift concentrated over the outer 10 percent of the rotor span. This type of loading causes two detrimental effects: (1) the blade tip sections outboard of the 92 percent span station become stalled causing large profile power losses, and (2) the blade stations inboard thereof are loaded further outboard than is optimum for minimum induced power to produce lift. By minimum induced power to produce lift we mean there is a blade spanwise lift distribution which will cause a more uniform downwash velocity distribution under the rotor and this distribution will allow the rotor thrust to be produced at the lowest possible increase in the total rotor slipstream kinetic energy.

The tip stall effect is caused by an intense vortex shed from the very tip of the preceeding blade, the center of this vortex intersects the following blade at about the 92 percent span station for six-bladed rotors. Although my finite span lifting wing sheds a tip vortex, the high tip loading of the rotor blade causes an intensification of the trailing vortex. When the trailing vortex passes the following blade it causes a change in the local angle of attack, $\alpha$, such that, outboard of the vortex center, $\alpha$ is reduced. When rotor thrust is increased to operational levels, premature stall can be caused by this trailing vortex effect at the tip of the blade being intersected thereby.

Figure 1:
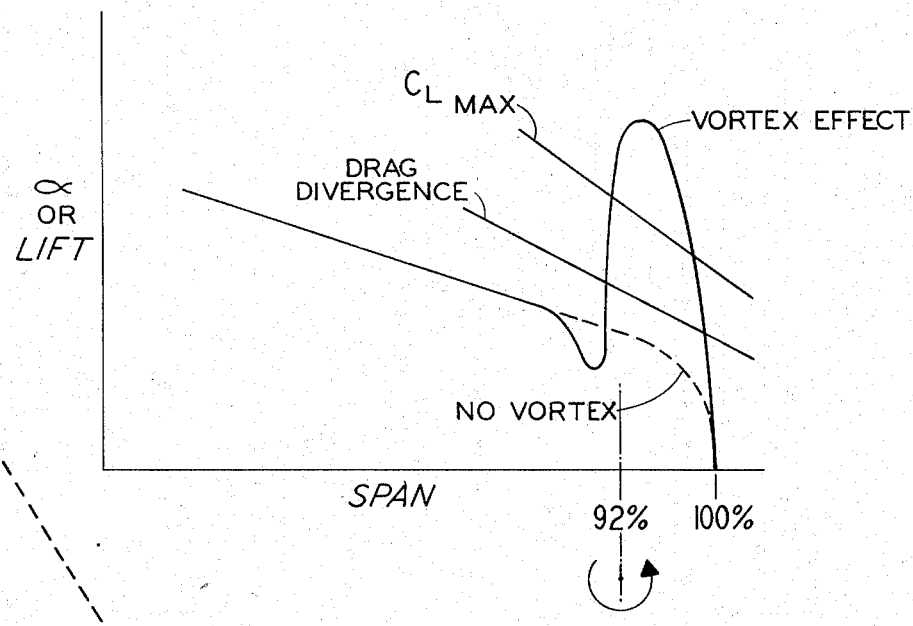
FIG. 1 is a graph illustrating the effect of a trailing vortex on the local angle of attack near the tip of a helicopter blade.

This stall effect can best be understood by viewing FIG. 1. FIG. 1 is a plot of the vortex effect on the tip loading of a six-bladed helicopter rotor, with the blade span shown on the horizontal coordinate and the blade angle of attack, $\alpha$, or lift shown on the vertical coordinate. It will be noted that a line designating "$C_{L\ max}$"

is shown on the graph, as is a line designating "drag divergence." The meaning of these terms and the significance thereof is as follows: "$C_{L\ max}$" is the highest lift the rotor blade section is capable of producing. Drag divergence is the rapid increase of blade section drag which results in a rapid increase of the power required to maintain flight. It will also be noted by viewing FIG. 1 that a dotted line is indicated to show the angle of attack at the blade tip in a "no vortex" situation. A schematic representation of the trailing vortex illustrating the sense of rotation is shown at the 92 percent span station in FIG. 1 and it will be noted from the arrowheads thereon that the effect of this vortex is to impose an increased angle of attack on the blade outboard of the 92 percent chord station and a reduced angle of attack just inboard of the 92 percent chord station. The result of having this high angle of attack immediately outboard of the 92 percent span station causes blade tip stalling and high profile power losses because the angle of attack at this point has been increased beyond the angle of attack which corresponds to the maximum lift coefficient of the airfoil.

Figure 1A:
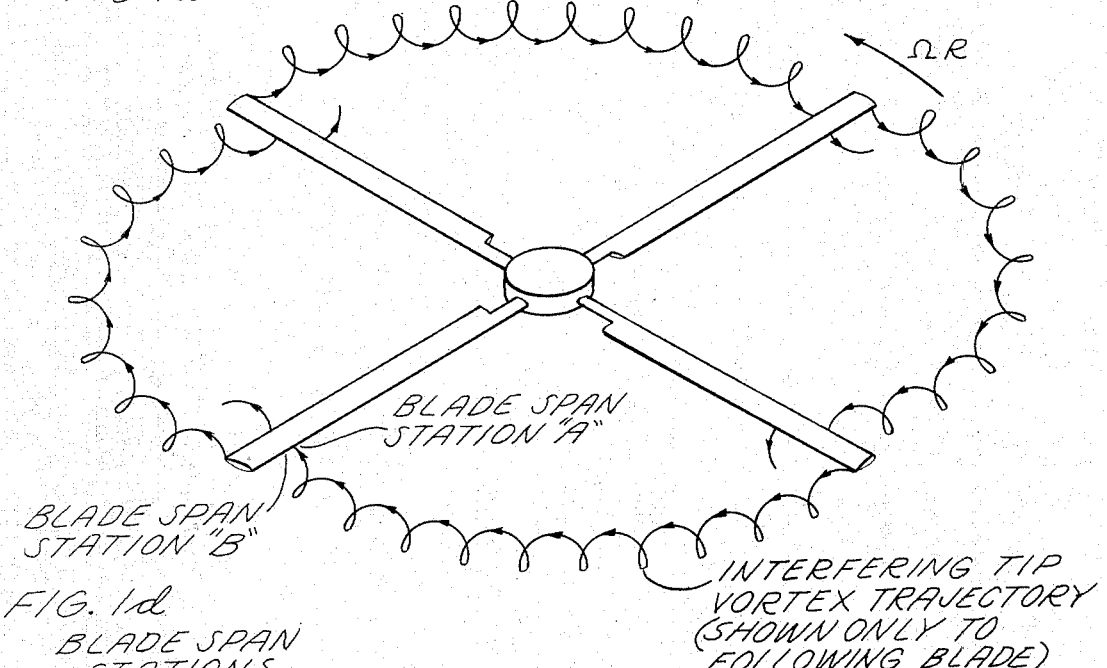
FIG. 1a is a schematic showing of a four-bladed rotor to illustrate the strong trailing vortex shed from the tip of each blade of the rotor system and that in the low wind hovering situation, this vortex passes under and very near the following blade inboard from but in the neighborhood of the blade outer span stations.
Figure 1D:
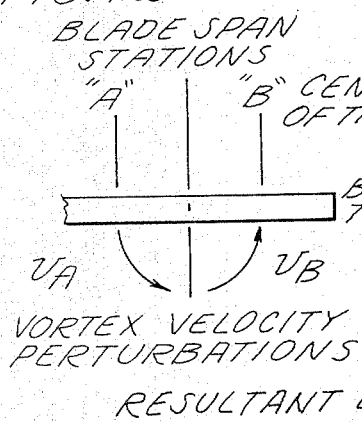
FIG. 1d is a sketch illustrating the vertical velocity perturbations to the blades' local velocity caused by the vortex.
Figure 1E:
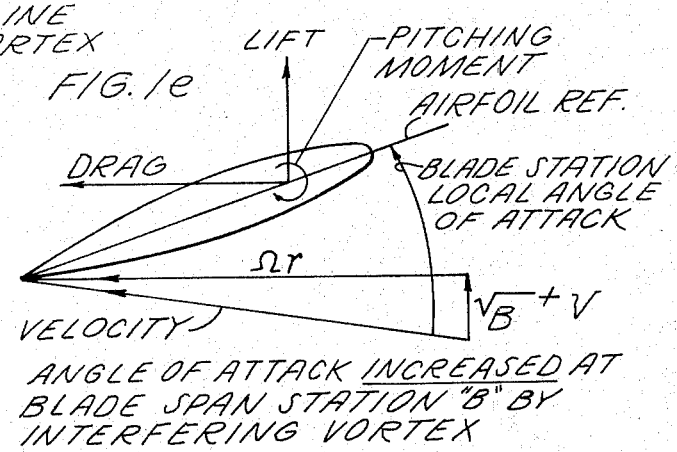
FIG. 1e is a sketch of a blade cross section to show the change in the direction of the local resultant velocity over the blade due to the interfering vortex at stations outboard of the centerline of the vortex, which results in a large increase local angle of attack.
Figure 1F:
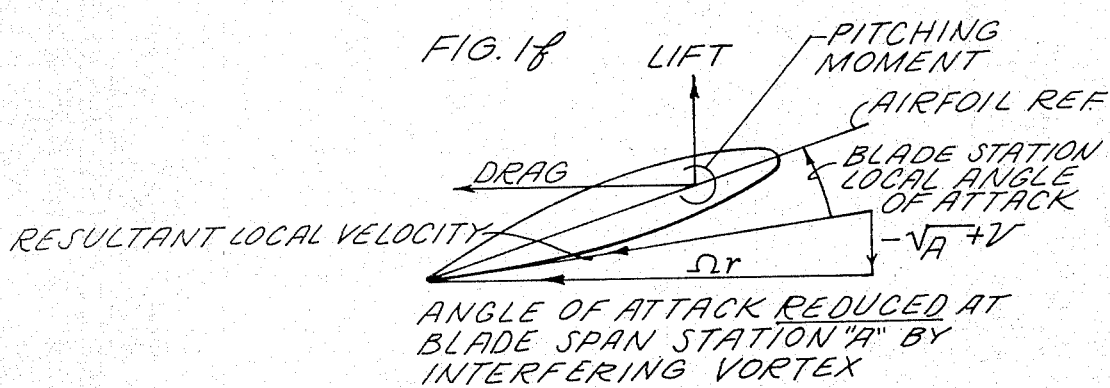
FIG. 1f is a sketch of a blade cross section to show the change in the direction of the local resultant velocity over the blade due to the interfering vortex for blade stations, inboard of the centerline of the vortex, which results in a large decrease in local angle of attack.

For a most dramatic and forceful consideration of the interfering tip vortex problem, attention is directed to FIGS. 1a through 1f. FIG. 1a illustrates that the vortex shed from the tip of each blade passes immediately below the following blade at a station just inboard of the tip. FIG. 1d illustrates the effect of the vortex acting upon the blade station of the following blade which it contacts or passes near. It will be noted that the vortex indeed creates a spanwise counterclockwise moment as shown in FIG. 1d about the blade station through which the centerline of the vortex passes. FIGS. 1e and 1f show the various aerodynamic components which act upon the blade at inboard span station a and outboard span station b, respectively, to show that while a reduced angle of attack occurs at station a due to the interfering vortex, an increased angle of attack occurs at station b due to the interfering vortex. It will accordingly be seen that in a relatively small region of blade span, the vortex has an opposite effect upon the blade angle of attack. As dramatic evidence of the existence and operation of the shed tip vortex, attention is called to FIGS. 1b and 1c which are photographs showing the core of the shed vortex being shed by one blade and passing immediately under the following blade at substantially the 92 percent span station. Photographs such as FIGS. 1b and 1c can be taken only under select atmospheric conditions since the vortex is visible only under these conditions. These particular photographs are actually taken from frames of a motion picture which was being taken of the rotor blades shown when the unique atmospheric conditions occurred which make the tip vortex visible.

To achieve minimum induced power to produce the necessary lift, it is necessary to shape the blade so that the load distribution along the blade span is such that all blade sections are producing equal lift per unit of energy expended to produce lift (induced horsepower). As previously stated, in conventional rotors, the outer 10 percent of the rotor span is producing about 25 percent of the lift and is therefore doing more than its share of the work. To achieve minimum induced power, we must unload this outer span portion and increase the loading on the blade span stations inboard thereof so as to achieve a more uniform velocity distribution under the rotor. The trailing vortex, of course, complicates achieving this situation since it perturbates the local velocity distribution. FIG. 1 clearly indicates that conventional rotor blades do not achieve the more uniform load distribution required to accomplish minimum induced power.

In an attempt to accomplish more uniform load distribution throughout the blade span, a helicopter blade was fabricated and used in a rotor which will be identified herein as the Heavy Lift Rotor (HLR) and which had a substantially linear twist of about −14° throughout the blade span. Conventional helicopter blades have a twist of about −6°, uniformly throughout the span. The rationale in fabricating the HLR was to utilize the concept that the rotor hover efficiency can be increased by moving the blade span loading inboard through increased blade twist.

Figure 2:
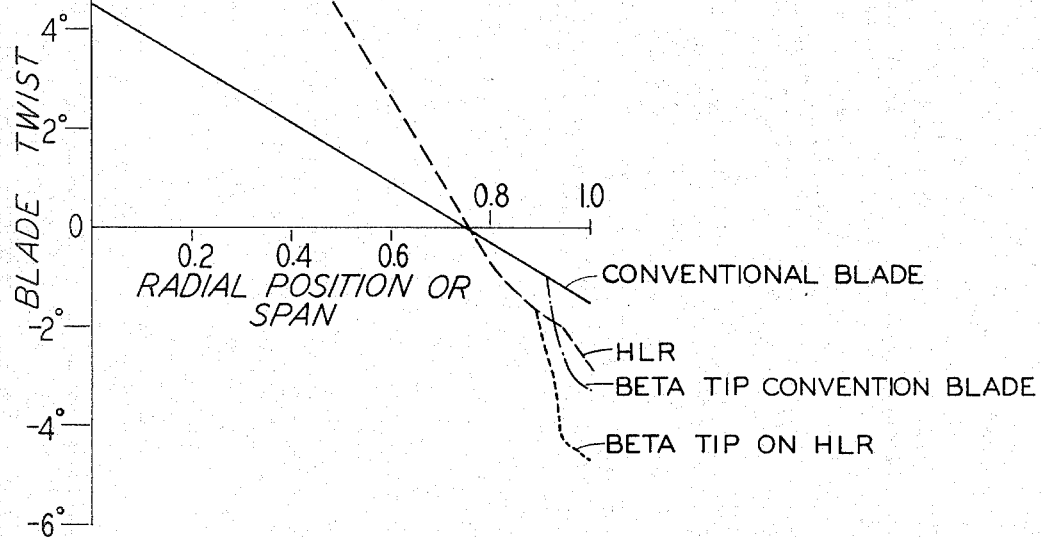
FIG. 2 is a graph comparing the span and tip twist of a conventional helicopter blade, the HLR blade, and my Beta Tip on the HLR blade and also on the conventional helicopter blade.

A comparison of the twist in the conventional blade and the HLR blade is shown in FIG. 2, and it will be noted that the HLR is of increased twist throughout its span over the conventional blade.

Figure 3:
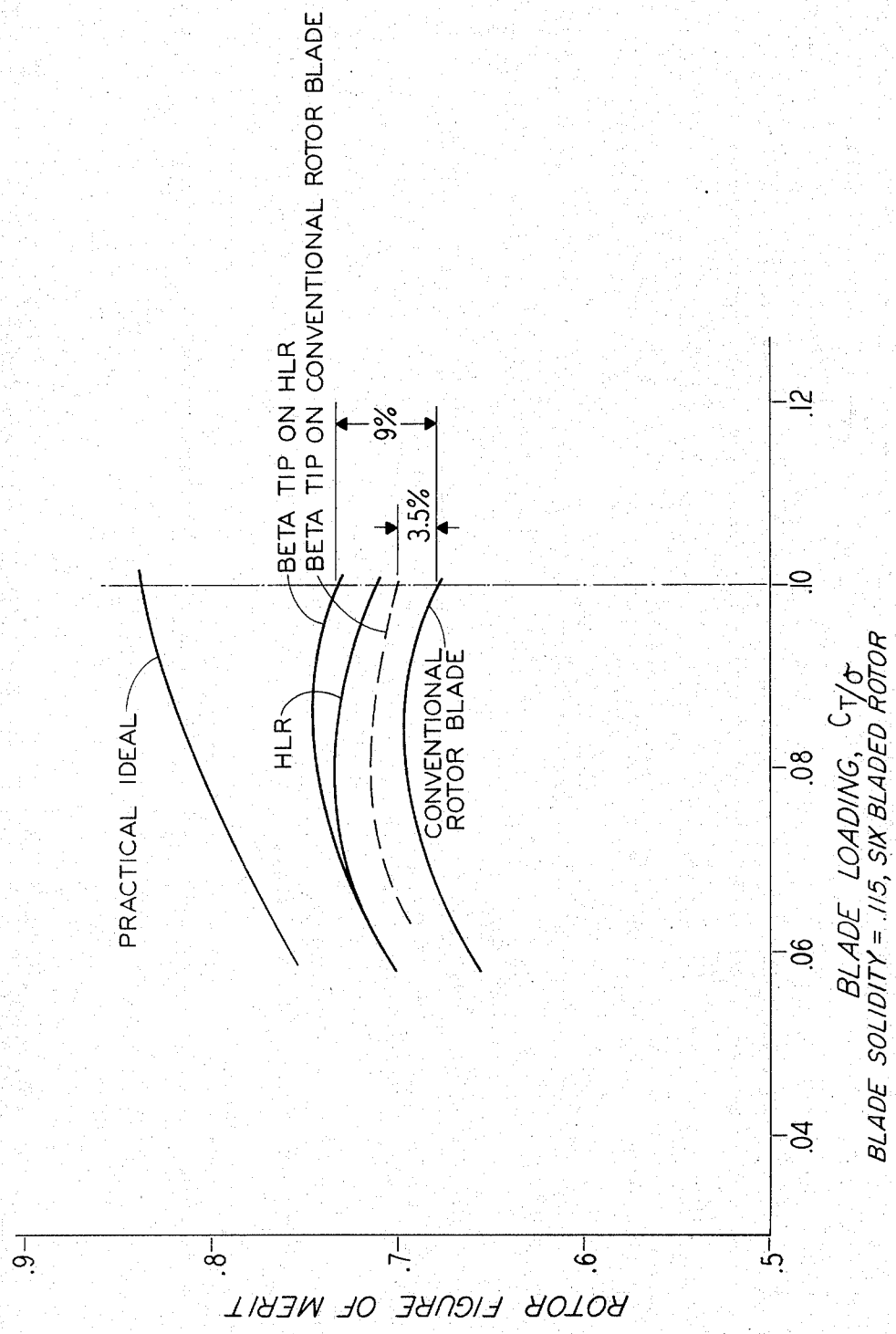
FIG. 3 is a graph comparing the rotor lifting efficiency in hover at various blade loadings of a conventional helicopter blade, the HLR blade, my Beta Tip blade, and a comparable theoretically ideal blade for minimum induced and profile horsepower, all for six-bladed rotors.

The HLR blade was tested against the conventional rotor blade and, as is shown in FIG. 3, where blade loading is plotted against rotor efficiency in terms of figure of merit, it will be noted that the HLR blade is more efficient than the conventional blade. FIG. 3 clearly shows that the HLR experiences a falloff in efficiency at heavy blade loading loads, because the blade is experiencing stall at these loads. It was therefore realized from these tests of the HLR blade that, as will be shown hereinafter, while increasing blade twist throughout the full span produced desirable increased inboard loading, the HLR blade did not reduce blade tip stall sufficiently. It was therefore realized that further improvement need be made in the blade tip area, where the blade loading and hence stall problem is the most severe.

To better understand FIG. 3, it should be realized that "rotor figure of merit" means the ratio of the induced power required to produce a given amount of thrust if the air were uniformly accelerated through the rotor disc around the azimuth to the actual total power required induced plus profile by the particular helicopter rotor to produce a given amount of thrust. Further, with respect to FIG. 3, in the designation $C_T/\sigma$, which is indicative of blade loading, $C_T$ represents the loading of the rotor disc nondimensionalized and $\sigma$ represents the ratio of rotor blade area to rotor disc area.

To alleviate the tip stall encountered in the HLR as depicted in FIG. 3, a new blade tip was designed to be used therewith. This tip is the important teaching of my invention and we designated it the Beta Tip.

The Beta Tip, when used with the −14° twist HLR blade, proved to have three major advantages in hover. First, the Beta Tip rotor demonstrated a 4 percent improvement in rotor figure of merit (efficiency) over the HLR and a 9 percent improvement over a conventional rotor at $C_T/\sigma$ blade loadings equal to 0.1. Secondly, the Beta Tip rotor generated from 5 to 8 PNdb less noise than a conventional rotor during hover at a nominal tip speed of 715 fps. Thirdly, the Beta Tip rotor did not encounter instabilities in hover throughout the range of testing, while the conventional rotors had encountered this instability. Similar improvements in performance and noise have been demonstrated using these design concepts on main rotors with from three to six blades and with blades of lower twists and on tail rotors. These advantages and the reasons therefor will be discussed in greater particularity hereinafter. Subsequent work on the Beta Tip reveals that it will improve the performance on all blades that are operating in a stalled or poor lift-to-drag ratio condition at the tip, such as is encountered at high Mach numbers, and/or at high advance ratios (μ) and/or at negative angles of attack on the advancing blade, and/or at near maximum lift capacity in hovering or low speed flight.

Figure 5:
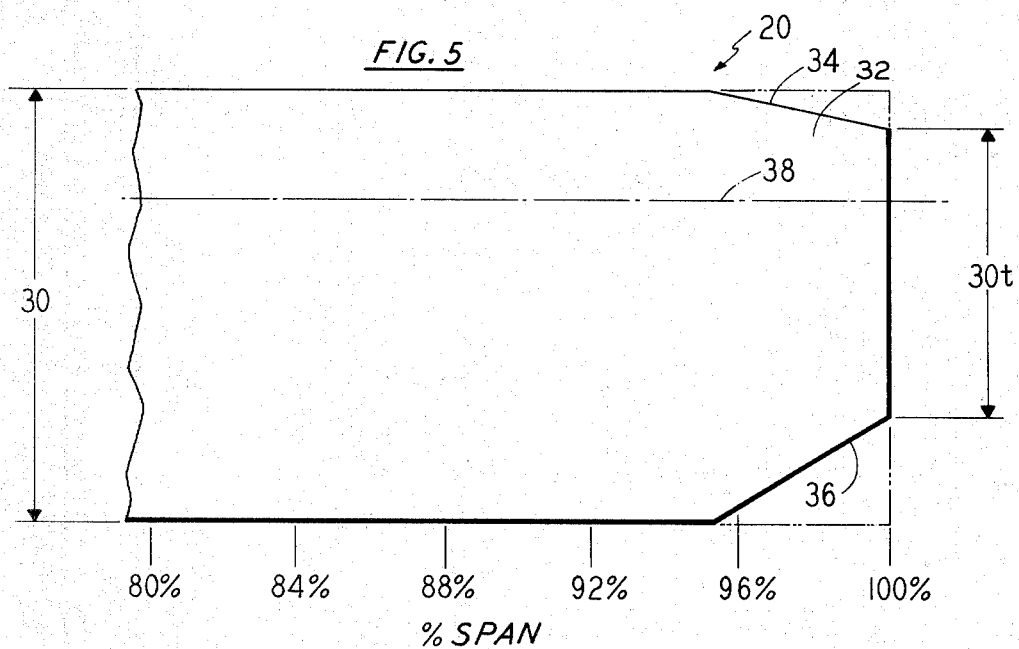
FIG. 5 illustrates the planform of the tip portion of my Beta Tip blade, for operational cruise speeds in the order of 80 to 120 knots.

For a helicopter which is intended to operate in hover and normal forward flight, the trapezoidal tip shown in FIG. 5 is desirable and the first part of my description will relate thereto. In helicopters which are intended to operate at a very high forward speed, such as above 150 knots, the modified blade shown in FIG. 19 might be preferable and will be discussed in the latter part of my description. Further, while I will be describing my selectively shaped blade tip as being attached to each −14° twist blade of the six-bladed HLR, it should be understood that beneficial results would be achieved by utilizing my blade tip on any helicopter blade which is operating in a stalled condition in hover. Further modifications are discussed hereinafter for a design that separates in high cruise speed flight.

Figure 4:
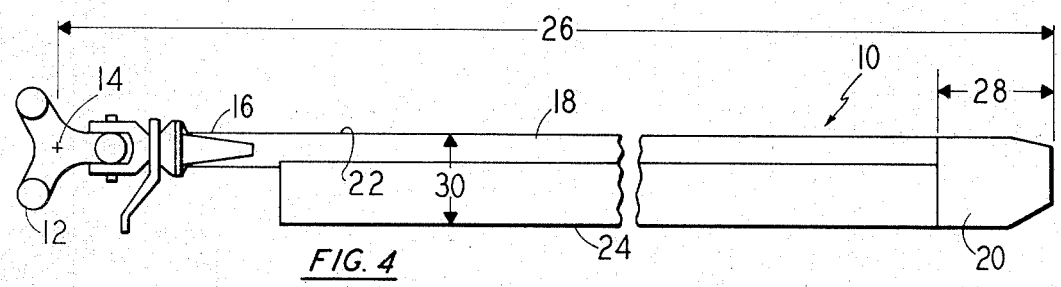
FIG. 4 is a plan view of my Beta Tip helicopter blade and its preferred embodiment, for operational cruise speeds in the order of 80 to 120 knots.

My helicopter rotor blade is shown in FIG. 4 to comprise blade 10 projecting from and connected to hub 12 so as to be rotatable therewith about rotor axis of rotation 14 and to coact with a plurality of similar, and preferably identical, blades to form the helicopter lift rotor. Blade 10 may be generally of the type more fully described in U.S. Pats. Nos. 2,754,917 and 2,754,918 and consists of root section 16, which is attached to the rotor hub 12 in conventional fashion, central portion 18, which projects radially outwardly from the root portion 16, and tip portion 20. Blade 10 includes leading edge 22, trailing edge 24, and is of airfoil cross section so as to create lift for helicopter operation during rotation. The blade span is indicated by reference numeral 26, the tip portion span is indicated by reference numeral 28, and the blade and tip chord is indicated by reference numeral 30.

The Beta Tip blade 10 is unique in construction in blade twist, tip twist, planform, airfoil shape and thickness. These parameters will be discussed individually. It should be borne in mind that the tip portion of the Beta Tip blade comprises about the outer 20 percent of the blade span and that the Beta Tip blade is actually the unique Beta Tip attached to the HLR blade.

The twist of the Beta Tip blade 10 is best appreciated by viewing FIG. 2. It will be noted that the twist of the airfoil shape of the blade starts at approximately the 25 percent span station. From the 25 percent span station to the 87 percent span station, the blade twist is a uniform twist of about −14° and, commencing at the 87 percent span station and extending to the blade tip, the blade twist is nonlinear and negative between the −1° and −8° limits. In the preferred embodiment, as shown in FIG. 2, the local twist angle of the blade tip on the HLR, starting at the 87 percent span station, increases from −1.5° in a uniform manner until the 95 percent span station where the local twist angle is −4.2°. From the 95 percent span station to the tip, the blade twist also increases uniformly but at a different rate such that the tip local twist angle is −4.7°.

My evaluation of the performance of Beta Tip blade 10 reveals that highly improved blade performance can be achieved throughout given ranges. For example, the inboard blade twist can range from 0° to 20°, the unique tip twist can commence at the 87 percent span station ± 2 percent for six-bladed rotors. The Beta Tip twist as described above has the following ranges specified at discrete spanwise stations. These ranges vary uniformly between the specified stations:

$X = 87\%$    range ± 1 degree
$X = 89.5\%$    range + 3 degrees, −.5 degrees
$X = 95\%$    range ± 2 degrees
$X = 100\%$    range +.3 degrees, −1 degree When the number of blades on the rotor is less than six, the interfering vortex will intersect the following blade further inboard because the blade spacing has increased and the tip vortex trajectory is moving closer to the center of the rotor as a result of wake contraction. If the number of blades on the rotor is greater than six, the intersection point moves further outboard. Therefore, the discrete spanwise stations for specifying the twist ranges vary at least with the number of blades and will be given later. It is also known to vary as blade loading, $C_T/\sigma$, which is the reason for including a spanwise tolerance. The planform of Beta Tip 20 is best shown in FIG. 5. The planform is of constant chord 30 from the 80 percent span station to about the 95 percent span station. From the 95 percent span station ± 2 percent, the planform becomes trapezoidal so as to define a trapezoidal tip with a 40 percent chord reduction. Accordingly, in our preferred embodiment, chord 30 is 26 inches while the tip chord 30t is 15.6 inches for the HLR. The trapezoidal tip 32 provides a swept tip with a leading edge rearward sweep at surface 34 and a trailing edge forward sweep at surface 36. The surfaces 34 and 36 are selectively directed so that the center of lift of the trapezoidal tip remains along the 25 percent chord line 38, which is the same chord location for the center of lift for the remainder of tip 20 and blade 10. While the trapezoidal tip shown in FIG. 5 proved very successful in operation, there is evidence that when the rotor is operated at high blade loadings in hover and low speed forward flight operations, a constant planform tip may be preferred as shown in phantom in FIG. 5.

Figure 20:
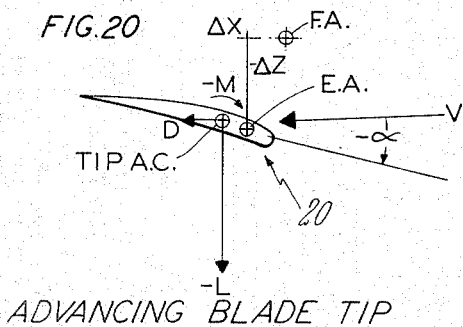
FIGS. 20 and 21 are schematic representations of the loads and moments acting upon the advancing blade tip and the hovering and retreating blade tip, respectively, of the blade fabricated to the FIG. 19 construction demonstrating the angle of attack reducing moment from the rearwardly disposed lift vector, which unloads the blade reducing blade stall and adverse blade vibratory control loads among other benefits described.
Figure 21:
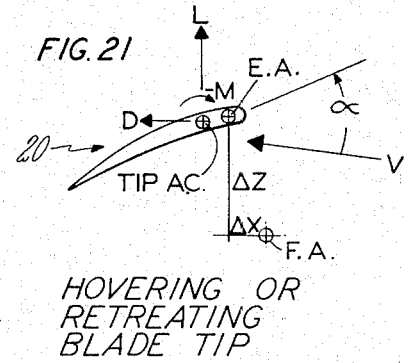

The airfoil or cross-sectional shape of Beta Tip 20 is of major importance. While the airfoil of the central portion 81 of blade 10 is the HLR airfoil and may be described NACA 0011, modified, the airfoil of Beta Tip 20, commencing at the 82 percent span station to the blade tip, has a thickness of 9.5 percent chord dimension and a moderate camber with a maximum camber station located forward of the blade 50 percent chord station so as to provide an increased maximum lift coefficient and increased stall margin, and so as not to produce a pitching moment coefficient greater than 0.03. The thickness can actually vary between 6–10 percent chord dimension, but 9.5 percent is preferred. The maximum chamber is preferably 0.08 ± 0.05 percent chord dimension at the chord 27 percent station. Preferably, the camber of the entire blade is positive and maximum forward of the 50 percent chord station as shown in FIGS. 20 and 21, and preferably as just described for the blade tip.

The selected airfoil shape for blade tip 20, commencing at the 82 percent span station and to the tip, is defined as SC—1095 and is described and claimed in a patent application entitled "Helicopter Blade" filed on even date in the name David T. Balch. The airfoil SC—1095 may be defined by the coordinates:

| X/C | $Y_u/t$ | $Y_L/t$ |
|---|---|---|
| .0125 | .1863 | −.1526 |
| .025 | .2737 | −.221 |
| .05 | .387 | −.2993 |
| .075 | .45 | −.3395 |
| .1 | .4926 | −.3642 |
| .15 | .5442 | −.3937 |
| .2 | .5734 | −.4087 |
| .25 | .5842 | −.4147 |
| .3 | .5815 | −.4122 |
| .4 | .5578 | −.3959 |
| .5 | .5109 | −.3627 |
| .6 | .4434 | −.3145 |
| .7 | .3553 | −.2509 |
| .85 | .2486 | −.1745 |
| .9 | .1345 | −.0905 |
| .975 | .0345 | −.0244 | where $X$ is a chord station measured from the blade leading edge, $C$ is the chord dimension, $t$ is maximum blade thickness, $Y_u$ is the upper airfoil location at station $X$ and $Y_L$ is the lower airfoil location at station $X$ and where the leading edge radii can be defined by the following equations:

leading edge radius upper: $\rho_u/c = (t/c)^2 \, 1.108$
leading edge radius lower: $\rho_L/c = (t/c)^2 \, 0.7313$ where $\rho_u$ is the leading edge radius of the blade upper airfoil section taken from a point on the blade chord, wherein $C$ is the chord dimension, wherein $t$ is maximum blade thickness and where $\rho_L$ is the leading edge radius of the blade lower airfoil section taken from a point on the blade chord and within a range of ± 3 percent of the values of $Y_u/t$, $Y_L/t$, $\rho_u$ and $\rho_L$ so determined.

The airfoil SC—1095 may also be defined by the equation:

$$0 \leq \frac{x}{c} \leq .25 \begin{cases} \frac{y_u}{c} = \frac{t}{c}\left[ 1.307\sqrt{\frac{x}{c}} + 3.767\frac{x}{c} - 46.7\left(\frac{x}{c}\right)^2 + 201.3\left(\frac{x}{c}\right)^3 - 316.8\left(\frac{x}{c}\right)^4 \right] \\ \frac{y_L}{c} = \frac{t}{c}\left[ -1.162\sqrt{\frac{x}{c}} - 2.256\frac{x}{c} + 37.2\left(\frac{x}{c}\right)^2 - 170.2\left(\frac{x}{c}\right)^3 + 272.9\left(\frac{x}{c}\right)^4 \right] \end{cases}$$

$$.25 \leq \frac{x}{c} \leq 1.0 \begin{cases} \frac{y_u}{c} = \frac{t}{c}\left[ 6.6134\left(\frac{x}{c}\right) - 28.04\left(\frac{x}{c}\right)^2 + 56.42\left(\frac{x}{c}\right)^3 - 56\left(\frac{x}{c}\right)^4 + 21.15\left(\frac{x}{c}\right)^5 \right] \\ \frac{y_L}{c} = \frac{t}{c}\left[ -4.7661\left(\frac{x}{c}\right) + 20.53\left(\frac{x}{c}\right)^2 - 41.92\left(\frac{x}{c}\right)^3 + 42\left(\frac{x}{c}\right)^4 - 16\left(\frac{x}{c}\right)^5 \right] \end{cases}$$

where $X$ is a chord station measured from the blade leading edge, $C$ is the chord dimension, $t$ is maximum blade thickness, $Y_u$ is the upper airfoil location at station $X$, and $Y_L$ is the lower airfoil location at $X$ and where the leading edge radii can be defined by the following equations:

leading edge radius, upper: $\rho_u/c = (t/c)^2(.01/.095^2)$
leading edge radius, lower: $\rho_L/c = (t/c)^2(.0066/.095^2)$ where $\rho_u$ is th leading edge radius of the blade upper airfoil and $\rho_L$ is the leading edge radius of the lower blade airfoil, both taken from a point on the blade chord and within a range of ± 3 percent of the values of $Y_u$, $Y_L$, $\rho_u$ and $\rho_L$ so calculated.

This airfoi shape may be used over the entire balde span with the same benefits.

Figure 6:
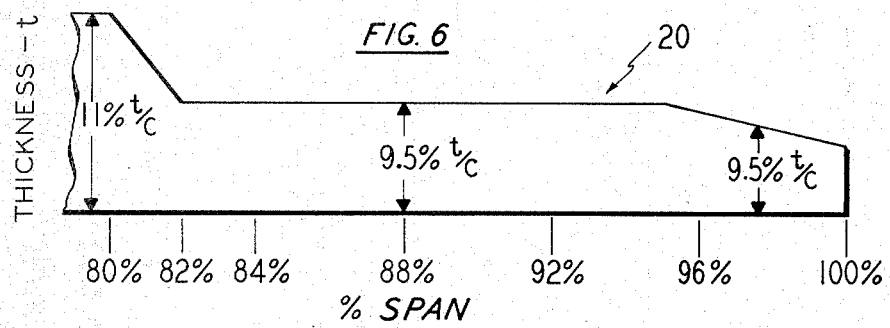
FIG. 6 illustrates the thickness distribution of the tip portion of my Beta Tip blade.

The thickness distribution of blade tip 20 is best depicted in FIG. 6. Blade 10 is of thickness 11 percent of the chord dimension inboard of the 80 percent span station. Tip 20 transists from 11 percent chord dimension thickness at the 80 percent span station uniformly to 9.5 percent chord thickness at the 82 percent span station and remains at 9.5 percent thickness to the 100 percent span station. Outboard of the 95 percent span station, the thickness reduces since the chord is reducing and the thickness ratio remains constant at 95 percent.

This airfoil has two desirable dimensional aerodynamic characteristics in that at blade tip Mach numbers 0.3 and 0.6, the maximum lift coefficient, $C_{L \, max.}$, is at least 1.41 and 1.0, respectively, and the drag divergence Mach number is at least 0.76 at a lift coefficient of 0.2.

While the SC—1095 airfoil has proven satisfactory for my Beta Tip blade, there could well be other airfoils which would also demonstrate improvement over the conventional blade if they were to follow the structural criteria now to be described. The Beta Tip should have a twist outboard of the 87 percent station which would be a negative twist starting at −1 and increasing uniformly in a negative direction to about −8°. The planform of the Beta Tip should be constant chord with a trapezoidal tip commencing at about the 95 percent span station and reducing in chord dimension about 40 percent of the 95 percent span station chord. The airfoil should have a moderate camber with its maximum camber station in the forward part of the airfoil so that the combination of maximum camber and maximum camber location does not produce a pitching moment coefficient greater than ±0.03 before moment divergence but does increase blade section maximum lift coefficient. The thickness of the tip should be between 6 to 10 percent of the chord dimension. With respect to preferred thickness distribution, reference will now be made to FIGS. 7 and 8.

If the blade tip is to be operated near Mach 0.9, then the thickness ratio should be low to alleviate compressibility effects. However, other modes of operation will require this same tip to operate at lower Mach and high lift coefficients. Since maximum lift coefficient is generally increased as thickness increases, up to a particular limit, the tip airfoil section must be designed so that it has improved high Mach number as well as low Mach number aerodynamic characteristics. This must be achieved without introducing large pitching moments at the balde tip since large oscillatory loads will be introduced due to the large change in local velocity and, hence, dynamic pressure realized around the blade azimuth. Forward positive camber generally increases maximum lift coefficient without introducing large increases in pitching moment. These benefits can be realized over the entire blade by employing this airfoil over the entire span.

Figure 7:
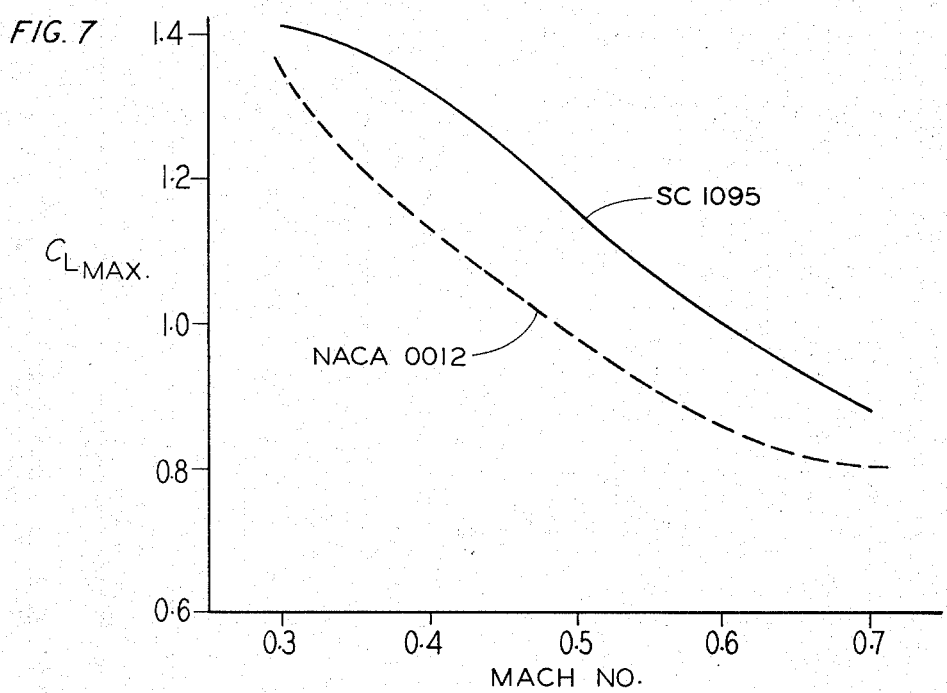
FIGS. 7 and 8 are companion graphs which compare the two dimensional aerodynamic characteristics of the advanced "Beta" tip airfoil section with the standard NACA 0012 airfoil section. A comparison of the maximum lift coefficient and the lift coefficient at drag divergence ($dc_d/dc_m = 0.01$) are shown as a function of Mach number.
Figure 8:
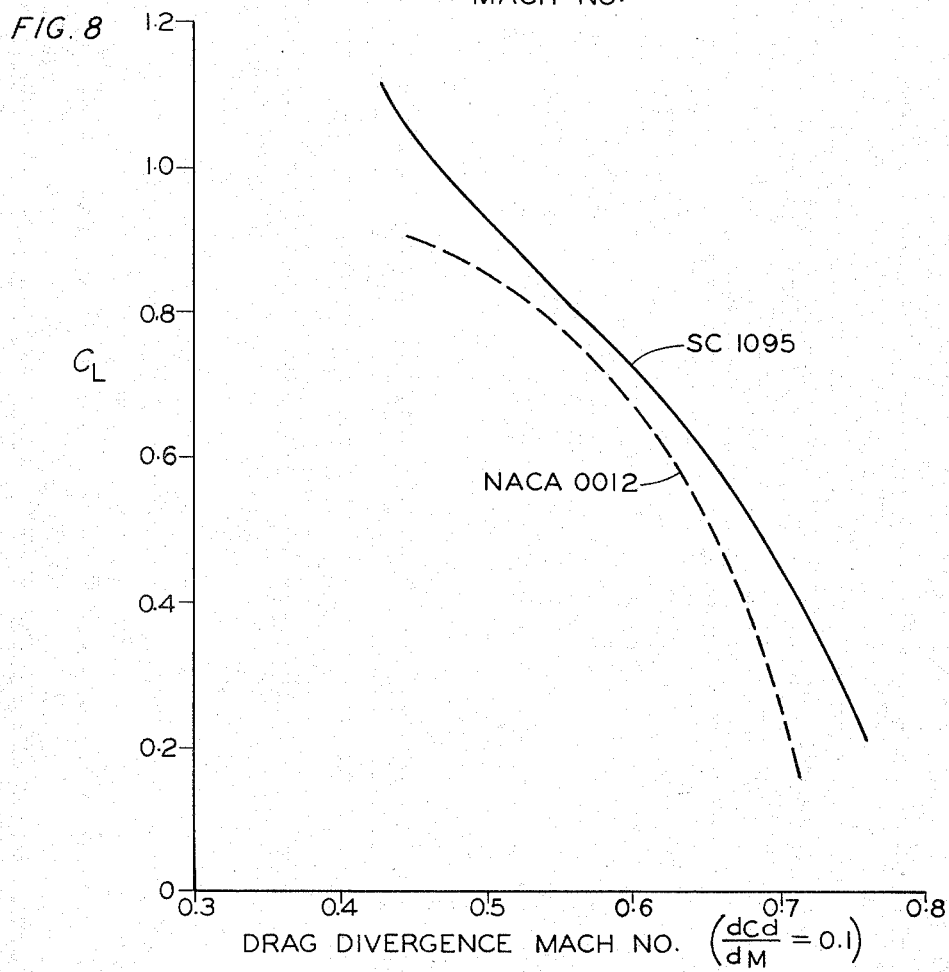

FIGS. 7 and 8 show that the SC—1095 airfoil, a relatively thin airfoil, 9.5 percent with forward camber satisfies these requirements. The $C_{L\ max}$ is increased at least 10 percent over the entire range of Mach number over the NACA 0012 airfoil. The drag divergence Mach number has also been increased substantially at high Mach number. Both characteristics were achieved with the same airfoil while the pitching moments before moment divergence never exceeded ±0.03. The exact selection of tip thickness will depend on the importance of each mission operating condition, i.e., the operating time at each forward speed, and availability of specific airfoils to match these requirements. The preferred Beta Tip thickness was selected based on the performance of the improved SC—1095 airfoil.

The rearward or after sweep of surface 34 of the trapezoidal tip shown in FIG. 5 is preferably 7° ± 7° and the forward sweep of surface 36 is preferably 20°, +10°, −20°.

As best shown in FIG. 3, when the Beta Tip blade was tested it compared favorably with both the conventional blade and the HLR blade. It will be noted that while the Beta Tip blade encountered some degree of stalling in the high load mode of operation, the onset of stall occurred at a higher blade loading than that encountered in the HLR blade, and, accordingly, the lifting capability of the Beta Tip is superior to both the HLR and the conventional blade over the complete blade load range. When this same blade was tested at three and five blades, the same general improvements in rotor performance and noise were demonstrated. The Beta Tip on the conventional rotor also demonstrated similar improvements over the conventional rotor. This blade design concept was incorporated for a tail rotor resulting in large performance and noise improvements. In addition, FIG. 3 also designates the operating characteristic line of the theoretically ideal rotor, which, of course, is a nonexistent rotor which experiences none of the problems of and has none of the disadvantages of existing rotor blades.

As previously stated, testing of the Beta Tip blade revealed improvement in three areas in hover; namely, rotor performance, rotor noise and elimination of blade instability. The details of these three areas of improvement will now be discussed.

Since hover performance improvement was the main objective of the Beta Tip blade, the facets of blade structure which cooperated to produce the demonstrated improvement in hover operation will now be discussed.

The first structural change to the conventional blade which cooperated in producing the hover performance improvement that is shown in FIG. 3 was an increase in twist throughout the blade span. This was clearly demonstrated by our test comparisons of the conventional balde with the HLR. Increased overall blade twist shifts the blade span loading from the outboard stations toward the inboard stations. Our test results showed that the HLR blade with increased overall span twist was an improvement over the conventional blade in that it produced significantly increased rotor efficiency over a wide range of blade loadings.

The effect of increased local tip twist was demonstrated by the test results we obtained in comparing the Beta Tip rotor to the HLR and the Beta Tip on the conventional rotor to the conventional rotor. The aerodynamic angle of attack and the local lift are significantly reduced for the Beta Tip. The tip twist washout forces a lower tip angle of attack and an increased inboard span station angle of attack. The spanwise loading shows a similar decrease at the blade tip and increase at inboard span stations. An additional advantageous effect of reduced tip loading in the Beta Tip is a lower trailing tip vortex strength located closer to the following blade which, in the net, further reduces the local upwash from the vortex and the tip angle of attack. This further reduction in vortex interference reduced profile power losses. This angle of attack and load distribution advantage of the Beta Tip rotor over the High Lift Rotor and of the High Lift Rotor over the conventional rotor can be seen by viewing FIGS. 9 and 10, where these rotors are operating at a tip speed of 0.625 Mach number and generating a thrust of 51,400 pounds. Although the HLR twist distribution significantly increases the inboard loading, it is important to note that the tip loading only reduced a small amount. Therefore, the HLR is encountering tip stall. The Beta Tip has a much lower tip angle of attack and also a lower angle of attack variation at the tip. This reduction is enough to significantly reduce profile power losses at the tip. The lower tip angle of attack variation indicates a lower tip vortex strength. These are the major reasons for the improved hover efficiency of the Beta Tip as suggested by analysis.

Figure 9:
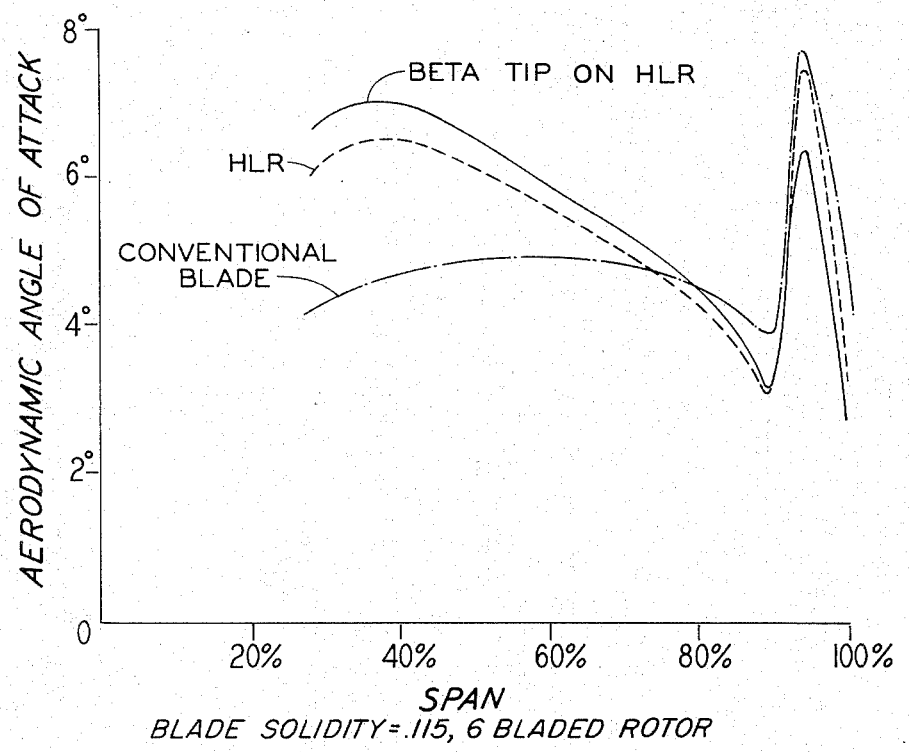
FIGS. 9 and 10 are graphs comparing the aerodynamic angle of attack and the blade lift per unit span, respectively, of a conventional helicopter rotor, the HLR, and my Beta Tip rotor, throughout the blade span in hover.
Figure 10:
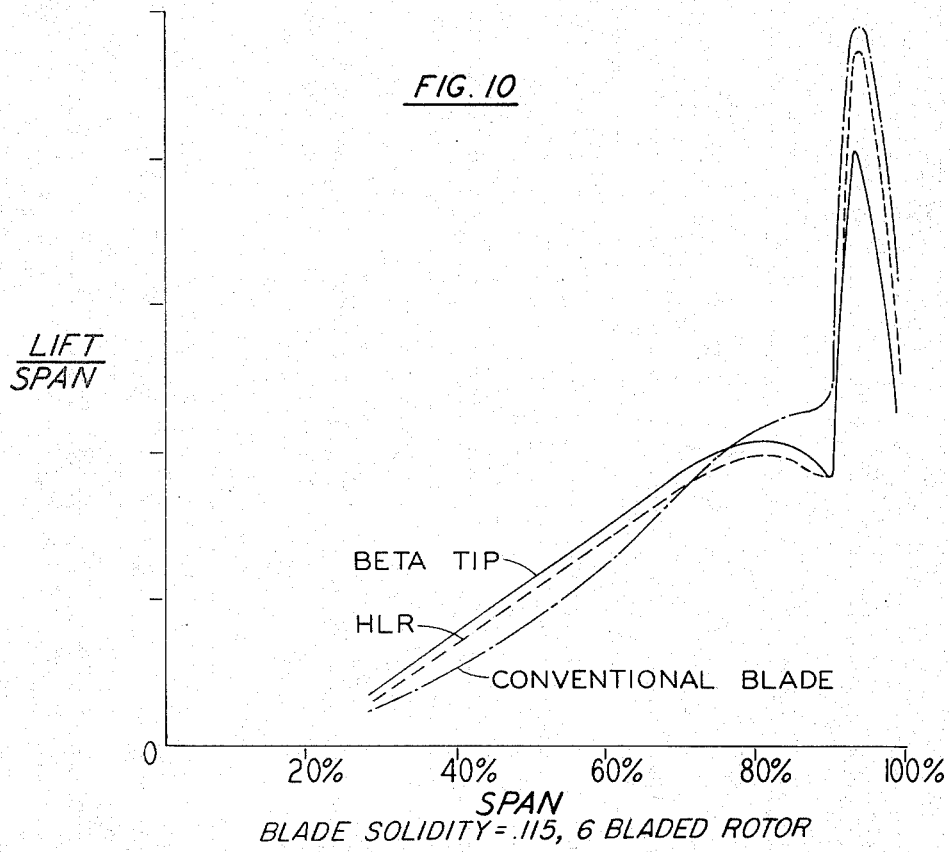

A moderate reduction in blade tip area affects rotor hover performance in a similar manner to the effect of increased blade twist as illustrated in FIGS. 9 and 10 in that it reduces tip loading, lift and drag. A second advantage to be gained by the trapezoidal tip in the Beta blade is the introduction of blade sweep, which has the beneficial effect of reducing Mach number effects in both hover and forward flight by reducing local Mach number at the blade swept leading edge to a quantity approximately equal to the product of the cosine of the angle of sweep times the blade local resultant velocity divided by the speed of sound.

Our special airfoil and thickness phenomena also cooperate in producing increased Beta Tip rotor blade efficiency. The SC—1095 airfoil is considered to be superior to the conventional airfoils, such as NACA 0012, because of its reduced thickness and because of its moderate camber shaped to be maximum at a forward station on the chord line. This produces an airfoil having a higher maximum lift coefficient, $C_{L\ max}$, and a higher drag divergent Mach number as shown in FIGS. 7 and 8. The improved airfoil thus reduces profile losses and increases the thrust capacity of the rotor before efficiency begins to fall off without significantly increasing blade pitching moments. Reduced thickness is beneficial because it produces both improved drag-divergence characteristics and reduced rotor blade stresses. The latter benefit results because of the reduced distance from the center of the cross section of the outer surface of the blade's main structural span to its outer surface. Incorporation of the SC—1095 or similar airfoil over the entire blade span produces a blade which realizes the full potential of these benefits.

We will now consider the second of the three advantages gained by the Beta Tip blade, namely, elimination or reduction of the blade out of track or subharmonic oscillating track instability phenomenon.

Blade out of track may be encountered during helicopter hovering mode of operation in which the rotor blades deviate from a single tip path plane. "Dual Track" and subharmonic oscillating track instability, refer to particular types of blade out of track instability. During Dual Track, two distinct tip-path planes are prevalent with the even and odd number blades forming separate planes. The two tip-path planes are stable with time and generally affect performance only at the transition from the normal single tip-path plane to the Dual Track, during which one per revolution vibration is present. When subharmonic oscillating tracks instability occurs, the rotor blades flap at a subharmonic frequency of approximately 0.57 per revolution in the rotating system or 1.57 per revolution in the fixed system. The magnitude of the 1.57 per revolution fixed system vibration can be sufficiently strong to be unacceptable during normal hovering operation.

The cause of both Dual Track and subharmonic oscillating track instability is the aerodynamic interaction between a rotor blade and the tip vortex from the preceding blade. As depicted in FIGS. 1a–1f, the axial movement of a strong tip vortex relative to a blade tip produces significant changes in the tip region lift distribution. The blade stations outboard of the vortex span location experience an increased upwash of the vortex flow field, and therefore increased angle of attack. Conversely, the blade area just inboard of the vortex is subjected to a magnified downwash and lowered angles of attack. Since the blade area outboard of the vortex is close to stall during normal hover at high loads, the increased angle of attack in this region have little effect on the blade section lift. The area inboard of the vortex, however, is not stalled and the lift decreases rapidly as the tip vortex approaches. The net result is a decrease in total blade lift as the vortex moves toward the blade, resulting in a negative aerodynamic flapping spring coupling between a blade and the tip vortex from the preceeding blade. For torsionally soft blades, the negative flapping spring is magnified by torsional blade flexing as the high angles of attack outboard of the tip vortex induce drag divergence and negative pitching moments.

The negative aerodynamic flapping spring created by the tip vortex produces a force which establishes an oscillation in the blade. This oscillation of the leading blade will induce flapping oscillation in the tip vortex trailing from the leading blade. As the tip vortex from the leading blade moves toward the trailing blade, the negative spring coupling causes the trailing blade to respond by decreasing its flapping angle. Downward movement of the trailing blade continues until the distance separating the blade and the oscillating vortex from the leading blade begins to increase. This downward movement is then arrested and the trailing blade beings to climb as a negative flapping moment due to the vortex is reduced. Accordingly, the net effect of the oscillation of the leading blade vortex is to cause the trailing blade to flap at the same frequency, but with a phase angle and relative amplitude that depends upon the strength of the negative spring coupling and the excitation frequency of the leading blade. For a given level of blade flap damping, there is a unique combination of negative spring strength and blade flapping frequency which will allow each blade of a six-bladed rotor to flap with the same amplitude and 60° out of phase with the previous blade. When a sufficiently high rotor loading is reached to produce this negative spring, a slight oscillation of a rotor blade at the subharmonic oscillating track instability frequency will allow all the blades to couple around the azimuth and produces a self-sustaining subsonic flapping of the rotor blades.

My Beta Tip blade alleviates the loss of lift in the blade tip region. There are at least three structural differences which theoretically occur as a direct result of the Beta Tip design that indicate why the Beta Tip blade did not encounter blade out of track or subharmonic oscillating track instability throughout the testing range shown in FIG. 11. First, the reduced tip lift and associated lower tip angle of attack indicates that the Beta Tip rotor is operating farther away from stall than a conventional rotor when both are operating at the blade out of track instability threshold of the conventional rotor. Therefore, if thrust on each rotor is increased one more pound, the conventional rotor's tip lift does not increase and the stalled blade drops out of track to produce blade out of track instability. The Beta Tip lift will increase, since it has a stall margin, i.e., a margin between its operating angle of attack and stall. Secondly, the lower tip loading reduces the vortex strength and, hence, lowers the tip angle of attack to be farther away from stall. The third difference is associated with the particular airfoil. At a typical hovering Mach number, the stall characteristics of the SC—1095 airfoil are not severe such that the lift does not fall off with increasing angle of attack to the maximum angle of attack tested in the wind tunnel, whereas the lift in a conventional airfoil reduces significantly beyond $C_{L\ max}$ with increasing angle of attack. This is shown in FIG. 12. The result is that as thrust is increased on the Beta Tip rotor, the lift outboard of the vortex will be increasing and therefore the tendency to lose tip lift and get into blade out of track instability is reduced with the use of this airfoil of other airfoils with similar stall characteristics.

Figure 11:
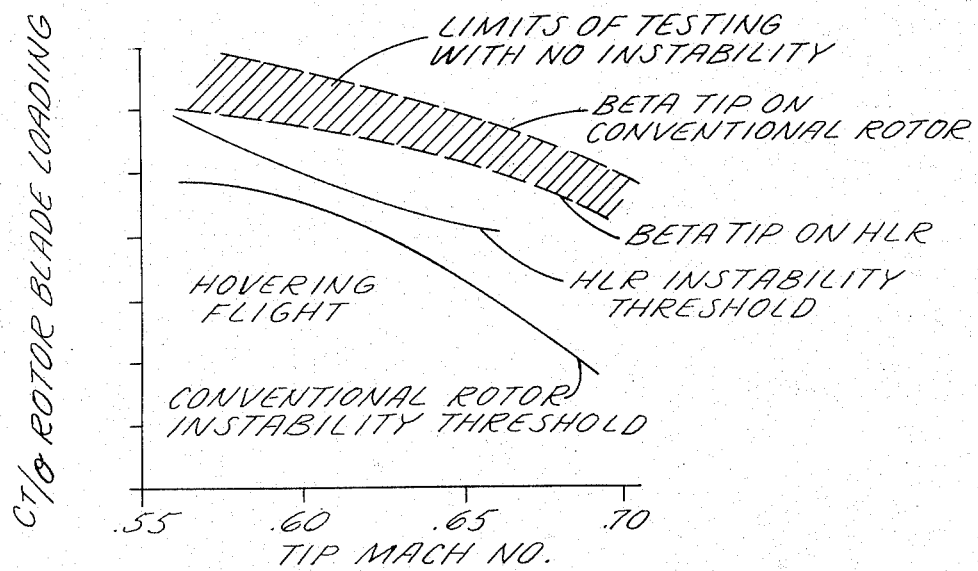
FIG. 11 is a graph comparing rotor blade loading at the threshold of the blade instability of a conventional rotor and the HLR. In addition, the limits of testing for my Beta Tip on the HLR and the conventional rotor are shown at various tip Mach numbers to illustrate the increase in blade loading to which it has been demonstrated that the Beta Tip has eliminated any instability.
Figure 12:
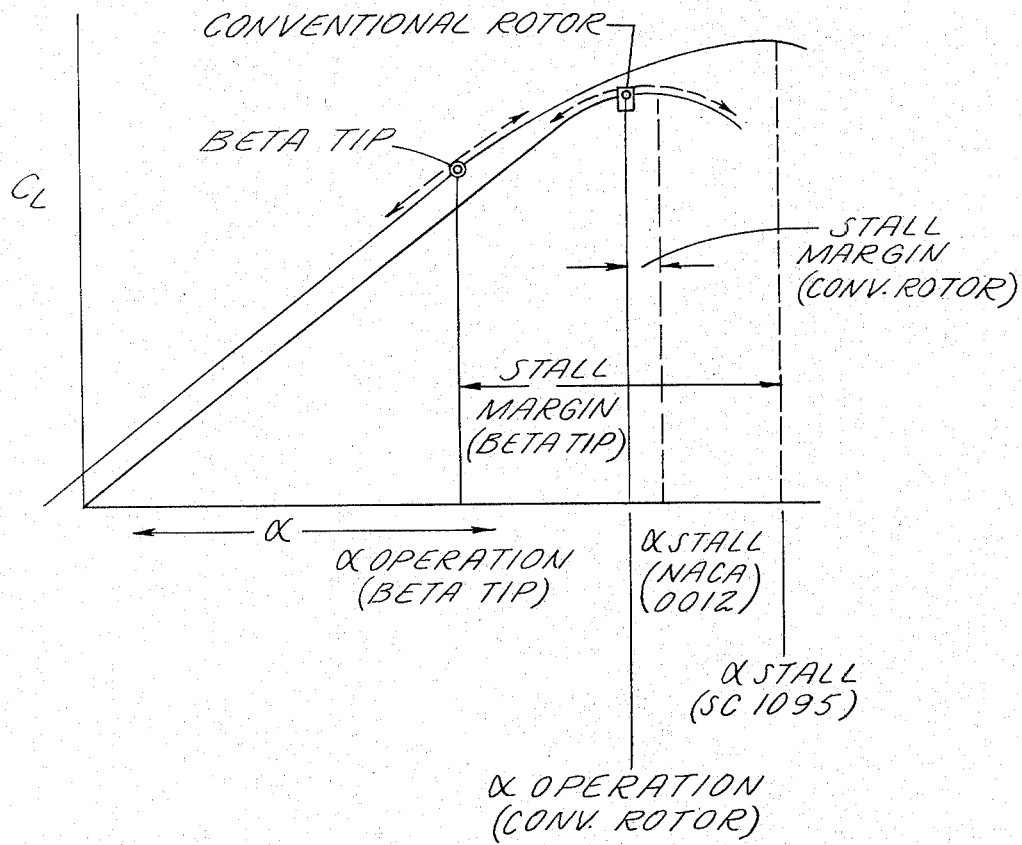
FIG. 12 is a plot of rotor lift against angle of attack to illustrate the increased stall margin achieved with the "Beta" tip blade and why a conventional rotor encounters blade out of track or subharmonic oscillating track instability and my Beta Tip rotor does not at comparable operating conditions.

Test results comparing the conventional rotor, the HLR, and the Beta Tip on these two rotors are shown in FIG. 11 and while the conventional rotor and the HLR encountered premature blade stall in the regions shown on the chart, the Beta Tip rotors were tested to the limit of the testing facilities involved and showed ability to operate at increased blade loading without encountering blade stall at all tip Mach numbers above the blade stall threshold of the conventional rotor and the HLR rotor.

Figure 13:
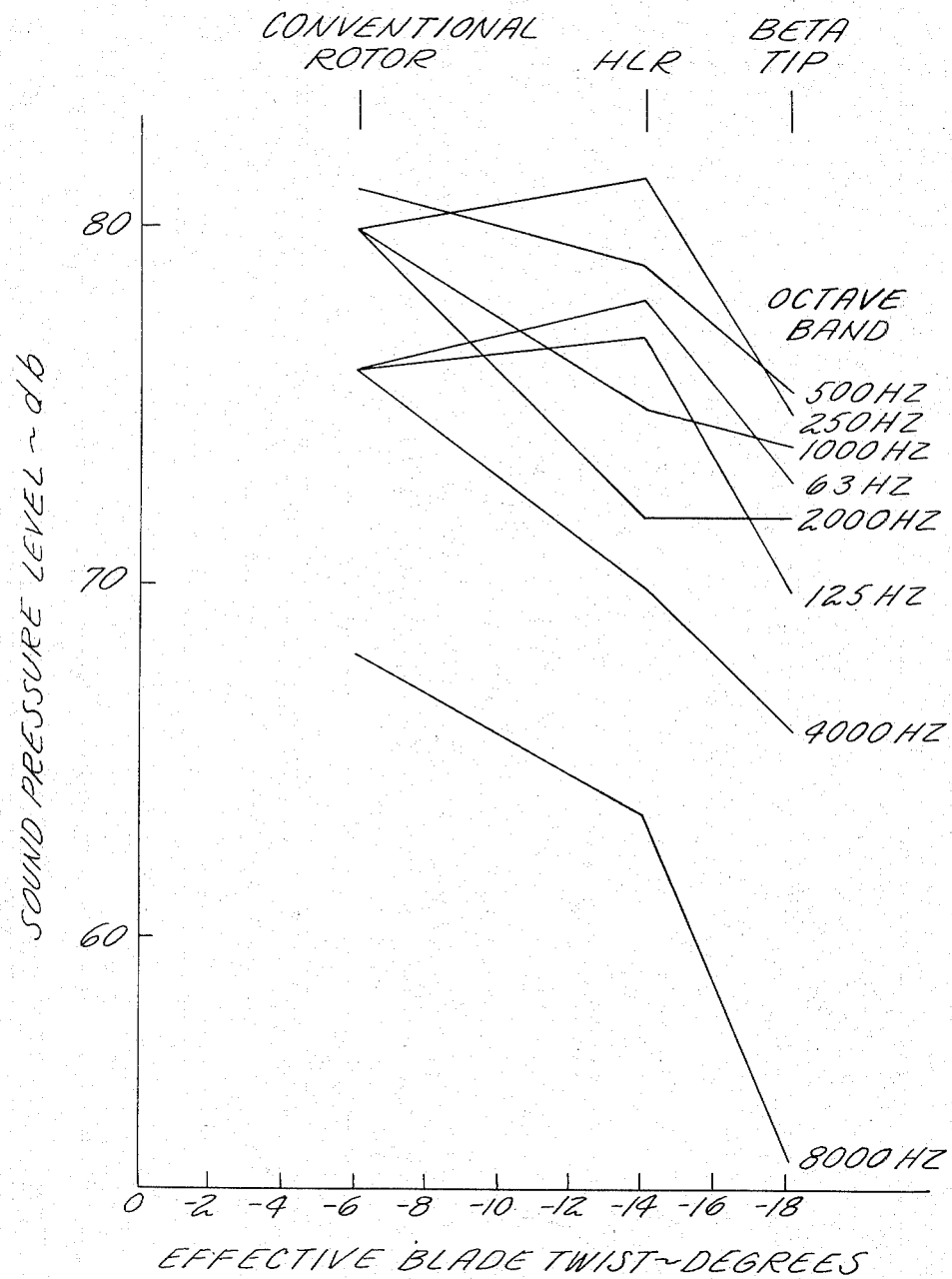
FIG. 13 is a graph comparing the rotor noise generated by the conventional rotor, the HLR, and my Beta Tip on the HLR at various effective twists and frequencies.

The third beneficial result from the Beta Tip rotor is rotor noise reduction. The Beta Tip rotor demonstrated a 5 to 8 PNdb lower noise level than the conventional rotor. This is illustrated in FIG. 13, and it is very interesting to note therefrom that, based on preliminary results, the HLR has a higher noise level than the conventional rotor. FIG. 13 demonstrates this by graphically illustrating the relative noise levels of these three rotors at different frequencies as a function of the rotor equivalent linear twist. The Beta Tip rotor shows lower noise levels at all frequencies.

The FIG. 13 results reveal that rotor noise is related to tip loading, that is, as the tip loading is reduced, the noise is reduced. Aerodynamic noise is created by a sharp rapid change in angle of attack such as occurs with the vortex impingement. The local twist of the Beta Tip reduces the local angle of attack. Noise is greater when stall occurs. The Beta Tip avoids stall and therefore, the noise caused by extra high velocity air movement over the leading edge is precluded.

Figure 14:
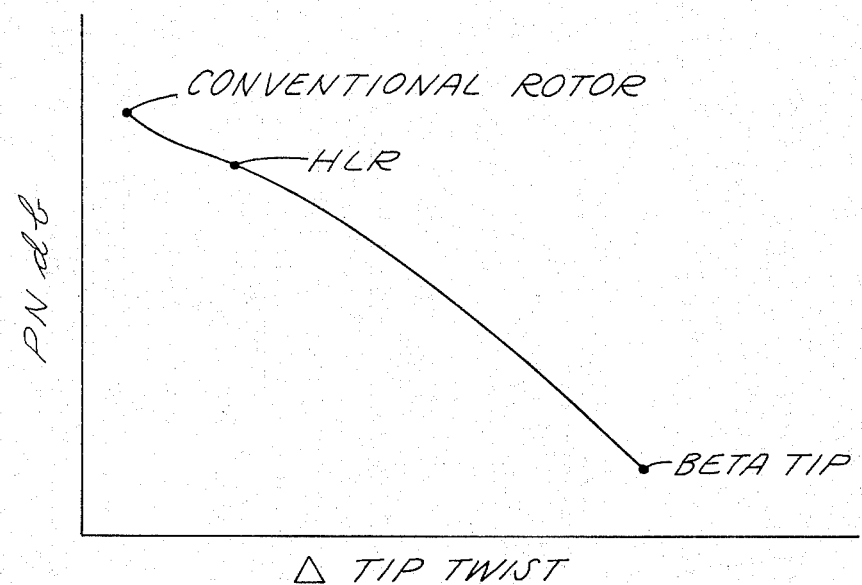
FIGS. 14 and 15 are graphs illustrating the perceived noise level generated and the ratio of local tip horsepower expended to the total rotor horsepower, respectively, versus the local blade tip twist.
Figure 15:
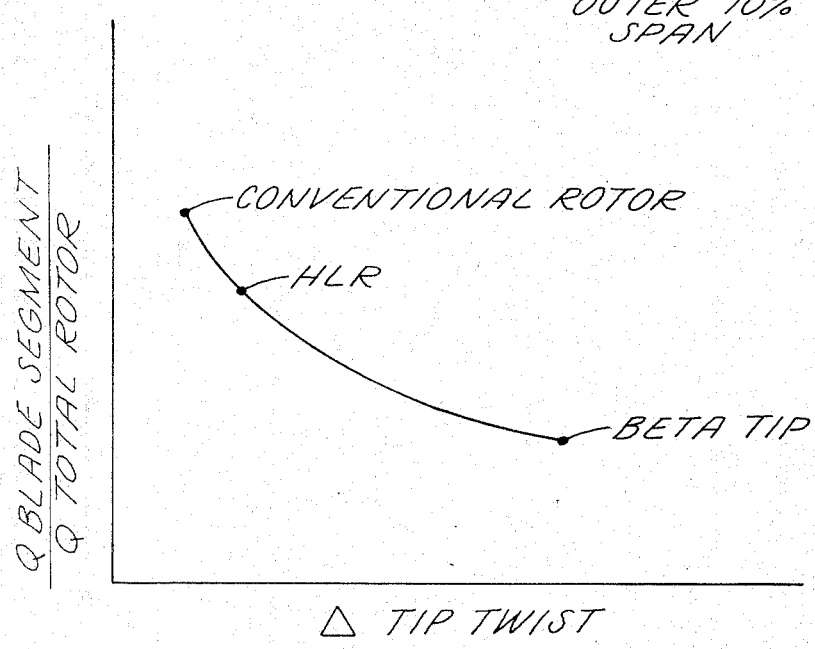

FIG. 14 and 15 depict both overall rotor noise level in terms of PNdb and rotor torque, respectively, plotted against blade tip twist. It will be noted that both with respect to PNdb and torque or horsepower, the Beta Tip rotor is superior to both the HLR and the conventional rotor. The local horsepower being dissipated at the outer 10 percent of the blade span is shown to be reduced as the tip loading is reduced. Since the overall noise level is directly related to horsepower expended or energy expended, it is seen that reduction of the tip loading is fundamental to rotor noise reduction and the Beta Tip shows the lowest noise levels. It is hypothesized that, for maximum noise reduction, the tip local angle of attack should be operating just at the airfoil drag divergence angle of attack, as shown in FIG. 1.

Our test results suggest the role that each element of the Beta Tip construction plays in reducing rotor noise. First, reduced twist reduces the local angle of attack by reducing the local blade pitch and reducing the strength of the tip vortex. Second, an improved airfoil section with lower base drag and a higher drag divergence angle of attack gives a greater margin between the operating angle of attack at the tip and drag divergence angle, thus reducing profile power losses and noise. Third, a reduction in tip thickness ratio, meaning the ratio of the airfoils maximum thickness dimension to its chord dimension, contributes to a further increase in the drag divergence angle of attack. Fourth, a decrease in blade area apparently results in about the same tip angle of attack but results in lower tip profile power losses since less profile drag is present as a result of less area, and since there is some reduction in effective profile drag coefficient due to the Mach relief from the resulting sweep.

As best shown in FIG. 25, the tip portion 20 of blade 10 may include mechanism to permit the blade tip to operate in both the constant planform geometry and the trapezoidal tip geometry, shown in phantom and solid lines, respectively, in FIG. 5. Leading edge tab 50 is pivotally connected to the remainder of tip 20 at pivot point 52, while trailing edge tab member 54 is pivotally connected at tip 20 at pivot point 56. Projections 58 and 60 extend from the tabs and are connected to hydraulic or pneumatic cylinder-piston mechanism 62, or other conventional power devices, through actuating arms 64 and 66, which are pivotally connected at their opposite ends to the projections 58 and 60 and to cylinder rod 68. Accordingly, when actuating fluid is selectively applied to power mechanism 62, piston rod 68 is caused to move either leftwardly to draw tabs 50 and 54 inwardly to their trapezoidal tip positions and so that, conversely, when piston rod 68 moves rightwardly, the tabs 50 and 54 are pushed outwardly to their constant planform positons.

As previously stated, the blade shown in FIG. 4 is well suited for hover and normal forward flight speed operation, but for helicopters designed to operate at high forward flight speeds, a modified blade with selective sweep is preferable. Except for sweep, this modified blade is identical with the blade previously described and shown in FIG. 4. This high speed flight modification will now be discussed.

Figure 19:
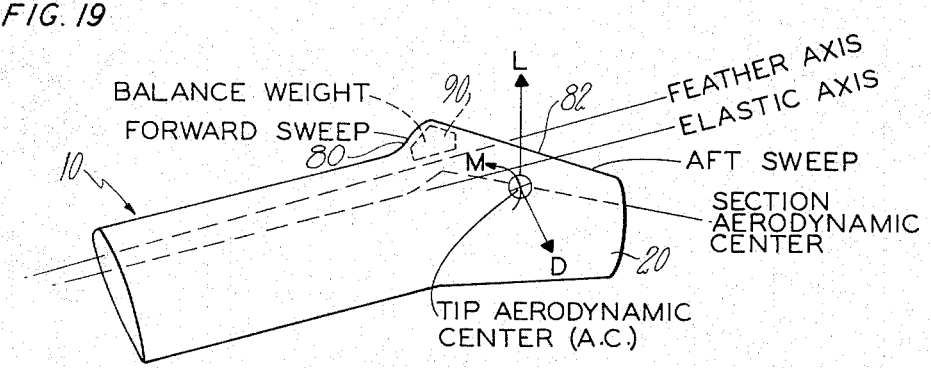
FIG. 19 is a perspective showing of a modified blade having a swept tip especially adapted for helicopters intended to operate at high forward flight speeds.

The basic purpose for incorporating sweep in the "Beta" tip design is to reduce blade vibratory control loads and stresses in high speed forward flight which are increased in a blade of the type disclosed herein having nonlinear tip twist washout. As an added benefit, sweep delays adverse compressibility effects and therefore improves rotor efficiency, reduces noise, and delays the encountering of instability thresholds like blade out of track or subharmonic oscillating track instability and submultiple oscillating track, which is fully described in a paper entitled "A Self-Exciting Rotor Blade Oscillation at High Subsonic Mach Number" presented at the 24th National Forum of American Helicopter Society in May of 1968 by William F. Paul of Sikorsky Aircraft. The requirement for sweep in the "Beta" tip design depends on the forward speed requirements of the rotor. A crane helicopter such as the CH—54 which must hover efficiently but has a cruise speed requirement of 80 to 120 knots does not require sweep beyond that resulting from the trapezoidal planform shape of FIG. 5. A high speed assault cargo helicopter like the CH—53 must combine the capabilities of efficient hover and cruise (150 to 180 knots) in a single rotor system. In such a high speed aircraft, the "Beta" tip should preferably be swept as shown in FIG. 19 so that the aerodynamic center of the tip region lies aft of the blade elastic axis. Employing aft aerodynamic center over the entire blade span further enhances these desirable benefits.

Those skilled in the art are familiar with several ways in which this would be done. For example, by allowing the blade spar to be positioned slightly more forward in a chordwise direction or by increasing the material thickness towards the forward portions of the spar, the effective elastic axes can be moved forward relative to the airfoil section aerodynamic center. An illustration of the first suggested method is shown in FIG. 28 wherein the spar forward and rear walls are shifted forward slightly from their conventional solid line positions to the phantom line positions illustrated therein. An illustration of the second suggested method is shown in FIG. 29 wherein the spar forward is thickened from its solid line, conventional thickness to its phantom line increased thickness and the spar afterwall is thinned from its solid line, conventional thickness to its phantom line decreased thickness. In the alternative, the aerodynamicist may design an airfoil where the aerodynamic center is more rearward than normal. In any of these and other known ways a small displacement between the two axes can be achieved with the aerodynamic center rearward of the elastic axis.

The effect of high speed forward flight on a blade with tip twist washout will now be considered. FIG. 16 illustrates the dynamic response of a rotor blade 10 with tip twist washout in high speed forward flight. As the rotor blade advances in the direction of flight, it experiences a larger than usual down load $-L$ at the blade tip due to the high tip twist. The blade drag load D and negative pitching moment $-M$ are also larger. All three loads combine to cause the blades vibratory torsional root moment (control load) to increase. The larger down load $-L$ deflects the blade tip down below the blade feathering axis thereby increasing the pitching moment arm of the drag load D as shown in FIG. 17. At the same time the drag load D, supported by the pitching moment $-M$, produces a large nose down moment about the feathering axis which is experienced at the blade root and imposes large loads on the blade pitch control system. FIG. 18 shows the relative size of these root moments for a blade with and without tip twist and illustrates the increase in peak load of a high twist rotor on the advancing side of the rotor disc. FIG. 18 also depicts blade tip torsional deflection, which varies in the same manner as the root moment. It will therefore be seen that the moment due to drag combines with pitching moment to twist the blade further, thereby increasing its negative angle of attack and enhancing this adverse loading. Vibratory stress, of course, increases due to the higher blade bending and twisting amplitudes.

By sweeping the tip area aft so that the aerodynamic center of the entire tip is aft of the blade elastic axis the adverse situation illustrated above can be alleviated. An example of the swept tip is shown in FIG. 19. This tip for high speed forward flight application preferably has forward as well as aft sweep; the reasons for this will be explained hereinafter.

Figure 24:
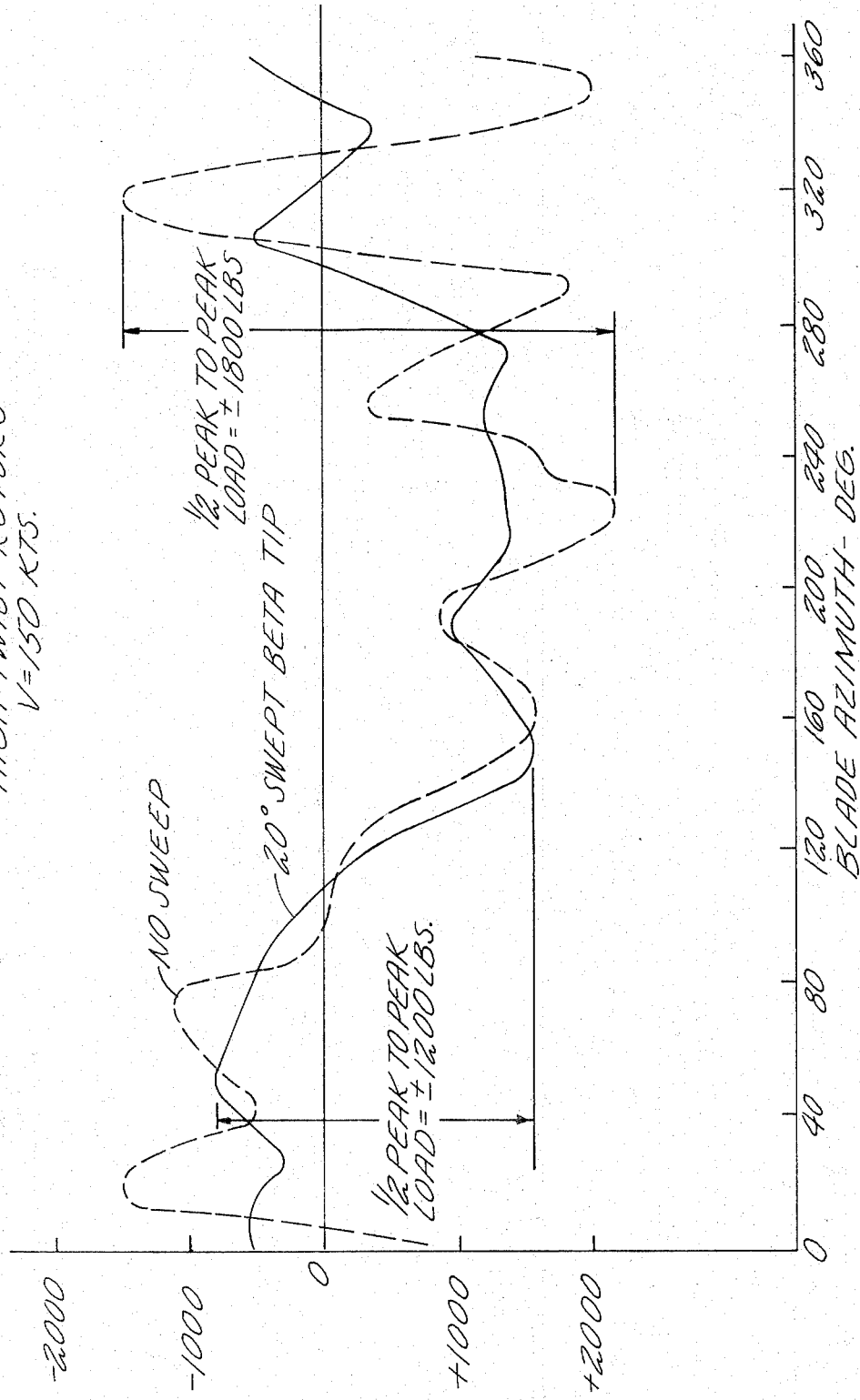
FIG. 24 is a graphic representation of measured blade vibratory control load versus blade azimuth for a high twist nonswept blade and a same high twist, swept Beta Tip blade which is swept rearwardly about 20° outboard of the 95 percent blade span station showing how the swept Beta Tip reduces peak-to-peak vibratory control loads in high speed forward flight.

When it is recalled that the advancing blade is operating at high mach number in forward flight, the first benefits of sweep are immediately evident. The drag load and the section pitching moment are reduced through relief of compressibiltiy effects due to the cosine effect. The greatest effect of sweep results, however, from the downward lift vector being offset from the elastic axis of the blade. As shown in FIGS. 20 and 21, the downward lift vector $-L$ in a swept tip produces a nose-up moment about the blade elastic axis, thereby causing a reduction in blade twist. This reduction in blade twist reduces the negative aerodynamic angle of attack $\alpha$ and this, in turn, reduces the drag load D and section pitching moment $-M$. The download $-L$ is also reduced, reducing tip downward deflection of the blade, reducing the drag moment. Thus all adverse loads D, $-L$ and $-M$ are reduced, creating a greater degree of compatability between rotor blade design requirements for hover and cruise flight. FIG. 24 illustrates the effectiveness of a 20° swept tip outboard of the 95 percent span on reducing control loads for the HLR rotor as the CH—53 helicopter, which has a $-14$ degree non-linear twist plus the additional Beta Tip twist. FIG. 24 shows full scale flight test data where a 35 percent reduction of the peak-to-peak vibration control load was measured for my imporved Beta Tip rotor over the HLR rotor. This tip was tested on the HLR blade resulting in significantly reduced blade pitching moments and reduction in blade slap or noise in forward flight.

Figure 22:
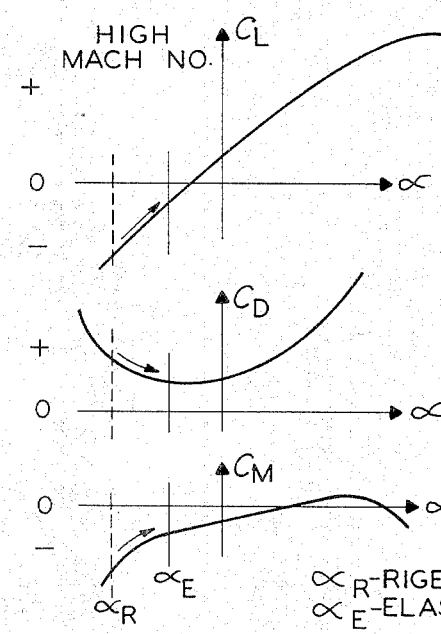
FIGS. 22 and 23 show a comparison of lift, drag, and pitch moment acting upon an advancing, and hovering and the retreating blade, respectively, for both a non-swept and swept blade, demonstrating the reduced angle of attach resulting from the twisting moment of the rearwardly disposed lift vector and demonstrates the corresponding reduced aerodynamic blade tip lift drag and pitching moment loads.
Figure 23:
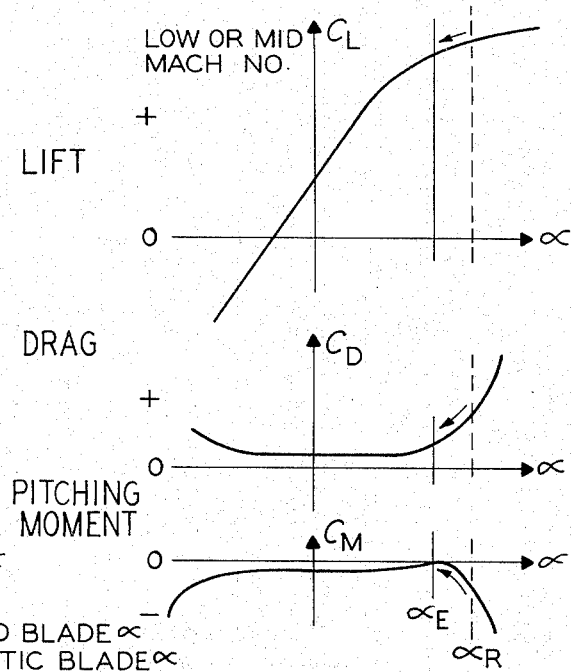

There are additional benefits from the aft sweep illustrated in FIG. 19. In both the case of the retreating blade and the hovering blade of FIG. 21, the upward lift force L produces a moment about the elastic axis which reduces blade stall. The forces and the change in forces are illustrated in FIGS. 22 and 23. In both cases the blade tip is operating at high angle of attack $\alpha$. The upward lift force produces a twisting moment which tends to increase blade twist. For the reasons fully discussed supra in connection with hover operation, increased twist along the blade retards blade stall and thereby improves hover efficiency. For the retreating blade, the increased twist reduces outboard angle of attack and thus moves the loading inboard where lift can be produced at a high L/D ratio to retard stall to thereby improve and forward flight efficiency.

As a further result of the sweep and aft aerodynamic center, the reduced blade moments in forward flight cause a reduction in the vibratory moments, commonly called the blade control loads, realized in the blade pitch control system. When these moments diverge, the forward speed capability of the rotor is usually limited at this point even if horsepower remains to go faster. The effect of the swept tip is to reduce the severity of the control load divergence and to delay it to higher speeds. In addition, blade and rotor response to gusts are further reduced. For example, a gust can either increase angle of attack and/or increase local blade velocity; both increase blade lift. However, with the center of lift aft of the elastic axis the lift moment tends to the reduced angle of attack and all the corresponding adverse lift and drag forces, drag moments, as well as section aerodynamic pitching moments as explained above and clearly shown in FIGS. 20–23. As a result, blade vibratory control loads are further reduced and the forward speed capability of the rotor increased, as well as blade gust response reduced.

Quite fortunately, sweep and its resulting aft aerodynamic center is one of the few phenomena which serves to assist both the advancing and the retreating blades in forward flight and also assist in hover.

In the design of this swept "Beta" Tip it is important to mass balance the tip area, i.e., considering the tip as an area, the area should be shaped and balanced so that the effective chordwise, c.g., is on or forward of the blades elastic axis. If this is not done, centrifugal force will twist the blade negating the effect of the aerodynamic lift force.

In order to achieve mass balancing, forward and then aft sweep is incorporated as shown in FIG. 19 to provide volume in which to store mass in the form of a balance weight 90 forward of the elastic axis in sufficient amount to offset the mass which is located aft of this axis as a result of the aft sweep. The additional benefit of the fore and aft sweep is to provide relief from aerodynamic compressibility due to cosine effect over a larger portion of the span.

The one known negative aspect of aft sweep is the resulting higher steady control load on the rotor control servos. The steady servo load comes from a steady and a one per revolution blade pitching moment. FIG. 24 shows that the one per revolution component of blade control loads is reduced by 35 percent over the unswept blade by the mean control load was not, for this case significantly affected. But in general, this steady moment is usually increased and it can be handled by increasing the size of the control servos and otherwise presents no difficult problems.

Preferably, the swept tip of FIG. 19, shown in greater particularity in FIG. 26, starts at or outboard of the 87 percent span line, sweeps forward about 20° ±15°to about the 93 percent span line, then sweeps aft about 20° ± 15°to the 100 percent span line or tip.

The twist of the Beta Tip blade, whether of constant planform, trapezoidal tip, or swept tip is of major importance to my teaching and can be particularly defined as follows for a design blade loading, $C_T/\sigma$, condition in hover of about 0.09:

Equation 1: $\theta_{base, x} = \theta_L (X - 0.075)$ Where $X$ equals percent span station, $\theta_L$ equals blade basic twist and $\theta_{base, x}$ equals blade basic twist at $X$.

The Beta Tip local twist can be defined from the blade basic twist as follows:

Equation 2: $\theta_{Beta\ Tip, x} = \theta_{base, x} + \Delta\theta_x$, for span stations ranging from $0.87 \pm 2$ percent span $\leq X \leq 1$ for six-bladed rotors. Where $\theta_{Beta\ Tip,\ X}$ equals the Beta Tip twist at $X$, and $\Delta\theta_X$ equals change of twist between blade basic twist $\theta_{base,\ X}$ and $\theta_{Beta\ Tip,\ X}$ at station $X$.

For rotors with a number of blades different than 6, the following span station ranges apply:

| No. of Blades | Span Station Range |
|---|---|
| 1 | .71 ± 2% span ≤ X ≤ 1 |
| 2 | .775 ± 2% span ≤ X ≤ 1 |
| 3 | .82 ± 2% span ≤ X ≤ 1 |
| 4 | .845 ± 2% span ≤ X ≤ 1 |
| 5 | .86 ± 2% span ≤ X ≤ 1 |
| 6 | .87 ± 2% span ≤ X ≤ 1 |
| 7 | .875 ± 2% span ≤ X ≤ 1 |
| 8 | .88 ± 2% span ≤ X ≤ 1 |

Assuming that $\theta_L$ is negative, using the six-bladed rotor as an example, we can set up the following equations to determine $\Delta\theta_X$ at stations $X = 1$, 0.95, 0.895, and 0.87, which are 100 percent, 95 percent, 89.5 percent and 87 percent span stations, respectively:

Equation 3: $\Delta\theta_{1.0} = [\Delta\theta_{.95} + 0.5°] + 3°, -1°$ tolerance
Where
$\Delta\theta_{1.0}$ is change in twist at 100 percent span station and $\Delta\theta_{.95}$ is change in twist at 95 percent span station.
Equation 4: $\Delta\theta_{.95} = [-4° - \frac{2}{3} \theta_{base,\ X}] \pm 2°$ tolerance
Equation 5: $\Delta\theta_{.895} = [.4375\ \Delta\theta_{.95}] - .5°, +3°$ tolerance
Where
$\Delta\theta_{.895}$ is the change in twist at the 89.5 percent span station from blade basic twist.
Equation 6: $\Delta\theta_{.87} = 0°, \pm_1°$ tolerance Where
$\Delta\theta_{.87}$ is the change in twist from the blade basic twist at 87 span station.

For rotors with numbers of blades different than six, the following table gives the spanwise stations where the local Beta Tip twist changes should be applied. Also shown are the twist tolerances:

| No. of Blades | Spanwise Station for Tip Twist Application | | | | |
|---|---|---|---|---|---|
| 1 | .71 | .745 | .8 | 1.0 | ±2% span |
| 2 | .775 | .805 | .855 | 1.0 | ±2% span |
| 3 | .82 | .845 | .9 | 1.0 | ±2% span |
| 4 | .845 | .87 | .925 | 1.0 | ±2% span |
| 5 | .86 | .885 | .94 | 1.0 | ±2% span |
| 6 | .87 | .895 | .95 | 1.0 | ±2% span |
| 7 | .875 | .9 | .955 | 1.0 | ±2% span |
| 8 | .88 | .905 | .96 | 1.0 | ±2% span |
| Tip Twist at Each Station (Degrees) | ±1° | +3.° / −.5° | ±2° | +3° / −1° | |

It has been demonstrated that as the number of blades is reduced and the vortex intersection moves farther inboard on the rotor, the outer stations of the blade are then twisted upward or positive outboard of the influence of the vortex, so that these stations carry lift again at an angle of attack, for maximum lift-to-drag ratio.

The unsymmetrical tolerance, −.5 to +3°, at 89.5 percent span station is selected to increase the blade spanwise loading just inboard of the center of the interference vortex to allow the stations in this locale to do more efficient work. FIGS. 9 and 10 illustrate that the vortex significantly reduces blade loading in this area, and increased positive twist will allow these stations to produce more lift. The amount of positive twist should be limited to the level that allows these stations to be operating at the angle of attack for maximum left-to-drag ratio of the selected airfoil section or, to what is practical in terms of blade span design since this twist is highly nonlinear.

Figure 27:
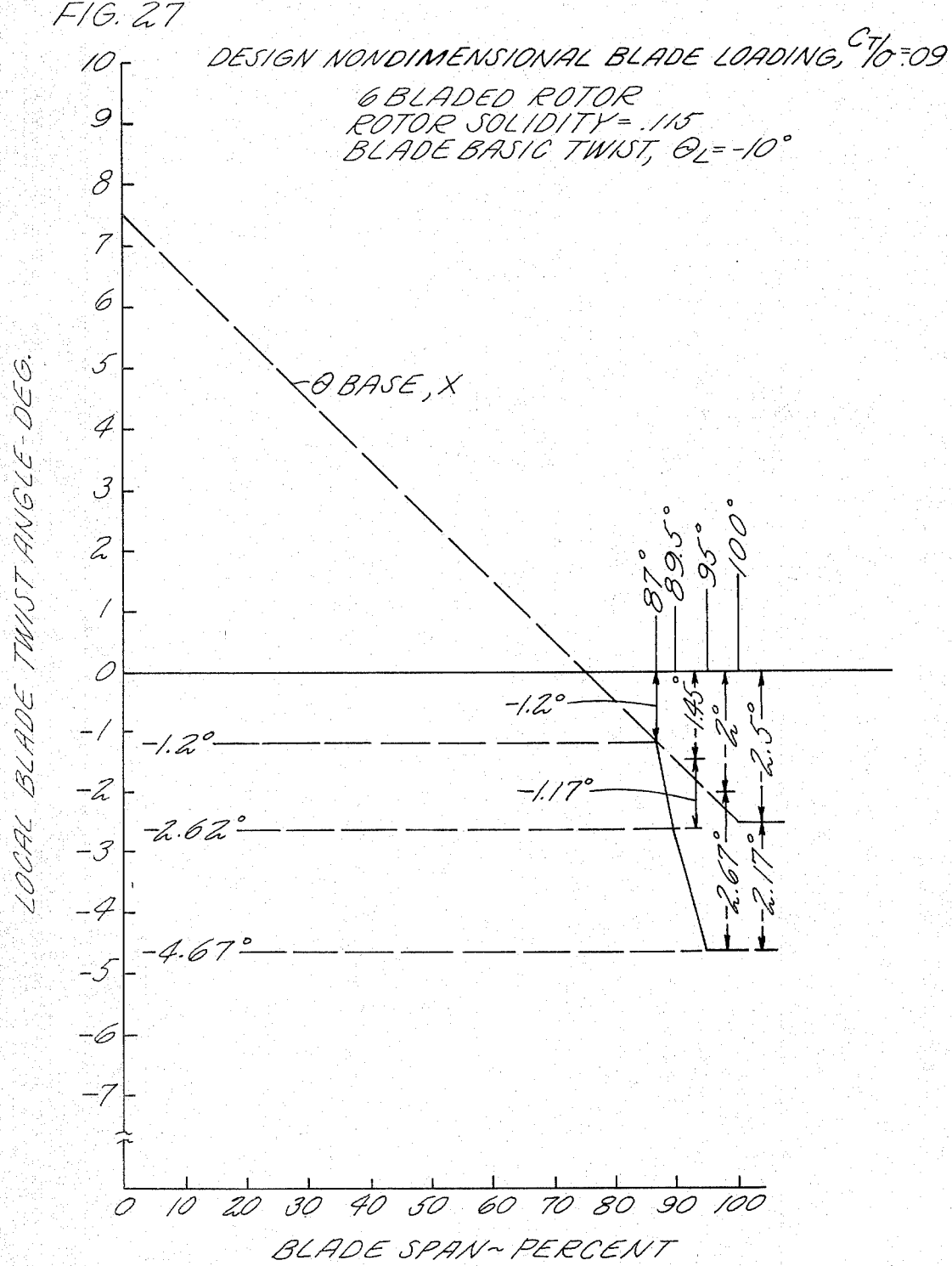
FIG. 27 is a graphic representation of the twist of my Beta Tip based upon the equations given herein.

$\Delta\theta_X$ varies linearly in the above equations between the indicated percent span stations and assuming a blade basic twist $\theta_L$ of $-10°$, we can utilize the above formulas to generate the graphic representation of the total Beta Tip twist shown in FIG. 27 for six-bladed rotors.

It will be evident to those skilled in the art that Equation 2 can also be utilized to ascertain the total Beta Tip twist at selected percent span stations $X$, even when the blade basic twist is nonlinear.

An analytical investigation indicates that the amount of Beta tip twist required to improve hover efficiency also varies with the design blade loading and the rotor blade solidity. As the design nondimensional blade loading is increased above 0.09, more local twist washout is required to offset the effects of the interfering vortex. If blade solidity is increased, the blade tip again begins to increase its share of the blade load distribution faster than the inboard portion of the blade. Therefore, additional tip twist is required to unload the tip again. The criteria for establishing the proper amount of twist for a given design blade loading, airfoil section, and blade chord distribution is to twist the blade so that all blade stations are operating at their maximum lift-to-drag ratio. In order to do the optimally, a detailed analytical computer program is required which interrelates local blade loading and resulting rotor wake interactions to define the local blade angle of attack. The computation is complex and therefore no general analytical equation, such as Equations 1–5, can be defined to cover all situations. Equations 1–6 serve to describe the form of the desired twist unloading. This, along with the accompanying table, presents the form of the desired twist changes for rotors with different numbers of blades. Finally, as stated above, the basic amount of twist unloading, −4° used in Equation 4, will be required to vary as a function of blade load, $C_T/\sigma$, calling for more negative values as $C_T/\sigma$ is increased above 0.09 and conversely. There are available in the industry today computer programs which will define these relationships more precisely. It is the purpose of this description to identify the concept of unloading to offset the adverse effects of rotor wake-blade interactions so that all outboard sections are operated at their maximum lift-to-drag ratios.

It will therefore be seen from the foregoing description that by selectively twisting the blade tip and/or reducing blade tip area blade tip loading is reduced in hover operation, and by selectively applying sweep to the blade tip to produce a tip aerodynamic center aft of the blade elastic axis to generate dynamic twist the following results are achieved: (A) reduced tip twist and hence reduced tip loading on the advancing blade in high speed flight, (B) increased tip twist and hence reduced tip loading on the retreating blade in high speed flight, and (C) increased blade twist and hence reduced tip loading in hover.

It would be desirable to be able to vary blade tip twist for optimum operation at the different modes of operation of the rotor. For example, at conditions of high rotor thrust, more blade tip twist or tip unloading is desired than at low thrust levels and therefore a blade tip twist increase would be desirable at high rotor thrust. Conversally, low thrust level operation would be more efficient if tip twist could be reduced. This can be achieved particularly in forward flight wherein the advancing blade can be effectively operated at very close to zero angle of attack and the retreating blade can be operated below stall if there were a cyclic control of the blade tip twist as a function of blade azimuth and forward speed. FIG. 26a shows the mechanism to accomplish this. Blade tip 32 is movably mounted from blade 10 by means of torque tube 69, which is supported from blade 10 by bearings 67. Hydraulic cylinder 71 works through rod 73 and bellcrank 75 and transition link 97 to cause torque tube 69 and hence blade 32 to pivot about the quarter blade chord axis 77 to vary blade twist. The pilot can control the blade tip twist b his inputs of forward speed and thrust levels by pilot input member 79 sending an electrical impulse through line 81 to electrical mixing unit 83. A similar electrical input is introduced to mixing unit 83 through blade azimuth indicator, 85, which is preferably mounted on the helicopter transmission 87. The electrical output from the mixing unit passes through rotor slip ring members 89 and out through blade 10 to impart an electrical signal to hydraulic pump 91, which will selectively send hydraulic fluid either through line 93 or 95 to actuate the aforementioned hydraulic cylinder-piston mechanism 71. Accordingly, blade tip twist is varied as a function of forward speed and thrust requirements, as well as blade azimuth.

I wish it to be understood that I do not desire to be limited to the exact details of construction shown and described, for obvious modifications will occur to a person skilled in the art.

I claim:

1. A helicopter blade having a span dimension, a chord dimension, a tip and including:
   A. a blade root section adapted to be connected to a rotor hub for rotation therewith in both hover and forward flight modes of operation,
   B. a blade central portion connected to said blade root portion and extending outwardly therefrom,
   C. a blade tip portion connected to said central portion and constituting the blade outer extremity and cooperating with said blade root portion and said blade central portion to define the blade span and shaped to have:
      1. a generally negative non-linear twist of values ranging between −1° and about −8°.
      2. a substantially constant chord dimension throughout most of its span,
      3. a trapezoidal tip,
      4. a thickness between 6 and 10 chord dimension,
      5. and being cambered with the maximum camber forward of the 50 percent chord station.

2. A blade according to claim 1 wherein said tip portion is swept forward at a blade span inboard station and rearward at a blade span outboard station.

3. A blade according to claim 1 wherein said tip portion constitutes the outer 18 percent of the blade span plus or minus 2 percent blade span for three bladed rotors, the outer 15.5 percent of the blade span plus or minus 2 percent blade span for four bladed rotors, the outer 14 percent of the blade span plus or minus 2 percent blade span for five bladed rotors, the outer 13 percent of the blade span plus or minus 2 percent blade span for six bladed rotors, the outer 12.5 percent of the blade span, plus or minus 2 percent blade span for seven bladed rotors and the outer 12 percent of the blade span plus or minus 2 percent blade span for eight bladed rotors.

4. A blade according to claim 1 wherein said blade central portion has a twist ranging from 0° to −20° and said generally non-linear tip twist commences at about the 88 percent mark span station ±2 span station and extends to the blade tip for eight bladed rotors, at about the 87.5 percent span station ±2 percent span station and extends to the blade tip for seven bladed rotors, at about the 87 percent span station ±2 percent span station and extends to the blade tip for six bladed rotors, at about the 86 percent span station ±2 percent span station and extends to the blade tip for five bladed rotors, at about the 84.5 percent span station ±2 percent span station and extends to the blade tip for four bladed rotors, and at about the 82 percent span station ±2 percent span station and extends to the blade tip for three bladed rotors, at about the 77.5 percent span station ±2 percent span and extends to the blade tip for two bladed rotors, and at about the 71 percent span station ±2 percent span and extends to the blade tip for a one bladed rotor.

5. A blade according to claim 4 wherein said blade central portion twist is about −14°.

6. A blade according to claim 1 wherein said trapezoidal tip commences at a span station between 90 percent and 97 percent span and reduces uniformly in chord dimension so that the blade tip chord is about 60 percent, ±15 percent, of the blade chord dimension and so that the tip center of pressure remains at the same chord station.

7. A blade according to claim 6 wherein the blade chord dimension is 26 inches and the tip chord dimension is 15.1 inches.

8. A blade according to claim 1 wherein said thickness is about 9.5 percent chord dimension and wherein said maximum camber is about $0.8 \pm 0.1$ percent chord dimension and is a forward camber located forward of the 30 percent chord station.

9. A blade according to claim 1 wherein said blade tip portion is of airfoil cross section defined by the formula:

$$0 \leq \frac{x}{c} \leq .25 \begin{cases} \frac{y_u}{c} = \frac{t}{c}\left[ 1.307\sqrt{\frac{x}{c}} + 3.767\frac{x}{c} - 46.7\left(\frac{x}{c}\right)^2 + 201.3\left(\frac{x}{c}\right)^3 - 316.8\left(\frac{x}{c}\right)^4 \right] \\ \frac{y_L}{c} = \frac{t}{c}\left[ -1.162\sqrt{\frac{x}{c}} - 2.256\frac{x}{c} + 37.2\left(\frac{x}{c}\right)^2 - 170.2\left(\frac{x}{c}\right)^3 + 272.9\left(\frac{x}{c}\right)^4 \right] \end{cases}$$

$$.25 \leq \frac{x}{c} \leq 1.0 \begin{cases} \frac{y_u}{c} = \frac{t}{c}\left[ 6.6134\left(\frac{x}{c}\right) - 28.04\left(\frac{x}{c}\right)^2 + 56.42\left(\frac{x}{c}\right)^3 - 56\left(\frac{x}{c}\right)^4 + 21.15\left(\frac{x}{c}\right)^5 \right] \\ \frac{y_L}{c} = \frac{t}{c}\left[ -4.7661\left(\frac{x}{c}\right) + 20.53\left(\frac{x}{c}\right)^2 - 41.92\left(\frac{x}{c}\right)^3 + 42\left(\frac{x}{c}\right)^4 - 16\left(\frac{x}{c}\right)^5 \right] \end{cases}$$

where $X$ is a chord station measured from the blade leading edge, $C$ is the chord dimension, $t$ is maximum blade thickness, $Y_u$ is the upper airfoil location at station $X$, and $Y_L$ is the lower airfoil location at $X$ and where the leading edge radii can be defined by the following equations:

leading edge radius upper: $\rho_u/C = (t/c)^2(.01/.095^2)$
leading edge radius lower: $\rho_L/C = (t/c)^2(.0066/.095^2)$ where $\rho_u$ is the leading edge radius of the blade upper airfoil and $\rho_L$ is the leading edge radius of the lower blade airfoil, both taken from a point on the blade chord, and within a range of ±3 percent of the values of $Y_u$, $Y_L$, $\rho_u$, $\rho_L$ so calculated.

10. A blade according to claim 1 wherein said blade tip portion is of airfoil cross section defined by the coordinates:

| X/C | $Y_u/t$ | $Y_L/t$ |
|---|---|---|
| .0125 | .1863 | −.1526 |
| .025 | .2737 | −.221 |
| .05 | .387 | −.2993 |
| .075 | .45 | −.3395 |
| .1 | .4926 | −.3642 |
| .15 | .5442 | −.3937 |
| .2 | .5734 | −.4087 |
| .25 | .5842 | −.4147 |
| .3 | .5815 | −.4122 |
| .4 | .5578 | −.3959 |
| .5 | .5109 | −.3627 |
| .6 | .4434 | −.3145 |
| .7 | .3553 | −.2509 |
| .85 | .2486 | −.1745 |
| .9 | .1345 | −.0905 |
| .975 | .0345 | −.0244 | where $X$ is a chord station measured from the blade leading edge, $C$ is the chord dimension, $t$ is maximum blade thickness, $Y_u$ is the upper airfoil location at station $X$, and $Y_L$ is the lower airfoil location at station $X$, and where the leading edge radii can be defined by the following equations:

leading edge radius upper: $\rho_u/C = (t/c)^2 \, 1.108$
leading edge radius lower: $\rho_L/C = (t/c)^2 \, .7313$ where $\rho_u$ is the leading edge radius of the blade upper airfoil section taken from a point on the blade chord, wherein $C$ is the chord dimension, wherein $t$ is maximum blade thickness, and where $\rho_L$ is the leading edge radius of the blade lower airfoil section taken from a point on the blade chord, and within a range of ±3 percent of the values of $Y_u/t$, $Y_L/t$, and $\rho_u$ and $\rho_L$ so determined.

11. A blade according to claim 1 wherein the blade central portion thickness is 11 percent chord dimension and has a uniform twist of about −14°.

12. A blade according to claim 1 wherein the blade tip camber is maximum at about the blade 27 percent chord station and is shaped to produce a blade pitching moment coefficient within the range ±.03 before moment divergence at subsonic Mach numbers.

13. A blade according to claim 2 wherein the blade tip portion sweep commences at about the blade 88 percent span station ±2 percent span for eight bladed rotors, at about the 87.5 percent span station ±2 percent span for seven bladed rotors, at about the 87 percent span station ±2 percent span for six bladed rotors, at about the 86 percent span station ±2 percent span for five bladed rotors, at about 84.5 span station ±2 percent span for four bladed rotors, at about the 82 percent span station ±2 percent span for three bladed rotors, at about the 77.5 percent span station ±2 percent span and extends to the blade tip for two bladed rotors, and at about the 71 percent span station ±2 percent span and extends to the blade tip for a one bladed rotor, and wherein the forward sweep and rearward sweep are of maximum angular sweep limits between 30° and 40°.

14. A helicopter blade having a span dimension, a chord dimension, a tip and including:
A. a blade root section adapted to be connected to a rotor hub for rotation therewith in both hover and forward flight modes of operation,
B. a blade central portion having a twist of −14° and having a thickness of about 11 percent chord dimension and connected to said blade root portion and extending outwardly therefrom,
C. a blade tip portion constituting the outer 29 percent of the blade span ±2 percent of the blade span in a one bladed rotor, constituting the outer 22.5 percent of the blade span ±2 percent blade span for two bladed rotors, constituting the outer 18 percent of the blade span ±2 percent span in a three bladed rotor, constituting the outer 15.5 percent of the blade span ±2 percent span for four bladed rotors, constituting the outer 14 percent of blade span ±2 percent span for five bladed rotors, constituting the outer 13 percent of the blade span ±2 percent span for six bladed rotors, constituting the outer 12.5 percent of the blade span ±2 percent span for seven bladed rotors, and constituting the outer 12 percent of blade span ±2 percent span for eight bladed rotors and connected to said central portion and constituting the blade outer extremity and cooperating with said blade root portion and said blade central portion to define the blade span and shaped to have: 1. a generally negative non-linear twist of values ranging between −1° and about −8°,
2. A substantially constant chord dimension throughout most of its span,
3. a trapezoidal tip commencing at the span 95 percent station ±2 percent and reducing uniformly in chord dimension so that the blade tip chord is about 60 percent of the blade chord dimension and so that the tip aerodynamic center remains at the same chord station,
4. a thickness about 9.5 percent chord dimension, and
5. being forward cambered with the maximum camber of about 0.8 percent chord dimension and at about the 27 percent chord station.

15. A helicopter blade having:
A. a central portion with a twist of about 31 14°, and
B. a tip portion constituting about the outer 29 ± 2 percent blade span for one bladed rotors, the outer 22.5 ± 2 percent for two bladed rotors, the outer 18 ± 2 percent blade span for three bladed rotors, the outer 15.5 ± 2 percent blade span for four bladed rotors, the outer 14 ± 2 percent blade span for five bladed rotors, the outer 13 ± 2 percent blade span for six bladed rotors, the outer 12.5 ± 2 percent blade span for seven bladed rotors, and the outer 12 ±2 percent blade span for eight bladed rotors and having:
1. generally negative non-linear twist of values ranging between −1° and −8°,
2. a planform of constant chord dimension with a trapezoidal tip, 3. a thickness of about 9.5 percent chord dimension, and
4. maximum camber of about 0.8 percent chord dimension at about the 27 percent chord station.

16. A helicopter blade having:
A. a central portion with a twist of about −14°, and
B. a tip portion constituting about the outer 29 ± 2 percent blade span for one bladed rotors, the outer 22.5 ± 2 percent blade span for two bladed rotors, the outer 18 ± 2 percent blade span for three bladed rotors, the outer 15.5 ±2 percent blade span for four bladed rotors, the outer 14 ± 2 blade span for five bladed rotors, the outer 13 ± 2 percent blade span for six bladed rotors, the outer 12.5 ± 2 percent blade span for seven bladed rotors, and the outer 12 ± 2 percent blade span for eight bladed rotors nad having:
1. generally negative non-linear twist of values ranging from −1° and −8°,
2. a planform of constant chord dimension with a trapezoidal tip,
3. and having an airfoil cross section shaped to increase in lift capacity with increased angle-of-attack.

17. A blade according to claim 15 wherein said tip portion is swept forward at a blade span inboard station and rearward at a blade span outboard station.

18. A blade according to claim 15 wherein said blade central portion has a twist of −20° or less.

19. A blade according to claim 15 wherein said trapezoidal tip commences at the span 95 percent station ±2 percent and reduces uniformly in chord dimension so that the blade tip chord is about 60 percent of the blade chord dimension and so that the tip center of lift remains at the same chord station.

20. A blade according to claim 15 wherein the blade central portion thickness is 11 percent chord dimension.

21. A blade according to claim 15 wherein the blade camber is shaped to produce a blade pitching moment coefficient less than 0.03 before moment divergence at subsonic Mach numbers.

22. A blade according to claim 1 wherein said tip portion is of constant planform.

23. A blade according to claim 22 and including means to cause said tip portion to be actuatable between a constant platform and a trapezoidal tip shape.

24. A helicopter blade having a span dimension, a chord dimension, a tip and including:
A. a blade root section adapted to be connected to a rotor hub for rotation therewith in both hover and forward flight modes of operation,
B. a blade central portion connected to said blade root portion and extending outwardly therefrom,
C. a blade tip portion connected to said central portion and constituting the blade outer extremity and cooperating with said blade root portion and said blade central portion to define the blade span and shaped to have:

1. a generally negative non-linear twist of values ranging between −1 and about −8°,
2. a substantially constant chord dimension throughout most of its span,
3. a rearwardly swept tip,
4. a thickness between 6 and 10 percent chord dimension, and
5. being cambered with the maximum camber forward of the 50 percent chord station.

25. A blade according to claim 24 wherein said tip portion is swept forward at a blade span inboard station and rearward at a blade span outboard station.

26. A blade according to claim 24 wherein said tip portion constituting the outer 29 percent of the blade span ± 2 percent span in a one bladed rotor, constituting the outer 22.5 percent ± 2 percent blade span for two bladed rotors, the outer 18 percent of the blade span ± 2 percent span in a three bladed rotors, constituting the outer 15.5 percent of the blade span ± 2 percent span for four bladed rotors, constituting the outer 14 percent of blade span ± 2 percent span for five bladed rotors, constituting the outer 13 percent of the blade span ± 2 percent span for six bladed rotors, constituting the outer 12.5 percent of the blade span ± 2 percent span for seven bladed rotors, and constituting the outer 12 percent of blade span ± 2 percent span for eight bladed rotors.

27. A blade according to claim 24 wherein said blade central portion has a twist ranging from 0 to −20° and said generally non-linear tip twist commences at about the 71 percent span station ± 2 percent span for one bladed rotors and extending to the blade tip, commences at about the 77.5 percent span station ± 2 percent span for two bladed rotors, commences at about the 82 percent span station ± 2 percent span for three bladed rotors and extends to the blade tip, commences at about the 85.5 percent span station ± 2 percent span for four bladed rotors and extends to the blade tip, commences at about the 86 percent span station ± 2 percent span for five bladed rotors and extends to the blade tip, commences at about the 87 percent span station ± 2 percent span for six bladed rotors and extends to the blade tip, commences at about the 87.5 percent span station ± 2 percent span for a seven bladed rotor and extends to the span tip, and commences at about the 88 percent span station ± 2 percent span for eight bladed rotors and extends to the blade tip.

28. A blade according to claim 27 wherein said twist is about −14 degrees.

29. A blade according to claim 24 wherein said thickness is about 9.5 percent chord dimension and wherein said maximum camber is about 0.8 percent chord dimension and is a forward camber located forward of the 30 percent chord station.

30. A blade according to claim 24 wherein said blade tip portion is of airfoil cross section defined by the formula:

$$0 \leq \frac{x}{c} \leq .25 \begin{cases} \frac{y_u}{c} = \frac{t}{c}\left[ 1.307\sqrt{\frac{x}{c}} + 3.767\frac{x}{c} - 46.7\left(\frac{x}{c}\right)^2 + 201.3\left(\frac{x}{c}\right)^3 - 316.8\left(\frac{x}{c}\right)^4 \right] \\ \frac{y_L}{c} = \frac{t}{c}\left[ -1.162\sqrt{\frac{x}{c}} - 2.256\frac{x}{c} + 37.2\left(\frac{x}{c}\right)^2 - 170.2\left(\frac{x}{c}\right)^3 + 272.9\left(\frac{x}{c}\right)^4 \right] \end{cases}$$

$$.25 \leq \frac{x}{c} \leq 1.0 \begin{cases} \frac{y_u}{c} = \frac{t}{c}\left[ 6.6134\left(\frac{x}{c}\right) - 28.04\left(\frac{x}{c}\right)^2 + 56.42\left(\frac{x}{c}\right)^3 - 56\left(\frac{x}{c}\right)^4 + 21.15\left(\frac{x}{c}\right)^5 \right] \\ \frac{y_L}{c} = \frac{t}{c}\left[ -4.7661\left(\frac{x}{c}\right) + 20.53\left(\frac{x}{c}\right)^2 - 41.92\left(\frac{x}{c}\right)^3 + 42\left(\frac{x}{c}\right)^4 - 16\left(\frac{x}{c}\right)^5 \right] \end{cases}$$

where $X$ is a chord station measured from the blade leading edge, $C$ is the chord dimension, $t$ is maximum blade thickness, $Y_u$ is the upper airfoil location at station $X$, and $Y_L$ is the lower airfoil location at $X$ and where the leading edge radii can be defined by the following equations:

leading edge radius upper: $\rho_u/c = (t/c)^2(.01/.095^2)$
leading edge radius lower: $\rho_L/c = (t/c)^2(.0066/.095^2)$ where $\rho_u$ is the leading edge radius of the blade upper airfoil and $\rho_L$ is the leading edge radius of the lower blade airfoil, both taken from a point on the blade chord, and within a range of ± 3 percent of the values of $Y_u$, $Y_L$, $\rho_u$ and $\rho_L$ so calculated.

31. A blade according to claim 24 wherein said blade tip portion is of airfoil cross section defined by the coordinates:

| X/C | $Y_u/t$ | $Y_L/t$ |
|---|---|---|
| .0125 | .1863 | −.1526 |
| .025 | .2737 | −.221 |
| .05 | .387 | −.2993 |
| .075 | .45 | −.3395 |
| .1 | .4926 | −.3642 |
| .15 | .5442 | −.3937 |
| .2 | .5734 | −.4087 |
| .25 | .5842 | −.4147 |
| .3 | .5815 | −.4122 |
| .4 | .5578 | −.3959 |
| .5 | .5109 | −.3627 |
| .6 | .4434 | −.3145 |
| .7 | .3553 | −.2509 |
| .85 | .2486 | −.1745 |
| .9 | .1345 | −.0905 |
| .975 | .0345 | −.0244 | where $X$ is a chord station measured from the blade leading edge, $C$ is the chord dimension, $t$ is maximum blade thickness, $Y_u$ is the upper airfoil location at station $X$, and $Y_L$ is the lower airfoil location at station $X$, and where the leading edge radii can be defined by the following equations:

leading edge radius upper: $\rho_u/c = (t/c)^2 1.108$
leading edge radius lower: $\rho_L/c = (t/c)^2 .7313$ where $\rho_u$ is the leading edge radius of the blade upper airfoil section taken from a point on the blade chord, wherein $C$ is the chord dimension, wherein $t$ is maximum blade thickness, and where $\rho_L$ is the leading edge radius of the blade lower airfoil section taken from a point on the blade chord, and within a range of ± 3 percent of the values of $Y_u/t$, $Y_L/t$, $\rho_u$ and $\rho_L$ so determined.

32. A blade according to claim 24 wherein the blade central portion thickness ranges between 9–18 percent chord dimension and has a uniform twist equal to or less than 20°.

33. A blade according to claim 24 wherein the blade camber is maximum at about the blade 27 percent chord station and is shaped to produce a blade pitching moment coefficient within the range ±0.03 before moment divergence at subsonic Mach numbers.

34. A blade according to claim 25 wherein the blade tip portion sweep commences at about the blade 87 percent span station and wherein the forward sweep and rearward sweep are of maximum angular sweep limits between 30° and 40°.

35. A helicopter blade having a span dimension, a chord dimension, a tip and including:
   A. a blade root section adapted to be connected to a rotor hub for rotation therewith in both hover and forward flight modes of operation,
   B. a blade central portion having a twist less than 20° and connected to said blade root portion and extending outwardly therefrom,
   C. a blade tip portion constituting about the outer 29 ± 2 percent blade span for one bladed rotors, the outer 22.5 ± 2 percent blade span for two bladed rotors, constituting the outer 18 percent of the blade span ± 2 percent span in a three bladed rotor, constituting the outer 15.5 percent of the blade span ± 2 percent span for four bladed rotors, constituting the outer 14 percent of blade span ± 2 percent span for five bladed rotors, constituting the outer 13 percent of the blade span ± 2 percent span for six bladed rotors, constituting the outer 12.5 percent of the blade span ± 2 percent for seven bladed rotors, and constituting the outer 12 percent of blade span ± 2 percent span for eight bladed rotors and connected to said central portion and constituting the blade outer extremity and cooperating with said blade root portion and said blade central portion to define the blade span and shaped to have:
      1. a generally negative non-linear twist of values ranging between −1° and about −8°,
      2. a substantially constant chord dimension throughout most of its span,
      3. a rearwardly swept tip shaped to establish a tip lift vector offset from blade elastic axis to produce a nose-up moment on the advancing blade during high speed flight,
      4. a thickness about 9.5 percent chord dimension, and
      5. being forward cambered with the maximum camber of about 0.8 percent chord dimension and at about the 27 percent chord station.

36. A blade according to claim 35 wherein said tip is swept forward and then rearward and shaped and constructed to mass balance the tip so that the effective tip chordwise center of gravity is on or forward of the tip elastic axis.

37. A helicopter blade having:
   A. a central portion with a selected twist,
   B. a tip portion constituting about the outer 29 ± 2 percent blade span for one bladed rotors, the outer 22.5 ± 2 percent blade span for two bladed rotors, constituting the outer 18 percent of the blade span ± 2 percent span in a three bladed rotor, constituting the outer 15.5 percent of the blade span ± 2 percent span for four bladed rotors, constituting the outer 14 percent of blade span ± 2 percent span for five bladed rotors, constituting the outer 13 percent of the blade span ± 2 percent span for six bladed rotors, constituting the outer 12.5 percent of the blade span ± 2 percent span for seven bladed rotors, and constituting the outer 12 percent of blade span ± 2 percent span for eight bladed rotors and connected to said central portion and constituting the blade outer extremity and cooperating with said blade root portion and said blade central portion to define the blade span and shaped to have:
1. generally negative non-linear twist of values ranging between −1° and −8°,
2. a planform of constant chord dimension,
3. a thickness of about 9.5 percent chord dimension,
4. maximum camber of about 0.8 percent chord dimension at about the 27 percent chord station, and
5. a rearwardly swept tip shaped to establish a tip lift vector offset from the blade elastic axis to produce a nose-up moment on the advancing blade during high speed flight.

38. A helicopter blade having:
A. a central portion with a selected twist,
B. a tip portion constituting about the outer 29 ± 2 percent blade span for one bladed rotors, the outer 22.5 ± 2 percent blade span for two bladed rotors, constituting the outer 18 percent of the blade span ± 2 percent span in a three bladed rotor, constituting the outer 15.5 percent of the blade span ± 2 percent span for four bladed rotors, constituting the outer 14 percent of blade span ± 2 percent span for five bladed rotors, constituting the outer 13 percent of the blade span ± 2 percent span for six bladed rotors, constituting the outer 12.5 percent of the blade span ± 2 percent span for seven bladed rotors, and constituting the outer 12 percent of blade span ± 2 percent span for eight bladed rotors and connected to said central portion and constituting the blade outer extremity and cooperating with said blade root portion and said blade central portion to define the blade span and shaped to have:
1. generally negative non-linear twist of values ranging between −1° to −8°,
2. a planform of constant chord dimension throughout most of its span,
3. having an airfoil cross section shaped to increase in lift capacity and improve rotor efficiency, and having low pitching moments, and
4. a rearwardly swept tip shaped to establish a tip lift vector offset from the blade elastic axis to produce a nose-up moment on the advancing blade during high speed flight.

39. A blade according to claim 37 wherein said tip portion is swept forward at a blade span inboard station and rearward at a blade span outboard station.

40. A blade according to claim 37 wherein said blade central portion has a twist of −20° or less and said generally non-linear twist of the tip portion commences at about the 71 percent span station ± 2 percent for one bladed rotors and extending to the blade tip, commences at about the 77.5 percent span station ± 2 percent span for two bladed rotors, commences at about the 82 percent span station ± 2 percent span for three bladed rotors, at about the 84.5 percent span station ± 2 percent span for four bladed rotors, at about the 86 percent span station ± 2 percent span for five bladed rotors, at about the 87 percent span station ± 2 percent span for six bladed rotors, at about the 87.5 percent span station ± 2 percent span for seven bladed rotors, and at about 88 percent span station ± 2 percent span for eight bladed rotors and extending for all such blades to the blade tip.

41. A blade according to claim 37 wherein the blade central portion thickness is 11 percent chord dimension.

42. A blade according to claim 37 wherein the blade camber is shaped to produce a blade pitching moment coefficient less than 0.03 before moment divergence at subsonic Mach numbers.

43. A blade according to claim 24 wherein said blade tip portion is rearwardly swept sufficiently to establish a lift vector or aerodynamic center at the blade tip which is offset from the blade tip elastic axis so as to produce a nose-up moment during forward flight mode of operation on the advancing blade.

44. A blade according to claim 25 wherein said blade tip portion is constructed so as to be mass balanced to establish the blade tip portion effective chordwise center of gravity on or slightly forward of the blade tip elastic axis.

45. A blade according to claim 44 wherein mass balance is accomplished by adding a selective balance weight in the region of blade forward sweep.

46. A blade according to claim 25 and wherein said blade tip portion is shaped and constructed so as to establish a lift vector or aerodynamic center of said tip portion offset from the tip portion elastic axis during high speed forward flight to produce a nose-up moment on the advancing blades and so as to be mass balanced to establish an effective tip chordwise center of gravity on or forward of the tip elastic axis and to produce minimum pitching moments.

47. A blade according to claim 24 and including means to actuate at least a portion of said blade tip portion between a non-swept position and a rearwardly swept position.

48. A blade according to claim 25 and including means to actuate at least a portion of said blade tip portion between a non-swept position and a rearwardly swept position.

49. A blade according to claim 24 wherein said tip portion is of constant planform.

50. A helicopter blade having a span dimension, a chord dimension, a tip and including:
A. a blade root section adapted to be connected to a rotor hub for rotation therewith in both hover and forward flight modes or operation,
B. a blade central portion connected to said blade root portion and extending outwardly therefrom,
C. a blade tip portion connected to said central portion and constituting the blade outer extremity and cooperating with said blade root portion and said blade central portion to define the blade span and shaped to have:
1. a generally negative non-linear twist of values ranging between −1° and about −8°,
2. a substantially constant chord dimension throughout most of its span,
3. a thickness between 6 and 10 percent chord dimension, and 4. being cambered with the maximum camber forward of the 50 percent chord station.

51. A blade according to claim 50 wherein said tip portion constituting about the outer 29 ± 2 percent blade span for one bladed rotors, the outer 22.5 ± 2 percent blade span for two bladed rotors, constituting the outer 18 percent of the blade span ± 2 percent span in a three bladed rotor, constituting the outer 15.5 percent of the blade span ± 2 percent span for four bladed rotors, constituting the outer 14 percent of blade span ± 2 percent span for five bladed rotors, constituting the outer 13 percent of the blade span ± 2 percent span for six bladed rotors, constituting the outer 12.5 percent of the blade span ± 2 percent span for seven bladed rotors, and constituting the outer 12 percent of the blade span ± 2 percent span for eight bladed rotors.

52. A blade according to claim 50 wherein said blade central portion has a twist ranging from 0 to −20° and said generally non-linear twist of the tip portion commences at about the 71 percent span station ± 2 percent span for one bladed rotors and extending to the blade tip, commences at about the 77.5 percent span station ± 2 percent span for two bladed rotors, commences at about the 82 percent span station ± 2 percent span for three bladed rotors, at about the 84.5 percent span station ± 2 percent span for four bladed rotors, at about the 86 percent span station ± 2 percent span for five bladed rotors at about the 87 percent span station ± 2 percent span for six bladed rotors, at about the 87.5 percent span station ± 2 percent span for seven bladed rotors, and at about the 88 percent span station ± 2 percent span for eight bladed rotors, and extending for all such blades to the blade tip.

53. A blade according to claim 50 wherein said thickness is about 9.5 percent chord dimension and wherein said maximum camber is about 0.8 percent chord dimension and is a forward camber located forward of the 30 percent chord station to thereby produce low blade pitching moments without sacrificing higher maximum lift coefficient and drag divergence aerodynamic characteristics.

54. A blade according to claim 50 wherein said blade tip portion is of airfoil cross section defined by the formula:

$$0 \leq \frac{x}{c} \leq .25 \begin{cases} \frac{y_u}{c} = \frac{t}{c}\left[ 1.307 \sqrt{\frac{x}{c}} + 3.767\frac{x}{c} - 46.7\left(\frac{x}{c}\right)^2 + 201.3\left(\frac{x}{c}\right)^3 - 316.8\left(\frac{x}{c}\right)^4 \right] \\ \\ \frac{y_L}{c} = \frac{t}{c}\left[ -1.162 \sqrt{\frac{x}{c}} - 2.256\frac{x}{c} + 37.2\left(\frac{x}{c}\right)^2 - 170.2\left(\frac{x}{c}\right)^3 + 272.9\left(\frac{x}{c}\right)^4 \right] \end{cases}$$

$$.25 \leq \frac{x}{c} \leq 1.0 \begin{cases} \frac{y_u}{c} = \frac{t}{c}\left[ 6.6134\left(\frac{x}{c}\right) - 28.04\left(\frac{x}{c}\right)^2 + 56.42\left(\frac{x}{c}\right)^3 - 56\left(\frac{x}{c}\right)^4 + 21.15\left(\frac{x}{c}\right)^5 \right] \\ \\ \frac{y_L}{c} = \frac{t}{c}\left[ -4.7661\left(\frac{x}{c}\right) + 20.53\left(\frac{x}{c}\right)^2 - 41.92\left(\frac{x}{c}\right)^3 + 42\left(\frac{x}{c}\right)^4 - 16\left(\frac{x}{c}\right)^5 \right] \end{cases}$$

where $X$ is a chord station measured from the blade leading edge, $C$ is the chord dimension, $t$ is maximum blade thickness, $Y_u$ is the upper airfoil location at station $X$, and $Y_L$ is the lower airfoil location at $X$ and where the leading edge radii can be defined by the following equations:

leading edge radius upper: $\rho_u/c = (t/c)^2\, 1.108$
leading edge radius lower: $\rho_L/c = (t/c)^2\, .7313$ where $\rho_u$ is the leading edge radius of the blade upper airfoil and $\rho_L$ is the leading edge radius of the lower blade airfoil, both taken from a point on the blade chord, and within a range of ± 3 percent of the values of $Y_u$, $Y_L$, $\rho_u$ and $\rho_L$ so calculated.

55. A blade according to claim 50 wherein said blade tip portion is of airfoil cross section defined by

| X/C | $Y_u/t$ | $Y_L/t$ |
|---|---|---|
| .0125 | .1863 | −.1526 |
| .025 | .2737 | −.221 |
| .05 | .387 | −.2993 |
| .075 | .45 | −.3395 |
| .1 | .4926 | −.3642 |
| .15 | .5442 | −.3937 |
| .2 | .5734 | −.4087 |
| .25 | .5842 | −.4147 |
| .3 | .5815 | −.4122 |
| .4 | .5578 | −.3959 |
| .5 | .5109 | −.3627 |
| .6 | .4434 | −.3145 |
| .7 | .3553 | −.2509 |
| .85 | .2486 | −.1745 |
| .9 | .1345 | −.0905 |
| .975 | .0345 | −.0244 | where $X$ is a chord station measured drom the blade leading edge, $C$ is the chord dimension, $t$ is maximum blade thickness, $Y_u$ is the upper airfoil location at station $X$, and $Y_L$ is the lower airfoil location at station $X$, and where the leading edge radii can be defined by the following equations:

leading edge radius upper: $\rho_u/c = (t/c)^2\, 1.108$
leading edge radius lower: $\rho_L/c = (t/c)^2\, .7313$ where $\rho_u$ is the leading edge radius of the blade upper airfoil section taken from a point on the blade chord, wherein $C$ is the chord dimension, wherein $t$ is maximum blade thickness, and where $\rho_L$ is the leading edge radius of the blade lower airfoil section taken from a point on the blade chord, and within a range of ± 3 percent of the values of $Y_u/t$, $Y_L/t$, $\rho_u$ and $\rho_L$ so determined.

56. A blade according to claim 50 wherein the blade central portion thickness is between 9–18 percent chord dimension and has a uniform twist of 20° or less.

57. A blade according to claim 50 wherein the blade camber is maximum at about the blade 27 percent chord station and is shaped to produce a blade pitching moment coefficient within the range ± .03 before moment divergence at subsonic Mach numbers.

58. A blade according to claim 50 wherein said tip portion is of constant planform.

59. A helicopter blade having:
A. a central portion with a selected twist,
B. a tip portion constituting about the outer 29 ± 2 percent blade span for one bladed rotors, the outer 22.5 ± 2 percent blade span for two bladed rotors, constituting the outer 18 percent of the blade span ±2 percent span in a three bladed rotor, constituting the outer 15.5 percent of the blade span ± 2 percent span for four bladed rotors, constituting the outer 14 percent of blade span ± 2 percent span for five bladed rotors, constituting the outer 13 percent of the blade span ± 2 percent span for six bladed rotors, constituting the outer 12.5 percent of the blade span ± 2 percent span for seven bladed rotors, and constituting the outer 12 percent of blade span ± 2 percent span for eight bladed rotors and connected to said central portion and constituting the blade outer extremity and cooperating with said blade root portion and said blade central portion to define the blade span and shaped to have:
1. generally negative non-linear twist of values ranging between −1° and −8°,
2. a planform of constant chord dimension throughout most of its span,
3. a thickness of about 9.5 percent chord dimension, and
4. maximum camber of about 0.8 percent chord dimension at about the 27 percent chord station.

60. A helicopter blade having:
A. a central portion with a selected twist, and
B. a tip portion constituting about the outer 29 ± 2 percent blade span for one bladed rotors, the outer 22.5 ± 2 percent blade span for two bladed rotors, constituting the outer 18 percent of the blade span ± 2 percent span in a three bladed rotor, constituting the outer 15.5 percent of the blade span ± 2 percent span for four bladed rotors, constituting the outer 14 percent of the blade span ± 2 percent span for five bladed rotors, constituting the outer 13 percent of the blade span ± 2 percent span for six bladed rotors, constituting the outer 12.5 percent of the blade span ± 2 percent span for seven bladed rotors, and constituting the outer 12 percent of blade span ± 2 percent span for eight bladed rotors and connected to said central portion and constituting the blade outer extremity and cooperating with said blade root portion and said blade central portion to define the blade span and shaped to have:
1. generally negative non-linear twist of values ranging between −1° and −8°,
2. a planform of constant chord dimension throughout most of its span, and
3. having an airfoil cross section shaped to increase in lift capacity and improve rotor efficiency, and having low pitching moments.

61. A blade according to claim 59 wherein the blade camber is shaped to produce a blade pitching moment coefficient less than 0.03 before amount divergence at subsonic Mach numbers.

62. A blade according to claim 60 wherein said airfoil cross section is chaped to produce a maximum lift coefficient, $C_{L\ max}$, of at least 1.41 and 1.0 at tip Mach numbers of 0.3 and 0.6, respectively, and a drag divergence Mach number of at least 0.76 at a lift coefficient of 0.2 and wherein the maximum camber is maximum at about the blade 27 percent chord station and is shaped to produce a blade pitching moment coefficient within the range ± .03 before moment divergence at subsonic Mach numbers.

63. A blade according to claim 1 and having solidity of 0.115 wherein said blade tip portion twist is −4.67° at the 100 percent blade span station, with a tolerance of +3° and −1° twist and a tolerance of ± 2 percent span for the span station for blades used with rotors having between one and eight blades; is −4.67° at the 71 percent span station for one bladed rotors, at the 77.5 percent span station for two bladed rotors, the 90 percent blade span station for three bladed rotors, at the 92.5 percent blade span station for four bladed rotors, at the 94 percent blade span station for five bladed rotors, at the 95 percent blade span station for six bladed rotors, at the 95.5 percent blade span station for seven bladed rotors, and at the 96 percent blade span station for eight bladed rotors, and having ± 2° twist tolerance and ± 2 percent span station tolerance; is −2.62° at the 74.5 percent blade span station for one bladed rotors, at the 80.5 percent blade span station for two bladed rotors, at the 84.5 percent blade span station for three bladed rotors, at the 87 percent blade span station for four bladed rotors, at the 88.5 percent blade span station for five bladed rotors, at the 89.5 percent blade span station for six bladed rotors, at the 90 percent blade span station for seven bladed rotors and at the 90.5 percent blade span station for eight bladed rotors, and having twist tolerance between +3° and −.5°, and a span station tolerance of ± 2 percent span; and −1.2 degrees at the 71 percent blade span station for one bladed rotors, at the 77.5 percent blade span station for two bladed rotors, at the 82 percent blade span station for three bladed rotors, at the 84.5 percent blade span station for four bladed rotors, at the 86 percent blade span station for five bladed rotors, at the 87 percent blade span station for six bladed rotors, at the 87.5 percent blade span station for seven bladed rotors, and at the 88 percent blade span station for eight bladed rotors, and with a twist tolerance of ± 1° and a span station tolerance of ± 2 percent span, and varies substantially linearly between these span stations.

64. A blade according to claim 24 and having solidity of .115 wherein said blade tip portion twist is −4.67° at the 100 percent blade span station, with a tolerance of +3° and −1° twist and a tolerance of ± 2 percent span for the span station for blades used with rotors having between one and eight blades; is −4.67° at the 71 percent span station for one bladed rotors, at the 77.5 percent span station for two bladed rotors, at the 90 percent blade span station for three bladed rotors, at the 92.5 percent blade span station for four bladed rotors, at the 94 percent blade span station for five bladed rotors, at the 95 percent blade span station for six bladed rotors, at the 95.5 percent blade span station for seven bladed rotors, and at the 96 percent blade span station for eight bladed rotors, and having ± 2° twist tolerance and ± 2 percent span station tolerance; is −2.62° at the 74.5 percent blade span station for one bladed rotors, at the 80.5 percent blade span station for two bladed rotors, at the 84.5 percent blade span station for three bladed rotors, at the 87 percent blade span station for four bladed rotors, at the 88.5 percent blade span station for five bladed rotors, at the 89.5 percent blade span station for six bladed rotors, at the 90 percent blade span station for seven bladed rotors and at the 90.5 percent blade span station for eight bladed rotors, and having twist tolerance between +3° and −.5°, and a span station tolerance of ± 2 percent span; and −1.2° at the 71 percent blade span station for one bladed rotors, at the 77.5 percent blade span station for two bladed rotors, at the 82 percent blade span station for three bladed rotors, at the 84.5 percent blade span station for four bladed rotors, at the 86 percent blade span station for five bladed rotors, at the 87 percent blade span station for six bladed rotors, at the 87.5 percent blade span station for seven bladed rotors, and at the 88 percent blade span station for eight bladed rotors, and with a twist tolerance of $\pm 1°$ and a span station tolerance of $\pm 2$ percent span and varies substantially linearly between these span stations.

65. A blade according to claim 50 and having solidity of .115 wherein said blade tip portion twist is $-4.67°$ at the 100 percent blade span station, with a tolerance of $+3°$ and $-1°$ twist and a tolerance of $\pm 2$ percent span for the span station for blades used with rotors having between one and eight blades; is $-4.67°$ at the 71 percent span station for one bladed rotors, at the 77.5 percent span station for two bladed rotors, at the 90 percent blade span station for three bladed rotors, at the 92.5 percent blade span station for four bladed rotors, at the 94 percent blade span station for five bladed rotors, at the 95 percent blade span station for six bladed rotors, at the 95.5 percent blade span station for seven bladed rotors, and at the 96 percent blade span station for eight bladed rotors, and having $\pm 2°$ twist tolerance and $\pm 2$ percent span station tolerance; is $-2.62°$ at the 74.5 percent blade span station for one bladed rotors, at the 80.5 percent blade span station for two bladed rotors, at the 84.5 percent blade span station for three bladed rotors, at the 87 percent blade span station for four bladed rotors, at the 88.5 percent blade span station for five bladed rotors, at the 89.5 percent blade span station for six bladed rotors, at the 90 percent blade span station for seven bladed rotors, and at the 90.5 percent blade span station for eight bladed rotors, and having twist tolerance between $+3°$ and $-.5°$, and a span station tolerance of $\pm 2$ percent span; and $-1.2°$ at the 71 percent blade span station for one bladed rotors, at the 77.5 percent blade span station for two bladed rotors, at the 82 percent blade span station for three bladed rotors, at the 84.5 percent blade span station for four bladed rotors, at the 86 percent blade span station for five bladed rotors, at the 87 percent blade span station for six bladed rotors, at the 87.5 percent blade span station for seven bladed rotors, and at the 88 percent blade span station for eight bladed rotors, and with a twist tolerance of $\pm 1°$ and a span station tolerance of $\pm 2$ percent span and varies substantially linearly between these span stations.

66. A blade according to claim 1 having a solidity equal to .115 wherein said blade tip portion twist is equal to: the blade basic twist $-1.83°$ at the 100 percent span station for blades used with one to eight bladed rotors, and with a tolerance of $+3°$ and $-1°$; the blade basic twist $-2.33°$ at the 80 percent span station for one bladed rotors, at the 85.5 percent span station for two bladed rotors, at the 90 percent span station for three bladed rotors, at the 92.5 percent span station for four bladed rotors, at the 94 percent span station for five bladed rotors, at the 95 percent span station for six bladed rotors, at the 95.5 percent span station for seven bladed rotors, and at the 96 percent span station for eight bladed rotors, with a twist tolerance of $+2°$ and $-1°$; the blade basic twist $-1.2°$, at the 74.5 percent blade span station for one bladed rotors, at the 80.5 percent blade span station for two bladed rotors, at the 84.5 percent span station for three bladed rotors, at the 87 percent span station for four bladed rotors, at the 88.5 percent span station for five bladed rotors, at the 89.5 percent span station for six bladed rotors, at the 90 percent span station for seven bladed rotors, and at the 90.5 percent span station for eight bladed rotors, with a twist tolerance of $+3°$ and $-.5°$; and the blade basic twist at the 87 percent span station, $\pm 1°$.

67. A blade according to claim 24 having a solidity equal to .115 wherein said blade tip portion twist is equal to: the blade basic twist $-1.83°$ at the 100 percent span station for blades used with one to eight bladed rotors, and with a tolerance of $+3°$ and $-1°$; the blade basic twist $-2.33°$ at the 80 percent span station for one bladed rotors, at the 85.5 percent span station for two bladed rotors, at the 90 percent span station for three bladed rotors, at the 92.5 percent span station for four bladed rotors, at the 94 percent span station for five bladed rotors, at the 95 percent span station for six bladed rotors, at the 95.5 percent span station for seven bladed rotors, and at the 96 percent span station for eight bladed rotors, with a twist tolerance of $+2°$ and $-1°$; the blade basic twist $-1.2°$, at the 74.5 percent blade span station for one bladed rotors, at the 80.5 percent blade span station for two bladed rotors, at the 84.5 percent span station for three bladed rotors, at the 87 percent span station for four bladed rotors, at the 88.5 percent span station for five bladed rotors, at the 89.5 percent span station for six bladed rotors, at the 90 percent span station for seven bladed rotors, and at the 90.5 percent span station for eight bladed rotors, with a twist tolerance of $+3°$ and $-.5°$; and the blade basic twist at the 87 percent span station, $\pm 1°$.

68. A blade according to claim 50 having a solidity equal to .115 wherein said blade tip portion twist is equal to: the blade basic twist $-1.83°$ at the 100 percent span station for blades used with one to eight bladed rotors, and with a tolerance of $+3°$ and $-1°$; the blade basic twist $-2.33°$ at the 80 percent span station for one bladed rotors, at the 85.5 percent span station for two bladed rotors, at the 90 percent span station for three bladed rotors, at the 92.5 percent span station for four bladed rotors, at the 94 percent span station for five bladed rotors, at the 95 percent span station for six bladed rotors, at the 95.5 percent span station for seven bladed rotors, and at the 96 percent span station for eight bladed rotors, with twist tolerance of $+2°$ and $-1°$; the blade basic twist $-1.2°$, at the 74.5 percent blade span station for one bladed rotors, at the 80.5 percent blade span station for two bladed rotors, at the 84.5 percent span station for three bladed rotors, at the 87 percent span station for four bladed rotors, at the 88.5 percent span station for five bladed rotors, at the 89.5 percent span station for six bladed rotors, at the 90 percent span station for seven bladed rotors, and at the 90.5 percent span station for eight bladed rotors, with a twist tolerance of $+3°$ and $-.5°$; and the blade basic twist at the 87 percent span station, $\pm 1°$.

69. A helicopter blade having a span dimension, a chord dimension, a tip and including:
   A. a blade root section adapted to be connected to a rotor hub for rotation therewith in both hover and forward flight modes of operation,
   B. a blade central portion connected to said blade root portion and extending outwardly therefrom,
   C. a blade tip portion connected to said central portion and constituting the blade outer extremity and cooperating with said blade central portion to define the blade span and shaped to have:

1. a generally negative non-linear twist of values ranging between −1 and about −8 degrees and wherein said tip portion local twist can be particularly defined for six bladed rotors with a design blade loading, $C_t/\sigma$, in hover of about .09 as follows: $\theta_{Beta\ Tip,\ X} = \theta_{Base,\ X} + \Delta\theta_X$, for span station ranging from $.71 \leq X \leq 1$ for one bladed rotors, $.775 \leq X \leq 1$ for two bladed rotors, $.82 \leq X \leq 1$ for three bladed rotors, $.845 \leq X \leq 1$ for four bladed rotors, $.86 \leq X \leq 1$ for five bladed rotors, $.87 \leq X \leq 1$ for six bladed rotors, $87.5 \leq X \leq 1$ for seven bladed rotors, $.88 \leq X \leq 1$ for eight bladed rotors. Where $\theta_{Beta\ Tip,X}$ equals the Beta Tip twist at span station X, and $\Delta\theta_X$ equals change of twist between blade basic twist, $\theta_{Base,\ X}$, and $\theta_{Beta\ Tip,X}$ at station X, and where the blade basic twist for the linear case at span station X is defined:

$\theta_{Base,\ X} = \theta_1 (X - .75)$, Where X equals percent span station, $\theta_1$ equals blade basic twist and $\theta_{Base,\ X}$ equals blade basic twist at X, and, assuming that $\theta_1$ is negative, the change in twist $\Delta\theta_X$ at stations $X = 1$, 0.95, 0.895, and 0.87, which are 100 percent, 80 percent, 74.5 percent and 71 percent for one bladed rotors, which are 100 percent, 85.5 percent, 80.5 percent and 77.5 percent for two bladed rotors, which are 100 percent, 90 percent, 84.5 percent and 82 percent for three bladed rotors, which are 100 percent, 92.5 percent, 87 percent and 84.5 percent for four bladed rotors, which are 100 percent, 94 percent, 88.5 percent and 86 percent for five bladed rotors, which are 100 percent, 95 percent, 89.5 percent and 87 percent for six bladed rotors, which are 100 percent, 95.5 percent, 90 percent and 87.5 percent for seven bladed rotors, and which are 100 percent, 96 percent, 90.5 percent and 88 percent for eight bladed rotors, respectively, can be defined as follows:

$\Delta\theta_{1.0} = [\Delta\theta_{.95} + .5°] + 3°, -1°$ tolerance. Where $\Delta\theta_{1.0}$ is change in twist at 100 percent span station and $\Delta\theta_{.95}$ is change in twist at 95 percent span station from blade basic twist, $\Delta\theta_{.95} = [-4° - 0.667\ \theta_{Base,\ X}] \pm 2°$ tolerance, $\Delta\theta_{.895} = [.4375\ \Delta\theta_{.95}] -5°, +3°$ tolerance, Where $\Delta\theta_{.895}$ is the change in twist at the 89.5 percent span station from blade basic twist, $\Delta\theta_{.87} = 0°, \pm 1°$ tolerance, Where $\Delta\theta_{87}$ is the change in twist from the blade basic twist at 87 percent span station, $\Delta\theta_X$ varies substantially linearly in the above Equations 3–6 between the indicated percent span stations, 2. a trapezoidal tip.

70. A helicopter blade having a span dimension, a chord dimension, a tip and including:

A. a blade root section adapted to be connected to a rotor hub for rotation therewith in both hover and forward flight modes of operation, B. a blade central portion connected to said blade root portion and extending outwardly therefrom, C. a blade tip portion connected to said central portion and constituting the blade outer extremity and cooperating with said blade root portion and said blade central portion to define the blade span and shaped to have:

1. generally negative non-linear twist of values ranging between −1° and about −8° and wherein said tip portion local twist can be particularly defined for six bladed rotors with a design blade loading $C_t/\sigma$, in hover in the neighborhood of .09 as follows: $\theta_{Beta\ Tip,\ X} = \theta_{Base\ X} + \Delta\theta_X$, for span station ranging from $.71 \leq X \leq 1$ for one bladed rotors, $.775 \leq X \leq 1$ for two bladed rotors, $.82 \leq X \leq 1$ for three bladed rotors, $.845 \leq X \leq 1$ for four bladed rotors, $.86 \leq X \leq 1$ for five bladed rotors, $.87 \leq X \leq 1$ for six bladed rotors, $87.5 \leq X \leq 1$ for seven bladed rotors, $.88 \leq X \leq 1$ for eight bladed rotors, Where $\theta_{Beta\ Tip,\ X}$ equals the Beta Tip twist at span station X, and $\Delta\theta_X$ equals change of twist between blade basic twist, $\theta_{Base,\ X}$, and $\theta_{Beta\ Tip,\ X}$ at station X, and where the blade baisc twist for the linear case at span station X is defined: $\theta_{Base\ X} = \theta_1 (X - .75)$, Where X equals percent span station, $\theta_1$ equals blade basic twist and $\theta_{Base,\ X}$ equals blade basic twist at X, and, assuming that $\theta_1$ is negative, the change in twist $\Delta\theta_X$ at stations $X = 1, 0.95, 0.895$, and 0.87, which are 100 percent, 80 percent, 74.5 percent and 71 percent for one bladed rotors, which are 100 percent, 85.5 percent, 80.5 percent and 77.5 percent for two bladed rotors, which are 100 percent 90 percent, 84.5 percent and 82 percent for three bladed rotors, which are 100 percent, 92.5 percent, 87 percent and 84.5 percent for four bladed rotors, which are 100 percent, 94 percent, 88.5 percent and 86 percent for five bladed rotors, which are 100 percent, 95 percent, 89.5 percent and 87 percent for six bladed rotors, which are 100 percent, 95.5 percent, 90 percent and 87.5 percent for seven bladed rotors, and which are 100 percent, 96 percent, 90.5 percent and 88 percent for eight bladed rotors, respectively, can be defined as follows:

$\Delta\theta_{.95} = [\Delta\theta_{.95} + .5°] + 3°, -1°$ tolerance. Where $\Delta\theta_{1.0}$ is change in twist at 100 percent span station and $\Delta\theta_{.95}$ is change in twist at 95 percent span station from blade basic twist.

$\Delta\theta_{.95} = [-4° - 0.667\ \theta_{Base,\ X}] \pm 2°$ tolerance.

$\Delta\theta_{.895} = [.4375\ \Delta\theta_{.95}] -5°, +3°$ tolerance.

Where $\Delta\theta_{.895}$ is the change in twist at the 89.5 percent span station from blade basic twist.

$\Delta\theta_{.87} = 0°, \pm 1°$ tolerance. Where $\Delta\theta_{87}$ is the change in twist from the blade basic twist at 87 percent span station.

$\Delta\theta_X$ varies substantially linearly in the above Equations 3–6 between the indicated percent span stations.

2. a trapezoidal tip.

71. A helicopter blade having a span dimension, a chord dimension, a tip and including:

A. a blade root section adapted to be connected to a rotor hub for rotation therewith in both hover and forward flight modes of operation, B. a blade central portion connected to said blade root portion and extending outwardly therefrom, C. a blade tip portion connected to said central portion and constituting the blade outer extremity and cooperating with said blade root portion and said blade central portion to define the blade span and shaped to have:

1. generally negative non-linear twist of values ranging between −1° and about −8° and wherein said tip portion local twist can be particularly defined for six bladed rotors for a design blade loading, $C_t/\sigma$, condition in hover of about .09 as follows:

$\theta_{Beta\ Tip,\ X} = \theta_{Base,\ X} + \Delta\theta_X$, for span station ranging from $.71 \leq X \leq 1$ for one bladed rotors, $.775 \leq X \leq 1$ for two bladed rotors, $.82 \leq X \leq 1$ for three bladed rotors, $.845 \leq X \leq 1$ for four bladed rotors, $.86 \leq X \leq 1$ for five bladed rotors, $.87 \leq X \leq 1$ for six bladed rotors, $87.5 \leq X \leq 1$ for seven bladed rotors, $88 \leq X \leq 1$ for eight bladed rotors, Where $\theta_{Beta\ Tip,\ X}$ equals the Beta Tip twist at span station X, and $\Delta\theta_X$ equals change of twist between blade basic twist, $\theta_{Base,\ X}$, and $\theta_{Beta\ Tip,\ X}$ at station X, and where the blade basic twist for the linear case at span station X is defined:

$\theta_{Base,\ X} = \theta_1 (X - .75)$,

Where $X$ equals percent span station, $\theta_1$ equals blade basic twist and $\theta_{Base,\ X}$ equals blade basic twist at $X$, and, assuming that $\theta_1$ is negative, the change in twist $\Delta\theta_X$ at stations $X = 1$, 0.95, 0.895, and 0.87, which are 100 percent, 80 percent, 74.5 percent and 71 percent for one bladed rotors, which are 100 percent, 88.5 percent, 80.5 percent and 77.5 percent for two bladed rotors, which are 100 percent, 90 percent, 84.5 percent and 82 percent for three bladed rotors, which are 100 percent, 92.5 percent, 87 percent and 84.5 percent for four bladed rotors, which are 100 percent, 94 percent, 88.5 percent and 86 percent for five bladed rotors, which are 100 percent, 95 percent, 89.5 percent and 87 percent for six bladed rotors, which are 100 percent, 95.5 percent, 90 percent and 87.5 percent for seven bladed rotors, and which are 100 percent, 96 percent, 90.5 percent and 88 percent for eight bladed rotors, respectively, can be defined as follows:

$\Delta\theta_{1.0} = [\Delta\theta_{.95} + .5°] +3°, -1°$ tolerance. Where $\Delta\theta_{1.0}$ is change in twist at 100 percent span station and $\Delta\theta_{.95}$ is change in twist at 95 percent span station from blade basic twist.

$\Delta\theta_{.95} = [-4° -0.667\ \theta_{Base,\ X}] \pm 2°$ tolerance.

$\Delta\theta_{.895} = [.4375\ \Delta\theta_{.95}] -5°, +3°$ tolerance.

Where $\Delta\theta_{.895}$ is the change in twist at the 89.5 percent span station from blade basic twist.

$\Delta\theta_{.87} = 0°, \pm 1°$ tolerance.

Where $\Delta\theta_{.87}$ is the change in twist from the blade basic twist at 87 percent span station.

$\Delta\theta$ varies substantially linearly in the above Equations 3-6 between the indicated percent span stations.

72. The method of improving helicopter rotor performance comprising selectively twisting the blade tip to reduce blade tip loading in hover operation, and selectively applying sweep to the blade tip to produce a tip aerodynamic center aft of the blade elastic axis to generate dynamic twist to thereby:
A. reduce tip twist and hence reduce tip loading on the advancing blade in high speed flight,
B. increase tip twist and hence reduce tip loading on the retreating blade in high speed flight, and
C. increase blade twist and hence reduce tip loading in hover.

73. Apparatus according to claim 1 wherein said blade tip portion has an airfoil cross-sectional shape with two dimensional aerodynamic characteristics such that at tip Mach numbers of 0.3 and 0.6, the maximum lift coefficient, $C_L$ max., is at least 1.41 and 1, respectively, and has a drag divergence Mach number of at least 0.76 at a lift coefficient of 0.2, and wherein the blade camber is shaped to produce a blade pitching moment coefficient of less than 0.03 before moment divergence at subsonic Mach numbers.

74. Apparatus according to claim 24 wherein said blade tip portion has an airfoil cross-sectional shape with two dimensional aerodynamic characteristics such that at tip Mach numbers of 0.3 and 0.6, the maximum lift coefficient, $C_L$ max., is at least 1.41 and 1, respectively, and has a drag divergence Mach number of at least 0.76 at a lift coefficient of 0.2, and wherein the blade camber is shaped to produce a blade pitching moment coefficient of less than 0.03 before moment divergence at subsonic Mach numbers.

75. Apparatus according to claim 50 wherein said blade tip portion has an airfoil cross-sectional shape with two dimensional aerodynamic characteristics such that at tip Mach numbers of 0.3 and 0.6, the maximum lift coefficient, $C_{L\ max.}$, is at least 1.41 and 1, respectively, and has a drag divergence Mach number of at least 0.76 at a lift coefficient of 0.2, and wherein the blade camber is shaped to produce a blade pitching moment coefficient of less than 0.03 before moment divergence at subsonic Mach numbers.

76. A helicopter blade having a span dimension, a chord dimension, a tip and including:
A. a blade root section adapted to be connected to a rotor hub for rotation therewith in both hover and forward flight modes of operation,
B. a blade central portion connected to said blade root portion and extending outwardly therefrom,
C. a blade tip portion connected to said central portion and constituting the blade outer extremity and cooperating with said blade root portion and said blade central portion to define the blade span, and
D. means to vary the position of the blade tip portion with respect to the remainder of the blade to thereby vary the blade tip portion twist.

77. A helicopter blade according to claim 76 wherein the blade tip portion twist is varied to be maximum at high rotor thrust operation and to be minimum at low rotor thrust operation.

78. A helicopter blade according to claim 77 wherein the twist of the blade tip portion is varied cyclically so that the advancing blade is operated at very close to zero angle of attack and retreating blade is operated below stall.

79. A helicopter blade having a span dimension, a chord dimension, a tip and including:
A. a blade root section adapted to be connected to a rotor hub for rotation therewith in both hover and forward flight modes of operation,
B. a blade central portion connected to said blade root portion and extending outwardly therefrom,
C. a blade tip portion connected to said central portion and constituting the blade outer extremity and cooperating with said blade root portion and said blade central portion to define the blade span and shaped to have:

1. a generally negative non-linear twist of values ranging between −1° and about −8°,
2. a substantially constant chord dimension throughout most of its span,
3. a trapezoidal tip,
4. a thickness between 6 and 10 percent chord dimension, and
5. being cambered with the maximum camber forward of the 50 percent chord station, D. means to vary the position of the blade tip portion with respect to the remainder of the blade to thereby vary the blade tip portion twist.

80. A helicopter blade according to claim 14 wherein said blade central portion has a twist of about −14° and a thickness of from 95 percent to 18 percent chord dimension, and an airfoil cross section incorporating moderate forward camber with maximum camber forward of the blade 50 percent chord line, and shaped and fabricated to have a locus of airfoil section aerodynamic centers displaced rearward of the blade structural elastic axis.

81. A helicopter blade according to claim 14 wherein said central portion is of airfoil cross section defined by the coordinates:

| X/C | $Y_u/t$ | $Y_L/t$ |
|---|---|---|
| .0125 | .1863 | −.1526 |
| .025 | .2737 | −.221 |
| .05 | .387 | −.2993 |
| .075 | .45 | −.3395 |
| .1 | .4926 | −.3642 |
| .15 | .5442 | −.3937 |
| .2 | .5734 | −.4087 |
| .25 | .5842 | −.4147 |
| .3 | .5815 | −.4122 |
| .4 | .5578 | −.3959 |
| .5 | .5109 | −.3627 |
| .6 | .4434 | −.3145 |
| .7 | .3553 | −.2509 |
| .85 | .2486 | −.1745 |
| .9 | .1345 | −.0905 |
| .975 | .0345 | −.0244 | where $X$ is a chord station measured from the blade leading edge, $C$ is the chord dimension, $t$ is maximum blade thickness, $Y_u$ is the upper airfoil location at station $X$, and $Y_L$ is the lower airfoil location at station $X$, and where the leading edge radii can be defined by the following equations:

leading edge radius upper: $\rho_u/c = (t/c)^2 \, 1.108$
leading edge radius lower: $\rho_L/c = (t/c)^2 \, .7313$ where $\rho_u$ is the leading edge radius of the blade upper airfoil section taken from a point on the blade chord, wherein $C$ is the chord dimension, wherein $t$ is maximum blade thickness, and where $\rho_L$ is the leading edge radius of the blade lower airfoil section taken from a point on the blade chord, and within a range of ±3% of the values of $Y_u/t$, $Y_L/t$, $\rho\rho_u$ and $\rho_L$ so determined.

82. A helicopter blade according to claim 15 wherein said central portion has a twist of about −14° a thickness of from 9 to 18 percent chord dimension, an airfoil cross section having positive camber with the maximum camber located forward of the 50 percent chord station, and being shaped and fabricated to have the locus of airfoil section aerodynamic centers displaced rearward of the blade structural elastic axis.

83. A helicopter blade according to claim 15 wherein said central portion is of airfoil cross section defined by the coordinates:

| X/C | $Y_u/t$ | $Y_L/t$ |
|---|---|---|
| .0125 | .1863 | −.1526 |
| .025 | .2737 | −.221 |
| .05 | .387 | −.2993 |
| .075 | .45 | −.3395 |
| .1 | .4926 | −.3642 |
| .15 | .5442 | −.3937 |
| .2 | .5734 | −.4087 |
| .25 | .5842 | −.4147 |
| .3 | .5815 | −.4122 |
| .4 | .5578 | −.3959 |
| .5 | .5109 | −.3627 |
| .6 | .4434 | −.3145 |
| .7 | .3553 | −.2509 |
| .85 | .2486 | −.1745 |
| .9 | .1345 | −.0905 |
| .975 | .0345 | −.0244 | where $X$ is a chord station measured from the blade leading edge, $C$ is the chord dimension, $t$ is maximum blade thickness, $Y_u$ is the upper airfoil location at station $X$, and $Y_L$ is the lower airfoil location at station $X$, and where the leading edge radii can be defined by the following equations:

leading edge radius upper: $\rho_u/c = (t/c)^2 \, 1.108$
leading edge radius lower: $\rho_L/c = (t/c)^2 \, .7313$ where $\rho_u$ is the leading edge radius of the blade upper airfoil section taken from a point on the blade chord, wherein $C$ is the chord dimension, wherein $t$ is maximum blade thickness, and where $\rho_L$ is the leading edge radius of the blade lower airfoil section taken from a point on the blade chord, and within a range of ±3 percent of the values of $Y_u/t$, $Y_L/t$, $\rho_u$ and $\rho_L$ so determined.

84. A blade according to claim 82 wherein said tip portion is swept forward at a blade span inboard station and rearward at a blade span outboard station.

85. A blade according to claim 82 wherein said trapezoidal tip commences at the span 95 percent station ±2 percent and reduces uniformly in chord dimension so that the blade tip chord is about 60 percent of the blade chord dimension and so that the tip center of lift remains at the same chord station.

86. A blade according to claim 82 wherein said tip portion is of constant planform.

87. A blade according to claim 86 and including means to cause said tip portion to be actuatable between a constant planform and a trapezoidal tip shape.

88. A blade according to claim 82 and including:
A. a blade root section adapted to be connected to a rotor hub for rotation therewith in both hover and forward flight modes of operation,
B. a blade central portion connected to said blade root portion and extending outwardly therefrom,
C. a blade tip portion connected to said central portion and constituting the blade outer extremity and cooperating with said blade root portion and said blade central portion to define the blade span, and
D. means to vary the position of the blade tip portion with respect to the remainder of the blade to thereby vary the blade tip portion twist.

89. A blade according to claim 83 and including:
A. a blade root section adapted to be connected to a rotor hub for rotation therewith in both hover and forward flight modes of operation,
B. a blade central portion connected to said blade root portion and extending outwardly therefrom,
C. a blade tip portion connected to said central portion and constituting the blade outer extremity and cooperating with said blade root portion and said blade central portion to define the blade span, and D. means to vary the position of the blade tip portion with respect to the remainder of the blade to thereby vary the blade tip portion twist.

90. A helicopter blade according to claim 24 wherein said central portion has a twist of about −14°, a thickness of from 9 percent to 18 percent chord dimension, an airfoil cross section having positive camber with the maximum camber located forward of the 50 percent chord station, and being shaped and fabricated to have the locus of airfoil section aerodynamic centers displaced rearward of the blade structural elastic axis.

91. A blade according to claim 90 wherein said tip portion is swept forward at a blade span inboard station and rearward at a blade span outboard station.

92. A blade according to claim 90 wherein said blade central portion has a twist ranging from 0° to −20° and said generally non-linear tip twist commences at about the 88 percent span station ±2 percent span for eight bladed rotors, at about the 87.5 percent span station ±2 percent span for seven bladed rotors, at about the 87 percent span station ±2 percent span for six bladed rotors, at about the 86 percent span station ±2 percent span for five bladed rotors, at about 84.5 percent span station ±2 percent span for four bladed rotors, at about the 82 percent span station ±2 percent span for three bladed rotors, at about the 77.5 percent blade span station ±2 span for two bladed rotors, at about the 71 percent blade span station ±2 percent span for one bladed rotors, and extending to the blade tip.

93. A helicopter blade according to claim 24 wherein said central portion is of airfoil cross section defined by the coordinates:

| X/C | $Y_u/t$ | $Y_L/t$ |
|---|---|---|
| .0125 | .1863 | −.1526 |
| .025 | .2737 | −.221 |
| .05 | .387 | −.2993 |
| .075 | .45 | −.3395 |
| .1 | .4926 | −.3642 |
| .15 | .5442 | −.3937 |
| .2 | .5734 | −.4087 |
| .25 | .5842 | −.4147 |
| .3 | .5815 | −.4122 |
| .4 | .5578 | −.3959 |
| .5 | .5109 | −.3627 |
| .6 | .4434 | −.3145 |
| .7 | .3553 | −.2509 |
| .85 | .2486 | −.1745 |
| .9 | .1345 | −.0905 |
| .975 | .0345 | −.0244 | where $X$ is a chord station measured from the blade leading edge, $C$ is the chord dimension, $t$ is maximum blade thickness, $Y_u$ is the upper airfoil location at station $X$, and $Y_L$ is the lower airfoil location at station $X$, and where the leading edge radii can be defined by the following equations:

leading edge radius upper: $\rho_u/c = (t/c)^2\, 1.108$
leading edge radius lower: $\rho_L/c = (t/c)^2\, .7313$ where $\rho_u$ is the leading edge radius of the blade upper airfoil section taken from a point on the blade chord, wherein $C$ is the chord dimension, wherein $t$ is maximum blade thickness, and where $\rho_L$ is the leading edge radius of the blade lower airfoil section taken from a point on the blade chord, and within a range of ±3 percent of the values of $Y_u/t$, $Y_L/t$, $\rho_u$ and $\rho_L$ so determined.

94. A blade according to claim 93 wherein said twist is about −14°.

95. A blade according to claim 90 wherein said thickness of said tip section is about 9.5 percent chord dimension and wherein said maximum camber is about 0.8 percent chord dimension and is a forward camber located forward of the 30 percent chord station.

96. A blade according to claim 90 wherein said blade tip portion is of airfoil cross section defined by the formula:

$$0 \leq \frac{x}{c} \leq .25 \begin{cases} \frac{y_u}{c} = \frac{t}{c}\left[\, 1.307\sqrt{\frac{x}{c}} + 3.767\frac{x}{c} - 46.7\left(\frac{x}{c}\right)^2 + 201.3\left(\frac{x}{c}\right)^3 - 316.8\left(\frac{x}{c}\right)^4\right] \\ \frac{y_L}{c} = \frac{t}{c}\left[\, -1.162\sqrt{\frac{x}{c}} - 2.256\frac{x}{c} + 37.2\left(\frac{x}{c}\right)^2 - 170.2\left(\frac{x}{c}\right)^3 + 272.9\left(\frac{x}{c}\right)^4\right] \end{cases}$$

$$.25 \leq \frac{x}{c} \leq 1.0 \begin{cases} \frac{y_u}{c} = \frac{t}{c}\left[\, 6.6134\left(\frac{x}{c}\right) - 28.04\left(\frac{x}{c}\right)^2 + 56.42\left(\frac{x}{c}\right)^3 - 56\left(\frac{x}{c}\right)^4 + 21.15\left(\frac{x}{c}\right)^5\right] \\ \frac{y_L}{c} = \frac{t}{c}\left[\, -4.7661\left(\frac{x}{c}\right) + 20.53\left(\frac{x}{c}\right)^2 - 41.92\left(\frac{x}{c}\right)^3 + 42\left(\frac{x}{c}\right)^4 - 16\left(\frac{x}{c}\right)^5\right] \end{cases}$$

where $X$ is a chord station measured from the blade leading edge, $C$ is the chord dimension, $t$ is maximum blade thickness, $Y_u$ is the upper airfoil location at station $X$, and $Y_L$ is the lower airfoil location at $X$ and where the leading edge radii can be defined by the following equations:

leading edge radius upper: $\rho_u/c = (t/c)^2\, (.01/.095^2)$
leading edge radius lower: $\rho_L/c = (t/c)^2\, (.0066/.095^2)$ where $\rho_u$ is the leading edge radius of the blade upper airfoil and $\rho_L$ is the leading edge radius of the lower blade airfoil, both taken from a point on the blade chord, and within a range of ±3 percent of the values of $Y_u$, $Y_L$, $\rho_u$ and $\rho_L$ so calculated.

97. A blade according to claim 90 wherein said blade tip portion is of airfoil cross section defined by the coordinates:

| X/C | $Y_u/t$ | $Y_L/t$ |
|---|---|---|
| .0125 | .1863 | −.1526 |
| .025 | .2737 | −.221 |
| .05 | .387 | −.2993 |
| .075 | .45 | −.3395 |
| .1 | .4926 | −.3642 |
| .15 | .5442 | −.3937 |
| .2 | .5734 | −.4087 |
| .25 | .5842 | −.4147 |
| .3 | .5815 | −.4122 |
| .4 | .5578 | −.3959 |
| .5 | .5109 | −.3627 |
| .6 | .4434 | −.3145 |
| .7 | .3553 | −.2509 |
| .85 | .2486 | −.1745 |
| .9 | .1345 | −.0905 |
| .975 | .0345 | −.0244 | where $X$ is a chord station measured from the blade leading edge, C is the chord dimension, t is maximum blade thickness, $Y_u$ is the upper airfoil location at station X, and $Y_L$ is the lower airfoil location at station X, and where the leading edge radii can be defined by the following equations:

leading edge radius upper: $\rho_u/c=(t/c)^2\ 1.108$
leading edge radius lower: $\rho_L/c=(t/c)^2\ .7313$ where $\rho_u$ is the leading edge radius of the blade upper airfoil section taken from a point on the blade chord, wherein C is the chord dimension, wherein t is maximum blade thickness, and where $\rho_L$ is the leading edge radius of the blade lower airfoil section taken from a point on the blade chord, and within a range of ±3 percent of the values of $Y_u/t$, $Y_L/t$, $\rho_u$ and $\rho_L$ so determined.

98. A blade according to claim 90 wherein the blade central portion and tip portion camber is maximum at about the blade 27 percent chord station and is shaped to produce a blade pitching moment coefficient within the range ±.03 before moment divergence at subsonic Mach numbers.

99. A blade according to claim 90 wherein the blade tip portion sweep commences at about the 88 percent span station ±2 percent span for eight bladed rotors, at about the 87.5 percent span station ±2 percent span for seven bladed rotors, at about the 87 percent span station ±2 percent span for six bladed rotors, at about the 86 percent span station ±2 percent span for five bladed rotors, at about 84.5 percent span station ±2 percent for four bladed rotors, and at about the 82 percent span station ±2 percent span for three bladed rotors, at about the 77.5 percent blade span station ±2 percent for two bladed rotors, at about the 71 percent blade span station ±2 percent for one bladed rotors, and extending to the blade tip, and wherein the forward sweep and rearward sweep are of maximum angular sweep limits between 30° and 40°.

100. A helicopter blade according to claim 35 wherein said central portion has a twist of about −14°, a thickness of from 9 to 18 percent chord dimension, an airfoil cross section having positive camber with the maximum camber located forward of the 50 percent chord station, and being shaped and fabricated to have the locus of airfoil section aerodynamic centers displaced rearward of the blade structural elastic axis.

101. A blade according to claim 100 wherein said tip is swept forward and then rearward and shaped and constructed to mass balance the tip so that the effective tip chordwise center of gravity is on or forward of the tip elastic axis.

102. A helicopter blade according to claim 37 wherein central portion has a twist of about −14°, a thickness of from 9 to 18 percent chord dimension, an airfoil cross section having positive camber with the maximum camber located forward of the 50 percent chord station, and being shaped and fabricated to have the locus of airfoil section aerodynamic centers displaced rearward of the blade structural elastic axis.

103. A helicopter blade according to claim 38 wherein said central portion has a twist of about −14°, a thickness of from 9 to 18 percent chord dimension, an airfoil cross section having positive camber with the maximum camber located forward of the 50 percent chord station, and being shaped and fabricated to have the locus of airfoil section aerodynamic centers displaced rearward of the blade structural elastic axis.

104. A blade according to claim 102 wherein said tip portion is swept forward at a blade span inboard station and rearward at a blade span outboard station.

105. A blade according to claim 102 wherein said blade central portion has a twist of −20° or less and said generally non-linear twist commences at about the 88 percent span station ±2 percent span for eight bladed rotors, at about the 87.5 percent span station ±27 percent span for seven bladed rotors, at about the 87 percent span station ±2 percent span for six bladed rotors, at about the 86 percent span station ±2 percent span for five bladed rotors, at about 84.5 percent span station ±2 percent span for four bladed rotors, at about the 82 percent span station ±2 percent span for three bladed rotors, at about the 77.5 percent blade span station ±2 percent span for two bladed rotors, at about the 71 percent span station ±2 span for one bladed rotors, and extending to the blade tip.

106. A blade according to claim 90 wherein said blade tip portion is rearwardly swept sufficiently to establish a lift vector or aerodynamic center at the blade tip which is offset from the blade tip elastic axis so as to produce a nose-up moment during forward flight mode of operation on the advancing blade.

107. A blade according to claim 90 wherein said blade tip portion is constructed to as to be mass balanced to establish the blade tip portion effective chordwise center of gravity on or slightly forward of the blade tip elastic axis.

108. A blade according to claim 91 wherein mass balance is accomplished by adding a selective balance weight in the region of blade forward sweep.

109. A blade according to claim 90 and wherein said blade tip portion is shaped and constructed so as to establish a lift vector or aerodynamic center of said tip portion offset from the tip portion elastic axis during high speed forward flight to produce a nose-up moment on the advancing blades and so as to be mass balanced to establish an effective tip chordwise center of gravity on or forward of the tip elastic axis and to produce minimum pitching moments.

110. A blade according to claim 90 and including means to actuate at least a portion of said blade tip portion between a non-swept position and a rearwardly swept position.

111. A blade according to claim 90 and including means to actuate at least a portion of said blade tip portion between a non-swept position and a rearwardly swept position.

112. A blade according to claim 90 wherein said tip portion is of constant planform.

113. A helicopter blade according to claim 50 wherein said central portion has a twist of about −14°, a thickness of from 9 to 18 percent chord dimension, an airfoil cross section having positive camber with the maximum camber located forward of the 50 percent chord station, and being shaped and fabricated to have the locus of airfoil section aerodynamic centers displaced rearward of the blade structural elastic axis.

114. A blade according to claim 113 wherein said tip portion thickness is about 9.5 percent chord dimension and wherein said maximum camber is about 0.8 percent chord dimension and is a forward camber located forward of the 30 percent chord station to thereby produce low blade pitching moments without sacrificing higher maximum lift coefficient and drag divergence aerodynamic characteristics.

115. A blade according to claim 113 wherein said blade tip portion is of airfoil cross section defined by the formula:

$$0 \leq \frac{x}{c} \leq .25 \begin{cases} \frac{y_u}{c} = \frac{t}{c}\left[ 1.307\sqrt{\frac{x}{c}} + 3.767\frac{x}{c} - 46.7\left(\frac{x}{c}\right)^2 + 201.3\left(\frac{x}{c}\right)^3 - 316.8\left(\frac{x}{c}\right)^4 \right] \\ \frac{y_L}{c} = \frac{t}{c}\left[ -1.162\sqrt{\frac{x}{c}} - 2.256\frac{x}{c} + 37.2\left(\frac{x}{c}\right)^2 - 170.2\left(\frac{x}{c}\right)^3 + 272.9\left(\frac{x}{c}\right)^4 \right] \end{cases}$$

$$.25 \leq \frac{x}{c} \leq 1.0 \begin{cases} \frac{y_u}{c} = \frac{t}{c}\left[ 6.6134\left(\frac{x}{c}\right) - 28.04\left(\frac{x}{c}\right)^2 + 56.42\left(\frac{x}{c}\right)^3 - 56\left(\frac{x}{c}\right)^4 + 21.15\left(\frac{x}{c}\right)^5 \right] \\ \frac{y_L}{c} = \frac{t}{c}\left[ -4.7661\left(\frac{x}{c}\right) + 20.53\left(\frac{x}{c}\right)^2 - 41.92\left(\frac{x}{c}\right)^3 + 42\left(\frac{x}{c}\right)^4 - 16\left(\frac{x}{c}\right)^5 \right] \end{cases}$$

where $X$ is a chord station measured from the blade leading edge, $C$ is the chord dimension, $t$ is maximum blade thickness, $Y_u$ is the upper airfoil location at station $X$, and $Y_L$ is the lower airfoil location at $X$ and where the leading edge radii can be defined by the following equations:

leading edge radius upper: $\rho u/c = (t/c)^2 \, 1.108$
leading edge radius lower: $\rho L/c = (t/c)^2 \, .7313$ where $\rho_u$ is the leading edge radius of the blade upper airfoil and $\rho_L$ is the leading edge radius of the lower blade airfoil, both taken from a point on the blade chord, and within a range of ±3 percent of the values of $Y_u$, $Y_L$, $\rho_u$ and $\rho_L$ so calculated.

116. A blade according to claim 113 wherein said blade tip portion is of airfoil cross section defined by the coordinates:

| X/C | $Y_u/t$ | $Y_L/t$ |
|---|---|---|
| .0125 | .1863 | −.1526 |
| .025 | .2737 | −.221 |
| .05 | .387 | −.2993 |
| .075 | .45 | −.3395 |
| .1 | .4926 | −.3642 |
| .15 | .5442 | −.3937 |
| .2 | .5734 | −.4087 |
| .25 | .5842 | −.4147 |
| .3 | .5815 | −.4122 |
| .4 | .5578 | −.3959 |
| .5 | .5109 | −.3627 |
| .6 | .4434 | −.3145 |
| .7 | .3553 | −.2509 |
| .85 | .2486 | −.1745 |
| .9 | .1345 | −.0905 |
| .975 | .0345 | −.0244 | where $X$ is a chord station measured from the blade leading edge, $C$ is the chord dimension, $t$ is maximum blade thickness, $Y_u$ is the upper airfoil location at station $X$, and $Y_L$ is the lower airfoil location at station $X$, and where the leading edge radii can be defined by the following equations:

leading edge radius upper: $\rho u/c = (t/c)^2 \, 1.108$
leading edge radius lower: $\rho L/c = (t/c)^2 \, .7313$ where $\rho_u$ is the leading edge radius of the blade upper airfoil section taken from a point on the blade chord, wherein $C$ is the chord dimension, wherein $t$ is maximum blade thickness, and where $\rho_L$ is the leading edge radius of the blade lower airfoil section taken from a point on the blade chord, and within a range of ±3 percent of the values of $Y_u/t$, $Y_L/t$, $\rho_u$ and $\rho_L$ so determined.

117. A helicopter blade according to claim 59 wherein said central portion has a twist of about −14°, a thickness of from 9 to 18 percent chord dimension, an airfoil cross section having positive camber with the maximum camber located forward of the 50 percent chord station, and being shaped and fabricated to have the locus of airfoil section aerodynamic centers displaced rearward of the blade structural elastic axis.

118. A blade according to claim 113 wherein said tip portion airfoil cross section is shaped to produce a maximum lift coefficient, $C_{L\,max.}$, of at least 1.41 and 1.0 at tip Mach numbers of 0.3 and 0.6, respectively, and a drag divergence Mach number of at least 0.76 at a lift coefficient of 0.2 and wherein the blade camber is maximum at about the blade 27 percent chord station and is shaped to produce a blade pitching moment coefficient within the range ± .03 before moment divergence at subsonic Mach numbers.

119. A helicopter blade according to claim 63 wherein said central portion has a twist of about −14°, a thickness of from 9 to 18 percent chord dimension, an airfoil cross section having positive camber with the maximum camber located forward of the 50 percent chord station, and being shaped and fabricated to have the locus of airfoil section aerodynamic centers displaced rearward of the blade structural elastic axis.

120. A helicopter blade according to claim 64 wherein said central portion has a twist of about −14°, a thickness of from 9 to 18 percent chord dimension, an airfoil cross section having positive camber with the maximum camber located forward of the 50 percent chord station, and being shaped and fabricated to have the locus of airfoil section aerodynamic centers displaced rearward of the blade structural elastic axis.

121. A helicopter blade according to claim 65 wherein said central portion has a twist of about −14°, a thickness of from 9 to 18 percent chord dimension, an airfoil cross section having positive camber with the maximum camber located forward of the 50 percent chord station, and being shaped and fabricated to have the locus of airfoil section aerodynamic centers displaced rearward of the blade structural elastic axis.

122. A helicopter blade according to claim 66 wherein said central portion has a twist of about −14°, a thickness of from 9 to 18 percent chord dimension, an airfoil cross section having positive camber with the maximum camber located forward of the 50 percent chord station, and being shaped and fabricated to have the locus of airfoil section aerodynamic centers displaced rearward of the blade structural elastic axis.

123. A helicopter blade according to claim 67 wherein said central portion has a twist of about −14°, a thickness of from 9 to 18 chord dimension, an airfoil cross section having positive camber with the maxi-

124. A helicopter blade according to claim 68 wherein said central portion has a twist of about −14°, a thickness of from 9 to 18 percent chord dimension, an airfoil cross section having positive camber with the maximum camber located forward of the 50 percent chord station, and being shaped and fabricated to have the locus of airfoil section aerodynamic centers displaced rearward of the blade structural elastic axis.

125. A helicopter blade according to claim 69 wherein aid central portion has a twist of about −14°, a thickness of from 9 to 18 percent chord dimension, an airfoil cross section having positive camber with the maximum camber located forward of the 50 percent chord station, and being shaped and fabricated to have the locus of airfoil section aerodynamic centers displaced rearward of the blade structural elastic axis.

126. A helicoter blade according to claim 70 wherein said central portion has a twist of about −14°, a thickness of from 9 to 18 percent chord dimension, an airfoil cross section having positive camber with the maximum camber located forward of the 50 percent chord station, and being shaped and fabricated to have the locus of airfoil section aerodynamic centers displaced rearward of the blade structural elastic axis.

127. A helicopter blade according to claim 71 wherein said central portion has a twist of about −14°, a thickness of from 9 to 18 percent chord dimension, an airfoil cross section having positive camber with the maximum camber located forward of the 50 percent chord station, and being shaped and fabricated to have the locus of airfoil section aerodynamic centers displaced rearward of the blade structural elastic axis.

128. The method according to claim 72 and including the additional step of fabricating the blade so that its airfoil section has positive camber throughout and with maximum camber forward of the 50 percent span station, and so that the locus of blade aerodynamic centers throughout the blade airfoil section is aft of the blade elastic axis.

129. Apparatus according to claim 80 wherein said blade tip portion has an airfoil cross-sectional shape with two dimensional aerodynamic characteristics such that at tip Mach numbers f 0.3 and 0.6, the maximum lift coefficient, $C_{L\ max.}$, is at least 1.41 and 1, respectively, and has a drag divergence Mach number of at least 0.76 at a lift coefficient of 0.2, and wherein the blade camber is shaped to produce a blade pitching moment coefficient of less than 0.03 before moment divergence at subsonic Mach numbers.

130. Apparatus according to claim 90 wherein said blade tip portion has an airfoil cross-sectional shape with two dimensional aerodynamic characteristics such that at tip Mach numbers of 0.3 and 0.6, the maximum lift coefficient, $C_{L\ max.}$, is at least 1.41 and 1, respectively, and has a drag divergence Mach number of at least 0.76 at a lift coefficient of 0.2, and wherein the blade camber is shaped to produce a blade itching moment coefficient of less than 0.03 before moment divergence at subsonic Mach numbers.

131. Apparatus according to claim 113 wherein said blade tip portion has an airfoil cross-sectional shape with two dimensional aerodynamic characteristics such that at tip Mach numbers of 0.3 and 0.6, the maximum lift coefficient, $C_{L\ max.}$, is at least 1.41 and 1, respectively, and has a drag divergence Mach number of at least 0.76 at a lift coefficient of 0.2, and wherein the blade camber is shaped to produce a blade pitching moment coefficient of less than 0.03 before moment divergence at subsonic Mach numbers.

132. A helicopter blade having a span dimension, a chord dimension, a tip and including:
  A. a blade root section adapted to be connected to a rotor hub for rotation thereiwth in both hover and forward flight modes of operation,
  B. a blade central portion connected to said blade root portion and extending outwardly therefrom,
  C. a blade tip portion connected to said central portion and constituting the blade outer extremity and cooperating with said blade root portion and said blade central portion to define the blade span and shaped to have:
    1. a generally negative non-linear twist of values ranging between −1° and about −8°,
    2. a substantially constant chord dimension throughout most of its span,
    3. a trapezoidal tip,
    4. a thickness between 6 and 10 percent chord dimension, and
    5. being cambered with the maximum camber forward of the 50 percent chord station,
  D. wherein said trapezoidal tip commences at a span station between 90 and 97 percent span and reduces uniformly in chord dimension so that the blade tip chord is about 60 percent, ±15 percent, of the blade chord dimension and so that the tip center of pressure remains at the same chord station,
  E. wherein the thickness of said tip portion is about 9.5 percent chord dimension and wherein said maximum camber is about 0.8 ±0.1 percent chord dimension and is a forward camber located forward of the 30 percent chord station, and
  F. wherein said blade tip portion is of airfoil cross section defined by the formula:

$$0 \leq \frac{x}{c} \leq .25 \begin{cases} \frac{y_u}{c} = \frac{t}{c}\left[ 1.307\sqrt{\frac{x}{c}} + 3.767\frac{x}{c} - 46.7\left(\frac{x}{c}\right)^2 + 201.3\left(\frac{x}{c}\right)^3 - 316.8\left(\frac{x}{c}\right)^4 \right] \\ \frac{y_L}{c} = \frac{t}{c}\left[ -1.162\sqrt{\frac{x}{c}} - 2.256\frac{x}{c} + 37.2\left(\frac{x}{c}\right)^2 - 170.2\left(\frac{x}{c}\right)^3 + 272.9\left(\frac{x}{c}\right)^4 \right] \end{cases}$$

$$.25 \leq \frac{x}{c} \leq 1.0 \begin{cases} \frac{y_u}{c} = \frac{t}{c}\left[ 6.6134\left(\frac{x}{c}\right) - 28.04\left(\frac{x}{c}\right)^2 + 56.42\left(\frac{x}{c}\right)^3 - 56\left(\frac{x}{c}\right)^4 + 21.15\left(\frac{x}{c}\right)^5 \right] \\ \frac{y_L}{c} = \frac{t}{c}\left[ -4.7661\left(\frac{x}{c}\right) + 20.53\left(\frac{x}{c}\right)^2 - 41.92\left(\frac{x}{c}\right)^3 + 42\left(\frac{x}{c}\right)^4 - 16\left(\frac{x}{c}\right)^5 \right] \end{cases}$$

where $X$ is a chord station measured from the blade leading edge, $C$ is the chord dimension, $t$ is maximum blade thickness, $Y_u$ is the upper airfoil location at station $X$, and $Y_L$ is the lower airfoil location at $X$ and where the leading edge radii can be defined by the following equations:

leading edge radius upper: $\rho_u/c = (t/c)^2(.01/.095^2)$
leading edge radius lower: $\rho_L/c = (t/c)^2(.0066/.095^2)$ where $\rho_u$ is the leading edge radius of the blade upper airfoil and $\rho_L$ is the leading edge radius of the lower blade airfoil, both taken from a point on the blade chord, and within a range of $\pm 3$ percent of the values of $Y_u$, $Y_L$, $\rho_u$ and $\rho_L$ so calculated.

D. wherein said trapezoidal tip commences at a span station between 90 and 97 percent span and reduces uniformly in chord dimension so that the blade tip chord is about 60 percent, $\pm 15$ percent, of the blade chord dimension and so that the tip center of pressure remains at the same chord station, E. wherein said thickness of about 9.5 percent chord dimension and wherein said maximum camber is about $0.8 \pm 0.1$ percent chord dimension and is forward camber located forward of the 30 percent chord station, and F. wherein said blade tip portion is of airfoil cross section defined by the formula:

$$0 \leq \frac{x}{c} \leq .25 \begin{cases} \frac{y_u}{c} = \frac{t}{c}\left[ 1.307\sqrt{\frac{x}{c}} + 3.767\frac{x}{c} - 46.7\left(\frac{x}{c}\right)^2 + 201.3\left(\frac{x}{c}\right)^3 - 316.8\left(\frac{x}{c}\right)^4 \right] \\ \frac{y_L}{c} = \frac{t}{c}\left[ -1.162\sqrt{\frac{x}{c}} - 2.256\frac{x}{c} + 37.2\left(\frac{x}{c}\right)^2 - 170.2\left(\frac{x}{c}\right)^3 + 272.9\left(\frac{x}{c}\right)^4 \right] \end{cases}$$

$$.25 \leq \frac{x}{c} \leq 1.0 \begin{cases} \frac{y_u}{c} = \frac{t}{c}\left[ 6.6134\left(\frac{x}{c}\right) - 28.04\left(\frac{x}{c}\right)^2 + 56.42\left(\frac{x}{c}\right)^3 - 56\left(\frac{x}{c}\right)^4 + 21.15\left(\frac{x}{c}\right)^5 \right] \\ \frac{y_L}{c} = \frac{t}{c}\left[ -4.7661\left(\frac{x}{c}\right) + 20.53\left(\frac{x}{c}\right)^2 - 41.92\left(\frac{x}{c}\right)^3 + 42\left(\frac{x}{c}\right)^4 - 16\left(\frac{x}{c}\right)^5 \right] \end{cases}$$

133. A helicopter blade according to claim 132 wherein said central portion has a twist of about $-14°$, a thickness of from 9 to 18 percent chord dimension, an airfoil cross section having positive camber with the maximum camber located forward of the 50 percent chord station, and being shaped and fabricated to have the locus of airfoil section aerodynamic centers displaced rearward of the blade structural elastic axis.

134. A helicopter blade having a span dimension a chord dimension, a tip and including:
A. a blade root section adapted to be connected to a rotor hub for rotation therewith in both hover and forward flight modes of operation,
B. a blade central portion connected to said blade root portion and extending outwardly therefrom,
C. a blade tip portion connected to said central portion and constituting the blade outer extremity and cooperating with said blade root portion and said blade central portion to define the blade span and shaped to have:
1. a generally negative non-linear twist of values ranging between $-1°$ and about $-8°$,
2. a substantially constant chord dimension throughout most of its span,
3. a trapezoidal tip,
4. a thickness of between 6 and 10 percent chord dimension, and
5. being cambered with th maximum camber forward of the 50 percent chord station, where $X$ is a chord station measured from the blade leading edge, $C$ is the chord dimension, $t$ is maximum blade thickness, $Y_u$ is the upper airfoil location at station $X$, and $Y_L$ is the lower airfoil location at $X$ and where the leading edge radii can be defined by the following equations:

leading edge radius upper: $\rho_u/c = (t/c)^2(.01/.095^2)$
leading edge radius lower: $\rho_L/c \ c = (t/c)^2(.0066/.095^2)$ where $\rho_u$ is the leading edge radius of the blade upper airfoil and $\rho_L$ is the leading edge radius of the lower blade airfoil, both taken from a point on the blade chord, and within a range of $\pm 3$ percent of the values of $Y_u$, $Y_L$, $\rho_u$ and $\rho_L$ so calculated.

135. A helicopter blade according to claim 134 wherein said central portion has a twist of about $-14°$, a thickness of from 9 to 18 percent chord dimension, an airfoil cross section having positive camber with the maximum center located forward of the 50 percent chord station, and being shaped and fabricated to have the locus of airfoil section aerodynamic centers displaced rearward of the blade structural elastic axis.

136. A helicopter blade having a span dimension, a chord dimension, a tip and including:
A. a blade root section adapted to be connected to a rotor hub for rotation therewith in both hover and forward flight modes of operation,
B. a blade central portion connected to said blade root portion and extending outwardly therefrom, C. a blade tip portion connected to said central portion and constituting the blade outer extremity and cooperating with said blade root portion and said blade central portion to define the blade span and shaped to have:
1. a generally negative non-linear twist of values ranging between −1° and about −8°,
2. a substantially constant chord dimension throughout most of its span,
3. a thickness between 6 and 10 percent chord dimension, and
4. being cambered with the maximum camber forward of the 50 percent chord station,
D. wherein said thickness is about 9.5 percent chord dimension and wherein said maximum camber is about 0.8 ± 0.1 percent chord dimension and is a forward camber located forward of the 30 percent chord station, and
E. wherein said blade tip portion is of airfoil cross section defined by the coordinates:

| X/C | $Y_u/t$ | $Y_L/t$ |
|---|---|---|
| .0125 | .1863 | −.1526 |
| .025 | .2737 | −.221 |
| .05 | .387 | −.2993 |
| .075 | .45 | −.3395 |
| .1 | .4926 | −.3642 |
| .15 | .5442 | −.3937 |
| .2 | .5734 | −.4087 |
| .25 | .5842 | −.4147 |
| .3 | .5815 | −.4122 |
| .4 | .5578 | −.3959 |
| .5 | .5109 | −.3627 |
| .6 | .4434 | −.3145 |
| .7 | .3553 | −.2509 |
| .85 | .2486 | −.1745 |
| .9 | .1345 | −.0905 |
| .975 | .0345 | −.0244 | where $X$ is a chord station measured from the blade leading edge, $C$ is the chord dimension, $t$ is maximum blade thickness, $Y_u$ is the upper airfoil location at station $X$, and $Y_L$ is the lower airfoil location at station $X$, and where the leading edge radii can be defined by the following equations:

leading edge radius upper: $\rho_u/c = (t/c)^2 1.108$
leading edge radius lower: $\rho_L/c = (t/c)^2 .7313$ where $\rho_u$ is the leading edge radius of the blade upper airfoil section taken from a point on the blade chord, where $C$ is the chord dimension, wherein $t$ is maximum blade thickness, and where $\rho_L$ is the leading edge radius of the blade lower airfoil section taken from a point on the blade chord, and within a range of ± 3 percent of the values of $Y_u/t$, $Y_L/t$, $\rho_u$ and $\rho_L$ so determined.

137. A helicopter blade according to claim 136 wherein said central portion has a twist of about −14°, a thickness of rom 9 to 18 percent chord dimension, an airfoil cross section having positive camber with the maximum camber located forward of the 50 percent chord station, and being shaped and fabricated to have the locus of airfoil section aerodynamic centers displaced rearward of the blade structural elastic axis.

138. A helicopter blade according to claim 137 wherein said central portion is of airfoil cross section defined by the coordinates:

| X/C | $Y_u/t$ | $Y_L/t$ |
|---|---|---|
| .0125 | .1863 | −.1526 |
| .025 | .2737 | −.221 |
| .05 | .387 | −.2993 |
| .075 | .45 | −.3395 |
| .1 | .4926 | −.3642 |
| .15 | .5442 | −.3937 |
| .2 | .5734 | −.4087 |
| .25 | .5842 | −.4147 |
| .3 | .5815 | −.4122 |
| .4 | .5578 | −.3959 |
| .5 | .5109 | −.3627 |
| .6 | .4434 | −.3145 |
| .7 | .3553 | −.2509 |
| .85 | .2486 | −.1745 |
| .9 | .1345 | −.0905 |
| .975 | .0345 | −.0244 | where $X$ is a chord station measured from the blade leading edge, $C$ is the chord dimension, $t$ is maximum blade thickness, $Y_u$ is the upper airfoil location at station $X$, and $Y_L$ is the lower airfoil location at station $X$, and where the leading edge raii can be defined by the following equations:

leading edge radius upper: $\rho_u/c = (t/c)^2 1.108$
leading edge radius lower: $\rho_L/c = (t/c)^2 .7313$ where $\rho_u$ is the leading edge radius of the blade upper airfoil section taken from a point on the blade chord, wherein $C$ is the chord dimension, wherein $t$ is maximum blade thickness, and where $\rho_L$ is the leading edge radius of the blade lower airfoil section taken from a point on the blade chord, and within a range of ± 3 percent of the valueoof $Y_u/t$, $Y_L/t$, $\rho_u$ and $\rho_L$ so determined.

* * * * *

UNITED STATES PATENT OFFICE
CERTIFICATE OF CORRECTION

PATENT NO. : 3,822,105
DATED : July 2, 1974
INVENTOR(S) : W. DONALD JEPSON

It is certified that error appears in the above-identified patent and that said Letters Patent are hereby corrected as shown below:

Column 39, line 46  Delete "$\Delta\theta_{.895} = [.4375 \Delta\theta_{.95}] - 5°, + 3°$ tolerance," and insert --$\Delta\theta_{.895} = [.4375 \Delta\theta_{.95}] - .5°, + 3°$ tolerance,--

Column 40, line 46  Delete "$\Delta\theta_{.895} = [.4375 \Delta\theta_{.95}] - 5°, + 3°$ tolerance." and insert --$\Delta\theta_{.895} = [.4375 \Delta\theta_{.95}] - .5°, + 3°$ tolerance.--

Column 41, line 47  Delete "$\Delta\theta_{.895} = [.4375 \Delta\theta_{.95}] - 5°, + 3°$ tolerance." and insert --$\Delta\theta_{.895} = [.4375 \Delta\theta_{.95}] - .5°, + 3°$ tolerance.--

Signed and Sealed this

Twenty-sixth Day of October 1976

[SEAL]

Attest:

RUTH C. MASON
Attesting Officer

C. MARSHALL DANN
Commissioner of Patents and Trademarks